US007827574B1

(12) United States Patent
Hendricks et al.

(10) Patent No.: US 7,827,574 B1
(45) Date of Patent: Nov. 2, 2010

(54) METHOD AND APPARATUS FOR TARGETED ADVERTISING

(75) Inventors: John S. Hendricks, Potomac, MD (US); Alfred E. Bonner, Bethesda, MD (US)

(73) Assignee: Comcast IP Holdings I, LLC, Wilmington, DE (US)

( * ) Notice: Subject to any disclaimer, the term of this patent is extended or adjusted under 35 U.S.C. 154(b) by 1920 days.

(21) Appl. No.: 10/261,931

(22) Filed: Oct. 2, 2002

Related U.S. Application Data

(60) Division of application No. 08/735,549, filed on Oct. 23, 1996, now Pat. No. 6,738,978, which is a division of application No. 08/160,280, filed on Dec. 2, 1993, now Pat. No. 5,600,364, application No. 10/261,931, which is a continuation-in-part of application No. 08/160,281, filed on Dec. 2, 1993, now Pat. No. 5,798,785, and a continuation-in-part of application No. 08/160,282, filed on Dec. 2, 1993, now Pat. No. 5,659,350, and a continuation-in-part of application No. 08/160,193, filed on Dec. 2, 1993, now Pat. No. 5,734,853, and a continuation-in-part of application No. 08/160,194, filed on Dec. 2, 1993, now Pat. No. 5,990,927, and a continuation-in-part of application No. 08/160,283, filed on Dec. 2, 1993, now Pat. No. 5,682,195.

(51) Int. Cl.
*H04N 7/10* (2006.01)
(52) U.S. Cl. .................. 725/34; 725/9; 725/14; 725/32
(58) Field of Classification Search .............. 725/9, 725/14, 16, 32, 34, 35, 89, 122, 134
See application file for complete search history.

(56) References Cited

U.S. PATENT DOCUMENTS

| 4,402,279 | A | * | 9/1983 | Witte et al. ............... 118/326 |
| 4,533,948 | A | | 8/1985 | McNamara |
| 4,546,382 | A | * | 10/1985 | McKenna et al. ............ 725/14 |
| 4,602,279 | A | * | 7/1986 | Freeman ................... 725/35 |
| 4,658,290 | A | * | 4/1987 | McKenna et al. ............ 725/14 |

(Continued)

OTHER PUBLICATIONS

Non-final Office Action issued in U.S. Appl. No. 10/724,123, mailing date Nov. 6, 2009.

(Continued)

*Primary Examiner*—Christopher Kelley
*Assistant Examiner*—Timothy R Newlin
(74) *Attorney, Agent, or Firm*—Banner & Witcoff, Ltd.

(57) ABSTRACT

A novel network controller for use with a digital cable head-end capable of monitoring and controlling set top terminals in a television program delivery system is described. The invention relates to methods and apparatus for a network controller that manages a configuration of set top terminals in a program delivery system. Specifically, the invention modifies a program control information signal at the cable headend before the modified signal is transmitted to each set top terminal. This signal is used with polling methods to receive upstream data from the set top terminals. The invention initiates such upstream data retrieval, gathers all data received and compiles viewer demographics information and programs watched information. The invention processes this data and information to generate packages of advertisements targeted towards each set top terminal. The invention uses upstream data reception hardware, databases and processing hardware and software to accomplish these functions.

65 Claims, 69 Drawing Sheets

U.S. PATENT DOCUMENTS

| | | | |
|---|---|---|---|
| 4,665,559 A | | 5/1987 | Benun |
| 4,706,121 A | * | 11/1987 | Young .......................... 348/27 |
| 4,775,935 A | * | 10/1988 | Yourick ....................... 715/811 |
| 4,888,638 A | * | 12/1989 | Bohn .......................... 725/34 |
| 4,890,321 A | | 12/1989 | Seth-Smith |
| 5,027,400 A | | 6/1991 | Baji |
| 5,029,014 A | | 7/1991 | Lindstrom |
| 5,099,319 A | | 3/1992 | Esch |
| 5,155,591 A | * | 10/1992 | Wachob ....................... 725/35 |
| 5,192,999 A | | 3/1993 | Graczyk |
| 5,251,324 A | * | 10/1993 | McMullan, Jr. .............. 725/14 |
| 5,270,809 A | | 12/1993 | Gammie et al. |
| 5,282,028 A | | 1/1994 | Johnson |
| 5,293,633 A | | 3/1994 | Robbins |
| 5,317,391 A | | 5/1994 | Banker et al. |
| 5,374,951 A | | 12/1994 | Welsh |
| 5,381,477 A | * | 1/1995 | Beyers et al. ............... 380/231 |
| 5,410,326 A | | 4/1995 | Goldstein |
| 5,446,919 A | | 8/1995 | Wilkins |
| 5,467,402 A | | 11/1995 | Okuyama et al. |
| 5,477,262 A | | 12/1995 | Banker |
| 5,539,871 A | | 7/1996 | Gibson |
| 5,550,863 A | | 8/1996 | Yurt et al. |
| 5,635,989 A | | 6/1997 | Rothmuller |
| 5,715,315 A | | 2/1998 | Handelman |
| 6,201,536 B1 | | 3/2001 | Hendricks et al. |

OTHER PUBLICATIONS

Office Action in U.S. Appl. No. 09/964,891, dated Mar. 11, 2010.
Office Action in U.S. Appl. No. 12/487,450, dated Mar. 19, 2010.

* cited by examiner

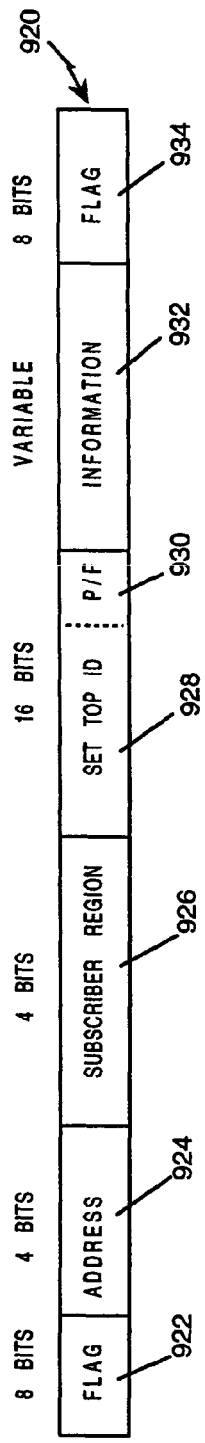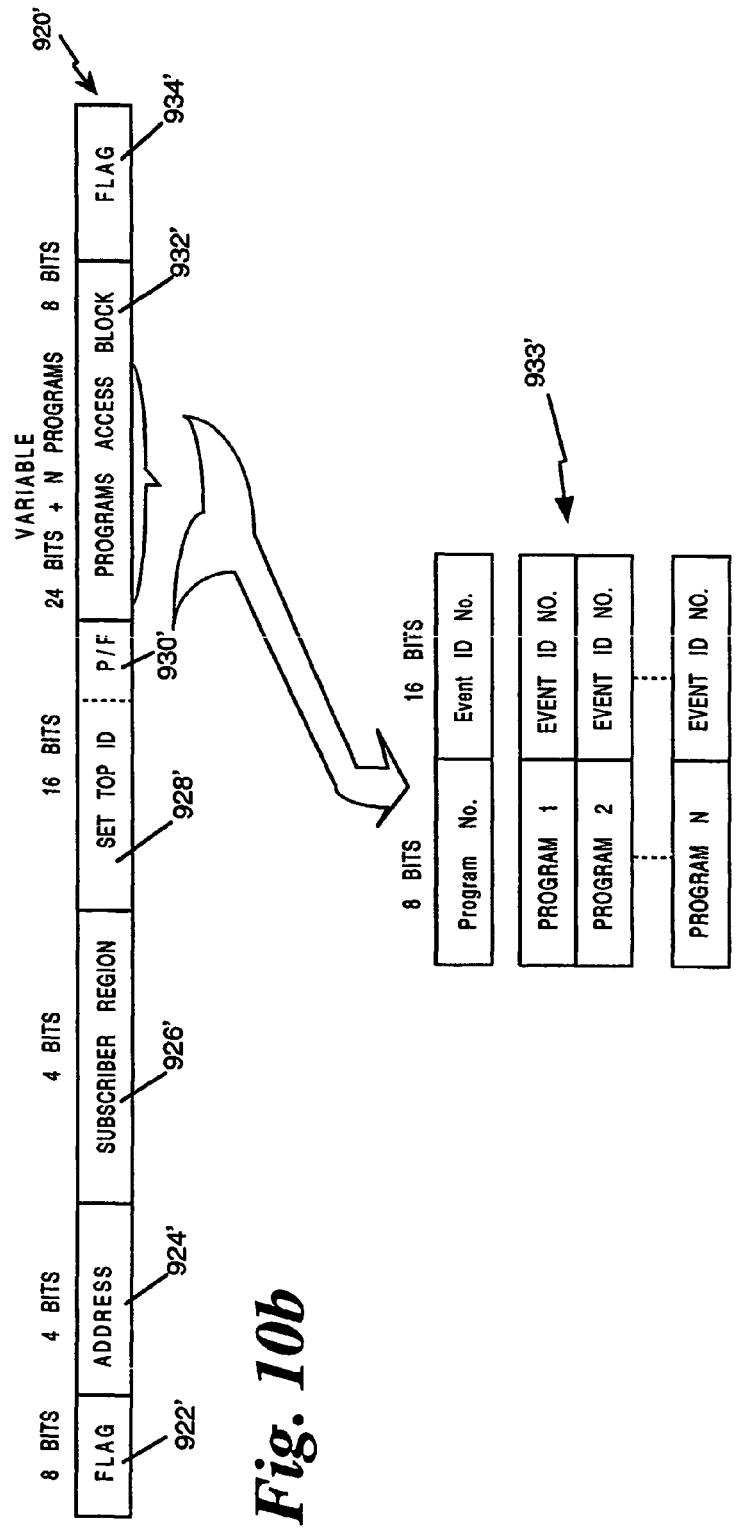
Fig. 10a
Fig. 10b

Fig.29

```
THURSDAY, FEBRUARY 26, 1994                    7:42PM
                      [13] WJZ/ABC        [27] LEARNING
                      [14] HEADLINE       [28] DISNEY
                      [15] C-SPAN         [29] HBO
[2] WMAR/NBC          [16] C-SPAN II      [30] CINEMAX
[3] LOCAL WEATHER     [17] WWOR           [31] SHOWTIME
[4] WRC/NBC           [18] ESPN           [32] LOCAL GOVT.
[5] WTTG/FOX          [19] NICKELODEON    [33] A&E
[6] CNN               [20] WDCA/IND.      [34] HTS
[7] WJLA/ABC          [21] FAMILY         [35] WERU/IND.
[8] DISCOVERY         [22] WMPT/PBS       [36] WTBS
[9] WUSA/CBS          [23] LIFETIME       [37] NASHVILLE
[10] TNT              [24] INTERFAITH     [38] VH-1
[11] WBAL/CBS         [25] BET            [39] MTV
[12] USA              [26] WETA/PBS       [40] CHANNEL LINEUP
MOVE YELLOW CURSOR TO SELECT CHANNELS AND PRESS (GO)
```

1010

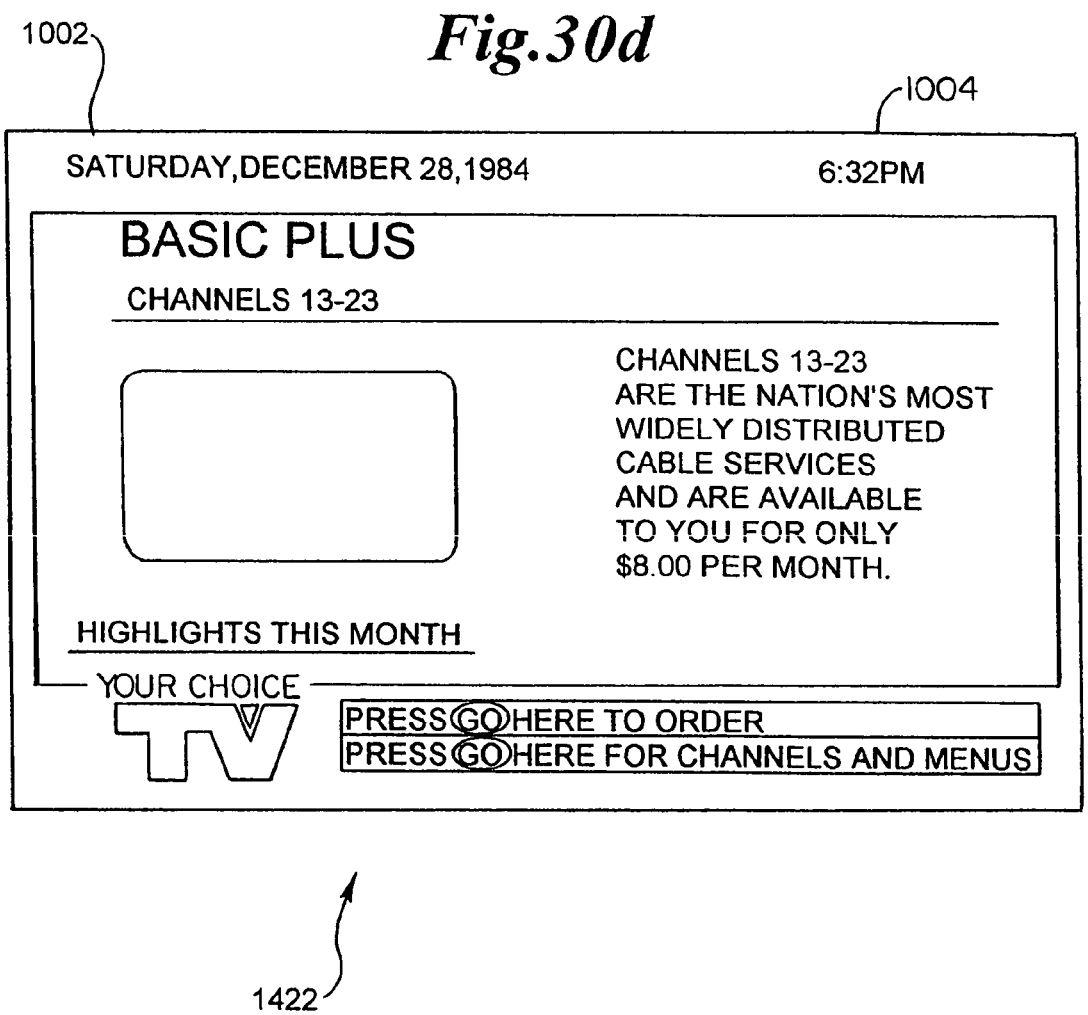

| | |
|---|---|
| THURSDAY, OCTOBER 26,1994 | 8:06PM |

AIRLINE INFORMATION AND RESERVATIONS (CONTINUED)

YOU HAVE SELECTED SEATS: 23A,23B
DELTA FLIGHT #49 FROM PHEONIX TO WASH. DULLES

DATE: 11/25/94 DEPARTS 8:00AM AND ARRIVES 3:07PM

ONE WAY FARE: $295.00 23A    ROUND TRIP FARE: $419.00 23A
                 $295.00 23B                     $419.00 23B
     TOTAL    $590.00           TOTAL    $838.00

PRESS GO HERE TO SELECT <u>ONE WAY</u> OR <u>ROUND TRIP</u>

TO CONFIRM YOUR RESERVATION:

YOUR CHOICE TV
| PRESS GO HERE TO CHARGE TO YOUR CREDIT CARD |
| PRESS GO HERE AND AN AGENT WILL CALL YOU |
| PRESS GO HERE TO EXIT WITHOUT RESERVATION |

1346

US 7,827,574 B1

METHOD AND APPARATUS FOR TARGETED ADVERTISING

CROSS REFERENCE TO RELATED APPLICATIONS

This application is a divisional of application Ser. No. 08/735,549 filed Oct. 23, 1996 now U.S. Pat. No. 6,738,978, entitled "Method And Apparatus For Targeted Advertising" (As Amended), which is a divisional of application Ser. No. 08/160,280, filed Dec. 2, 1993, now issued U.S. Pat. No. 5,600,364, entitled "Network Controller for Cable Television Delivery Systems", all of which are herein incorporated by reference. The following other continuation-in-part applications are also incorporated herein by reference:

Ser. No. 08/160,281, filed Dec. 2, 1993, now issued U.S. Pat. No. 5,798,785, entitled "Reprogrammable Terminal For Suggesting Programs Offered On A Television Program Delivery System;"

Ser. No. 08/160,282, filed Dec. 2, 1993, now issued U.S. Pat. No. 5,659,350, entitled "An Operations Center For A Television Program Packaging And Delivery System;"

Ser. No. 08/160,193, filed Dec. 2, 1993, now issued U.S. Pat. No. 5,734,853, entitled "Set Top Terminal For Cable Television Delivery Systems;"

Ser. No. 08/160,194, filed Dec. 2, 1993, now issued U.S. Pat. No. 5,990,927, entitled "Advanced Set Top Terminal For Cable Television Delivery Systems;"

Ser. No. 08/160,283 filed Dec. 2, 1993, now issued U.S. Pat. No. 5,682,195, entitled "Digital Cable Headend For Cable Television Delivery System."

TECHNICAL FIELD

The invention relates to television entertainment systems for providing television programming to consumer homes. More particularly, the invention relates to a network controller that monitors, controls and manages a television program delivery network from a cable headend.

BACKGROUND OF THE INVENTION

Advances in television entertainment have been primarily driven by breakthroughs in technology. In 1939, advances on Vladmir Zworykin's picture tube provided the stimulus for NBC to begin its first regular broadcasts. In 1975, advances in satellite technology provided consumers with increased programming to homes.

Many of these technology breakthroughs have produced inconvenient systems for consumers. One example is the ubiquitous three remote control home, having a separate and unique remote control for the TV, cable box and VCR. More recently, technology has provided cable users in certain parts of the country with 100 channels of programming. This increased program capacity is beyond the ability of many consumers to use effectively. No method of managing the program choices has been provided to consumers.

Consumers are demanding that future advances in television entertainment, particularly programs and program choices, be presented to the consumer in a user friendly manner. Consumer preferences, instead of technological breakthroughs, will drive the television entertainment market for at least the next 20 years. As computer vendors have experienced a switch from marketing new technology in computer hardware to marketing better usability, interfaces and service, the television entertainment industry will also experience a switch from new technology driving the market to consumer usability driving the market.

Consumers want products incorporating new technology that are useful, and will no longer purchase new technology for the sake of novelty or status. Technological advances in sophisticated hardware are beginning to surpass the capability of the average consumer to use the new technology. Careful engineering must be done to make entertainment products incorporating new technology useful and desired by consumers.

In order for new television entertainment products to be successful, the products must satisfy consumer demands. TV consumers wish to go from limited viewing choices to a variety of choices, from no control of programming to complete control. Consumers wish to advance from cumbersome and inconvenient television to easy and convenient television and keep costs down. Consumers do not wish to pay for one hundred channels when due to lack of programming information, they seldom, if ever, watch programming on many of these channels. Viewers wish their programming to be customized and targeted to their needs and tastes.

The concepts of interactive television, high definition television and 300 channel cable systems in consumer homes will not sell if they are not packaged, delivered and presented in a useable fashion to consumers. Consumers are already being bombarded with programming options, numerous "free" cable channels, subscription cable channels and pay-per-view choices. Any further increase in TV entertainment choices, without a user friendly presentation and approach, will likely bewilder viewers with a mind-numbing array of choices.

The TV industry has traditionally marketed and sold its programs to consumers in bulk, such as continuous feed broadcast and long-term subscriptions to movie channels. The TV industry is unable to sell its programming in large quantities on a unit per unit basis, such as the ordering of one program. Consumers prefer a unit sales approach because it keeps costs down and allows the consumer to be more selective in their viewing.

In today's television world, networks manage the program lineup for individual channels. Each network analyzes ratings for television shows and determines the appropriate schedule or program lineup to gain market share and revenue from advertising. Program ratings are determined using a test group of viewers and statistical analysis methods. Since each channel is in competition with every other channel, there is no coordinated effort to organize television programming in a manner that primarily suits the viewers.

Advertising has become equally annoying, with viewers being "forced" to watch television commercials for goods and services that are neither needed nor desired. As a result, consumers have become impatient and dissatisfied with today's television delivery systems. Equally problematic, these television delivery systems do not have the capabilities or features necessary to operate in the digital environment. Consequently, advances in digital technology call for a new television program delivery system that is capable of satisfying varying consumer and viewer needs.

Existing cable headends are unequipped for the transition to a digital system. These cable headends have no means for monitoring and controlling the large numbers of program signals and advertisements that will eventually be passed on to both consumers and viewers. These cable headends are unequipped to manage account and billing information for set top terminals without relying on telephone lines. In addition, these cable headends have no means for targeting advertisements to particular consumers and viewers.

What is needed is a network controller for a digital cable headend used in a television delivery system.

What is needed is a versatile network controller for a cable headend.

What is needed is a network controller for use in a cable headend that is capable of operating in both the digital and analog environment.

What is needed is certain components of a network controller for a digital cable headend used in a cable television delivery system.

What is needed is a network controller capable of controlling multiple video/audio program signals received by a cable headend from a satellite transponder.

What is needed is a network controller that can control the routing of both analog and digital video/audio program signals from cable headend to viewer homes.

What is needed is a network controller component for a cable headend that controls the combining the digital video/audio signals.

What is needed is a network controller that creates tiered programming by combining various digital video/audio signals.

What is needed is a network controller for a cable headend that accommodates different bandwidth availability between cable headend and certain viewer homes.

What is needed is a network controller capable of modifying program control information received from an external source.

What is needed is a network controller capable of targeting video to viewers.

What is needed is a network controller capable of targeting television commercials to specific consumers and viewers.

What is needed is a network controller capable of gathering information on programs watched by viewers.

What is needed is a better method of determining program ratings.

What is needed is a network controller capable of managing account and billing information.

The present invention is addressed to fulfill these needs.

SUMMARY OF INVENTION

The present invention is a network controller for a television delivery system. The network controller is the central component that provides monitoring and control of set top terminals in a television delivery system. The network controller is a component of a digital cable television delivery system. The network controller of the present invention provides much greater capability and flexibility than existing cable headend control equipment.

The network controller of the preferred embodiment performs all its cable network monitoring and control of set top terminals within the cable headend. The cable headend receives and processes digitally compressed program signals before the signals are relayed to each set top terminal. Each cable headend site is equipped with multiple satellite receiver dishes and a signal processor.

As an intermediary between the set top terminals and the program delivery system's operations center (or other remote site), the cable headend relies on the network controller to perform key cable system operations. In particular, the network controller accommodates regional programming needs by working with other cable headend components. The network controller also performs the system control functions for the cable system.

The primary function of the network controller is to manage the configuration of set top terminals and process signals received from the set top terminals. In the preferred embodiment, the network controller monitors, among other things, automatic poll-back responses from the set top terminals remotely located at each subscribers' home. The polling and automatic report-back cycle occurs frequently enough to allow the network controller to maintain accurate account and billing information as well as monitor authorized channel access.

In the simplest embodiment, information to be sent to the network controller will be stored in RAM within each subscriber's set top terminal and will be retrieved only upon polling by the network controller. Retrieval may, for example, occur on a daily, weekly or monthly basis. The network controller allows the system to maintain complete information on all programs watched using a particular set top terminal.

The network controller is also able to respond to the immediate needs of a set top terminal, or a group of set top terminals. The network controller can modify a program signal received from the program delivery system's operations center before the program signal is transmitted to the set top terminal. Therefore, the network controller enables the delivery system to adapt to the specific requirements of individual set top terminals when information on these requirements cannot be provided to the operations center in advance. In other words, the network controller is able to perform "on the fly programming" changes. With this capability, the network controller can handle sophisticated local programming needs such as interactive television services, split screen video, and selection of different foreign languages for the same video. In addition, the network controller controls and monitors all compressors and decompressors in the system.

The network controller makes use of a number of software routines that assist the network controller to perform its major functions. One of the major routines assists the network controller to modify the program control information so that changes and additions in programming and advertisements can be accommodated. Such changes and additions include set top terminal access authorizations and deauthorizations.

A set top terminal data gathering routine allows the network controller to schedule and perform polling of all set top terminals operating in the system. The software also provides the network controller with a means of processing status reports received from set top terminals in response to polling requests.

A video targeting routine makes use of a viewer's demographic information and viewing habits to determine those advertisements that are of most interest to that particular viewer. In so doing, the routine generates packages of advertisements targeted towards each viewer.

An additional routine correlates the programs accessed with pricing information to generate billing reports that can be sent to a given set top terminal over the cable distribution network. Aside from this routine, the network controller accommodates other methods of billing and account maintenance, such as through the use of remote billing sites.

The present invention is not only able to operate in the digital environment but also introduces many new features to television program delivery and cable headend control.

The present invention provides for several methods for targeting advertising to at least one subscriber. In one embodiment, programs watched data are gathered from a subscriber and then the programs watched data is analyzed to determine the frequency of programs watched by the subscriber. The analyzed programs watched data are correlated with categories of advertisements, such that each advertisement category includes at least one advertisement. An advertisement is then selected from the correlated categories and transmitted for display to the subscriber.

These and other objects and advantages of the invention will become obvious to those skilled in the art upon review of the following description, the attached drawings and appended claims.

DESCRIPTION OF THE DRAWINGS

FIG. 6b is a schematic of an alternative embodiment of FIG. 6a.

FIG. 10a is a diagram of the polling request message format.

FIG. 10b is a diagram of the polling response message format with an expanded view of the programs accessed block field.

FIG. 29 is a drawing of an alternative home menu.

FIGS. 30a, 30b, 30c, 30d, 30e, 30f and 30g are drawings of major menus.

FIGS. 35a, 35b, 35c, 33d, and 35e are drawings of submenus for interactive television services, Level A.

FIGS. 36a, 36b, 36c, 36d, and 36e are drawings of on-line service menus.

DETAILED DESCRIPTION OF THE PREFERRED EMBODIMENT

A. Television Program Delivery System Description

1. Introduction

Figure 1:
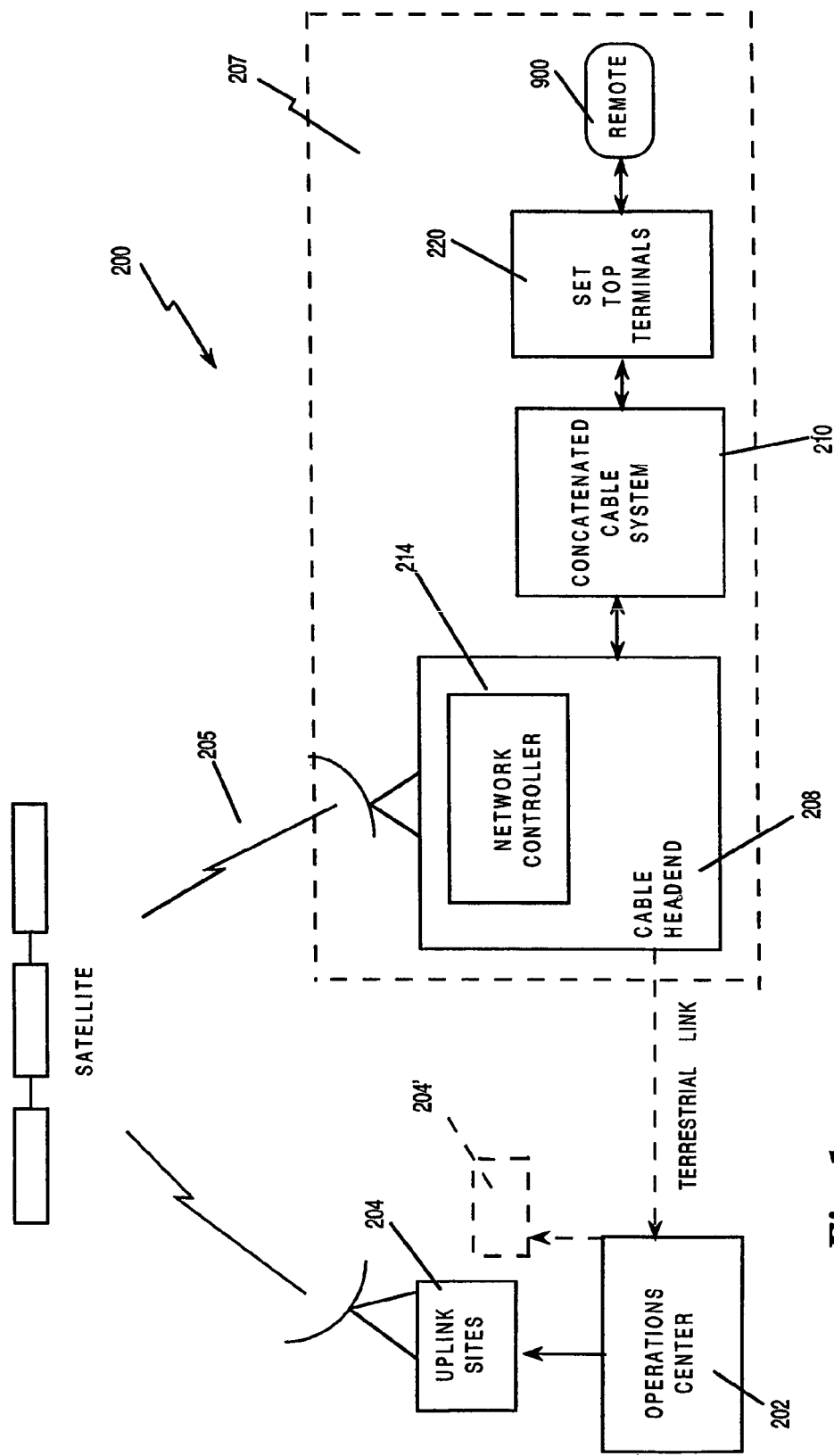
FIG. 1 is a diagram of the primary components of the television delivery system.

FIG. 1 shows the present invention as part of an expanded cable television program delivery system 200 that dramatically increases programming capacity using compressed transmission of television program signals. Developments in digital bandwidth compression technology now allow much greater throughput of television program signals over existing or slightly modified transmission media. The program delivery system 200 shown provides subscribers with a user friendly interface to operate and exploit a six-fold or more increase in current program delivery capability.

Subscribers are able to access an expanded television program package and view selected programs through a menu-driven access scheme that allows each subscriber to select individual programs by sequencing a series of menus. The menus are sequenced by the subscriber using simple alphanumeric and iconic character access or moving a cursor or highlight bar on the TV screen to access desired programs by simply pressing a single button, rather than recalling from memory and pressing the actual two or more digit numeric number assigned to a selection. Thus, with the press of a single button, the subscriber can advance from one menu to the next. In this fashion, the subscriber can sequence the menus and select a program from any given menu. The programs are grouped by category so that similar program offerings are found on the same menu.

2. Major System Components

In its most basic form, the system uses a program delivery system 200 in conjunction with a conventional concatenated cable television system 210. The program delivery system 200 generally includes (i) at least one operations center 202, where program packaging and control information are created and then assembled in the form of digital data, (ii) a digital compression system, where the digital data is compressed, combined/multiplexed, encoded, and mapped into digital signals for satellite transmission to the cable headend 208, and (iii) a set of in-home decompressors. The program delivery system 200 transports the digital signals to the cable headend 208 where the signals are transmitted through a concatenated cable television system 210. Within the cable headend 208, the received signals may be decoded, demultiplexed, managed by a local central distribution and switching mechanism, combined and then transmitted to the set top terminal 220 located in each subscriber's home over the cable system 210. Although concatenated cable systems 210 are the most prevalent transmission media to the home, telephone lines, cellular networks, fiberoptics, Personal Communication Networks and similar technology for transmitting to the home can be used interchangeably with this program delivery system 200.

The delivery system 200 has a reception region 207 with an in-home decompression capability. This capability is performed by a decompressor housed within a set top terminal 220 in each subscriber's home. The decompressor remains transparent from the subscriber's point of view and allows any of the compressed signals to be demultiplexed and individually extracted from the composite data stream and then individually decompressed upon selection by the subscriber. The decompressed video signals are converted into analog signals for television display. Such analog signals include NTSC formatted signals for use by a standard television. Control signals are likewise extracted and decompressed and then either executed immediately or placed in local storage such as a RAM. Multiple sets of decompression hardware may be used to decompress video and control signals. The set top terminal 220 may then overlay or combine different signals to form the desired display on the subscriber's television. Graphics on video or picture-on-picture are examples of such a display.

Although a single digital compression standard (e.g., MPEG) may be used for both the program delivery system 200 and the concatenated cable system 210, the compression technique used may differ between the two systems. When the compression standards differ between the two media, the signals received by the cable headend 208 must be decompressed before transmission from the headend 208 to the set top terminals 220. Subsequently, the cable headend 208 must recompress and transmit the signals to the set top terminal 220, which would then decompress the signals using a specific decompression algorithm.

The video signals and program control signals received by the set top terminal 220 correspond to specific television programs and menu selections that each subscriber may access through a subscriber interface. The subscriber interface is a device with buttons located on the set top terminal 220 or on a portable remote control 900. In the preferred system embodiment, the subscriber interface is a combined alpha-character, numeric and iconic remote control device 900, which provides direct or menu-driven program access. The preferred subscriber interface also contains cursor movement and go buttons as well as alpha, numeric and iconic buttons. This subscriber interface and menu arrangement enables the subscriber to sequence through menus by choosing from among several menu options that are displayed on the television screen. In addition, a user may bypass several menu screens and immediately choose a program by selecting the appropriate alpha-character, numeric or iconic combinations on the subscriber interface. In the preferred embodiment, the set top terminal 220 generates the menus that are displayed on the television by creating arrays of particular menu templates, and the set top terminal 220 displays a specific menu or submenu option for each available video signal.

3. Operations Center and Digital Compression System

Figure 2:
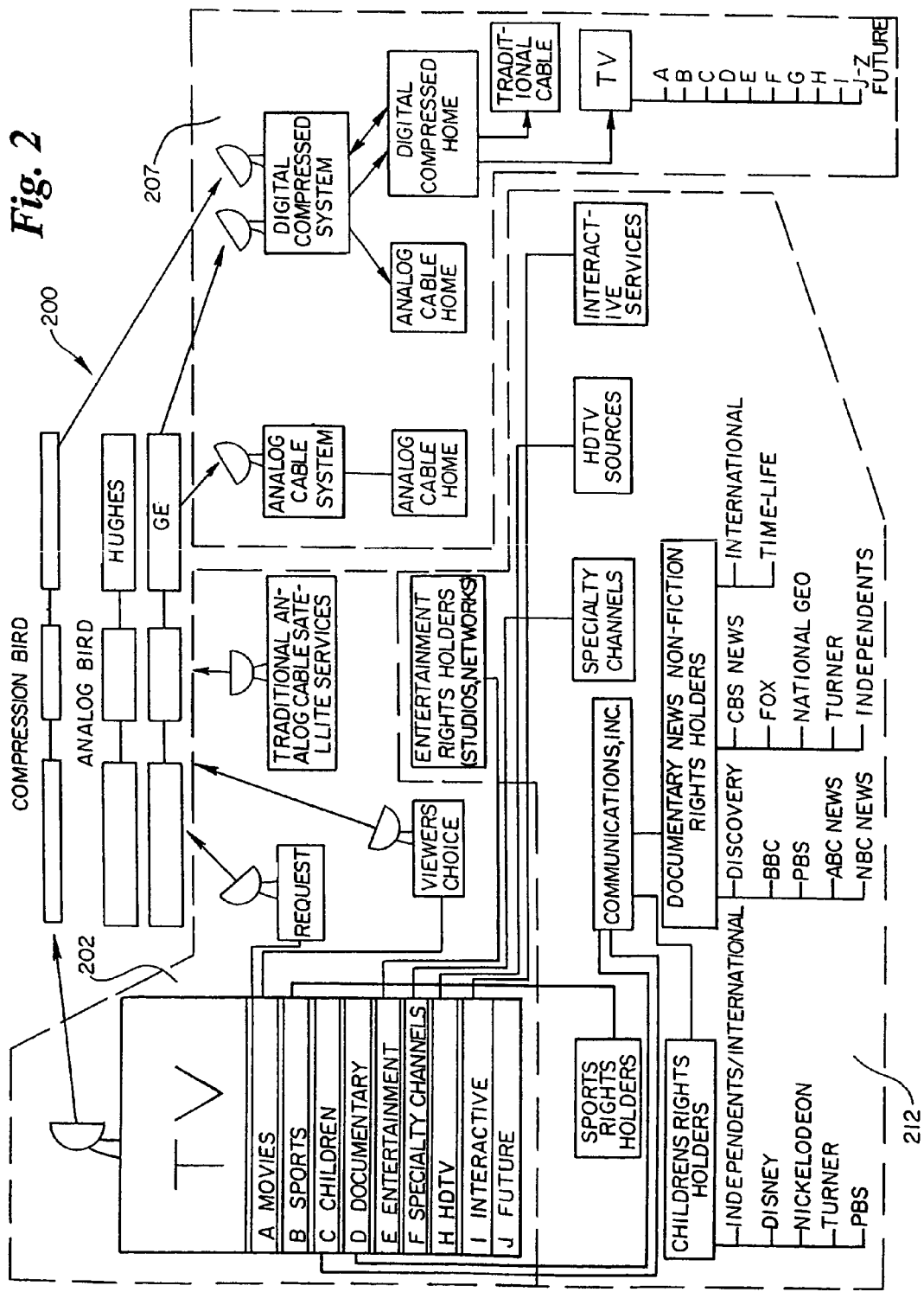
FIG. 2 is an overview of the television delivery system operations.

The operations center 202 performs two primary services, packaging television programs and generating the program control information signal. At the operations center 202, television programs are received from external program sources in both analog and digital form. FIG. 2 shows an embodiment of the operations center receiving signals from various external sources 212. Examples of the external program sources are sporting events, children's programs, specialty channels, news or any other program source that can provide audio or visual signals. Once the programs are received from the external program sources, the operations center 202 digitizes (and preferably compresses) any program signals received in analog form. The operations center 202 may also maintain an internal storage of programs. The internally stored programs may be in analog or digital form and stored on permanent or volatile memory sources, including magnetic tape or RAM. Subsequent to receiving programming, the operations center 202 packages the programs into the groups and categories which provide the optimal marketing of the programs to subscribers. For example, the operations center 202 may package the same programs into different categories and menus for weekday, prime-time viewing and Saturday afternoon viewing. Also, the operations center 202 packages the television programs in a manner that enables both the various menus to easily represent the programs and the subscribers to easily access the programs through the menus.

The packaging of the digital signals is typically performed at the operations center 202 by computer assisted packaging equipment (CAP). The CAP system normally includes at least one computer monitor, keyboard, mouse, and standard video editing equipment. A programmer packages the signals by entering certain information into the CAP. This information includes the date, time slot, and program category of the various programs. The programmer and the CAP utilize demographic data and ratings in performing the packaging tasks.

Figure 2A:
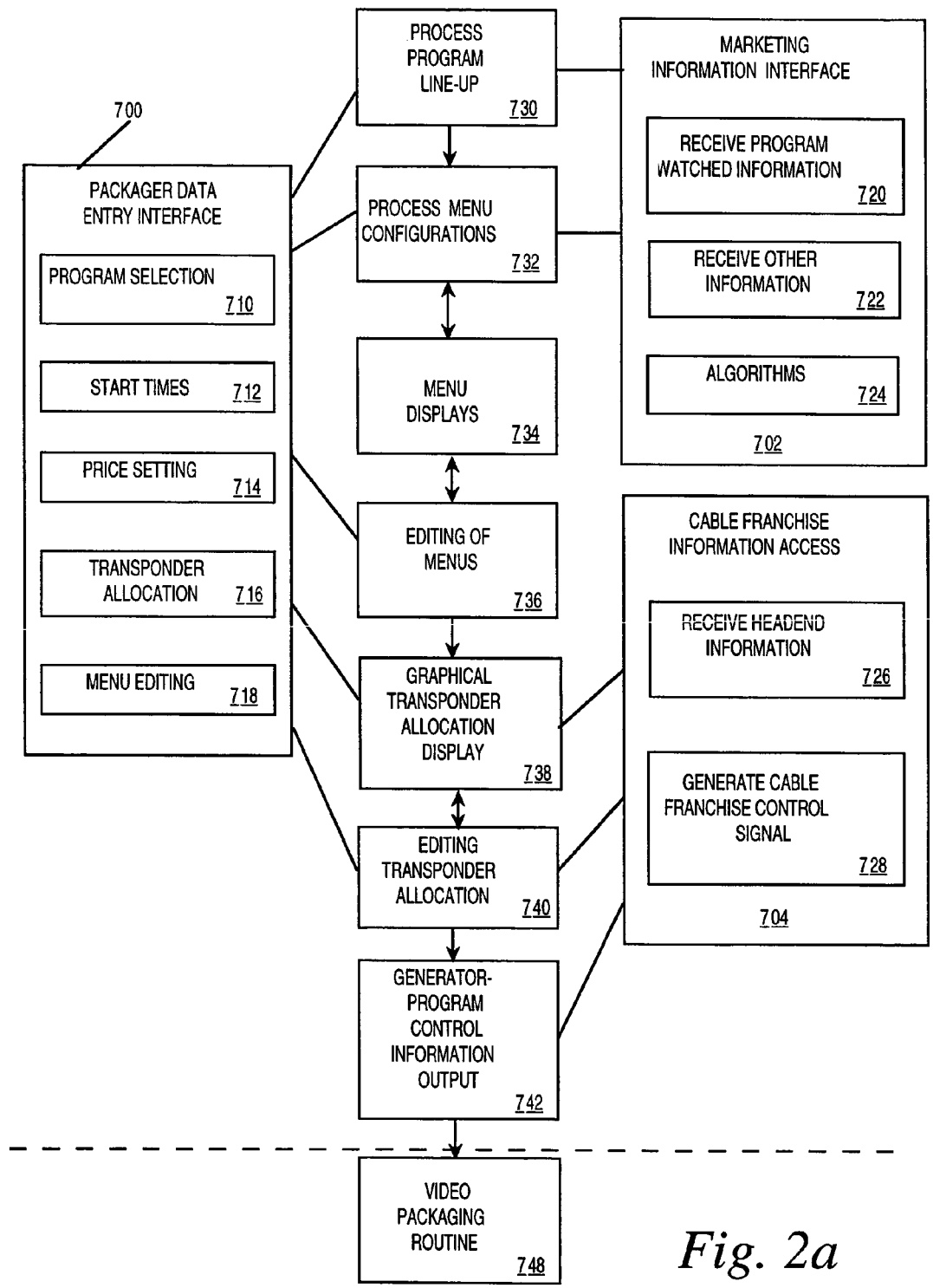
FIG. 2A is a schematic of a marketing information interface.

Extracts of customer purchases will be provided to the Operations Center 202. These extracts of information will be formatted and correlated with customer demographics for marketing purposes by the Marketing Information Interface (MII) 702. The MII 702 is shown in FIG. 2a. The Marketing Information Interface (MII) 702 subroutine interfaces the processing and editing subroutines with marketing data. This interface regularly receives programs watched information from billing sites 720, cable headends 208, or set top terminals 220. In addition, other marketing information 722 such as the demographics of viewers during certain time periods may be received by the MII 702. The MII 702 also uses algorithms 724 to analyze the program watched information and marketing data 720, 722, and provides the analyzed information to the processing and editing subroutines.

The process program line-up subroutine 730 uses information from the MII 704 and Packager Data Entry Interface (PDEI) 700 to develop a program line-up. Algorithms are used to assign programs in time slots.

The operations center 202 may also "insert" directions for filling local available program time in the packaged signal to enable local cable and television companies to fill the program time with local advertising and/or local programming. Consequently, the local cable headends are not constrained to show only programs transmitted from the operations center 202.

After the programmer selects the various programs from a pool of available programs and inputs the requisite information, the programmer, with assistance from the CAP, can select the price and allocate transponder space for the various programs. After the process is complete, the CAP displays draft menus or program schedules that correspond to the entries of the programmer. The CAP may also graphically display allocation of transponder space. The programmer may edit the menus and transponder allocation several times until satisfied with the programming schedule. During the editing, the programmer may direct the exact location of any program name on a menu with simple commands to the CAP.

The packaging process also accounts for any groupings by satellite transponder which are necessary. The operations center 202 may send different groups of programs to different cable headends 208 and/or set top terminals 220. One way the operations center 202 may accomplish this task is to send different program packages to each transponder. Each transponder, or set of transponders, then relays a specific program package to specific cable headends 208 and/or set top terminals 220. The allocation of transponder space is an important task performed by the operations center 202.

The operations center 202 may also "insert" directions for filling local available program time in the packaged signal to enable local cable and television companies to fill the program time with local advertising and/or local programming. Consequently, the local cable headends 208 are not constrained to show only programs transmitted from the operations center 202. New set top converters will incorporate both digital and analog channels. Therefore, the cable headend 208 may combine analog signals with the digital signals prior to transmitting the program signals to the set top terminals 220.

After the CAP packages the programs, it creates a program control information signal to be delivered with the program package to the cable headend 208 and/or set top terminal 220. The program control information signal contains a description of the contents of the program package, commands to be sent to the cable headend 208 and/or set top terminal 220, and other information relevant to the signal transmission.

In addition to packaging the signal, the operations center 202 employs digital compression techniques to increase existing satellite transponder capacity by at least a 4:1 ratio, resulting in a four-fold increase in program delivery capability. A number of digital compression algorithms currently exist which can achieve the resultant increase in capacity and improved signal quality desired for the system. The algorithms generally use one or more of three basic digital compression techniques: (1) within-frame (intraframe) compression, (2) frame-to-frame (interframe) compression, and (3) within carrier compression. Specifically, in the preferred embodiment, the MPEG 2 compression method is used. After digital compression, the signals are combined (multiplexed) and encoded. The combined signal is subsequently transmitted to various uplink sites 204.

There may be a single uplink site 204 or multiple uplink sites (represented by 204', shown in phantom in FIG. 1) for each operation center 202. The uplink sites 204 may either be located in the same geographical place or may be located remotely from the operations center 202. Once the composite signal is transmitted to the uplink sites 204, the signal may be multiplexed with other signals, modulated, upconverted and amplified for transmission over satellite. Multiple cable headends 208 may receive such transmissions.

In addition to multiple uplinks, the delivery system 200 may also contain multiple operations centers. The preferred method for using multiple operations centers is to designate one of the operations centers as a master operations center and to designate the remaining operations centers as slave operations centers. In this configuration, the master operations center coordinates various functions among the slave operations centers such as synchronization of simultaneous transmissions and distributes the operations workload efficiently.

4. Cable Headend

After the operations center 202 has compressed and encoded the program signals and transmitted the signals to the satellite, the cable headend 208 receives and further processes the signals before they are relayed to each set top terminal 220. Each cable headend site is generally equipped with multiple satellite receiver dishes. Each dish is capable of handling multiple transponder signals from a single satellite and sometimes from multiple satellites.

As an intermediary between the set top terminals 220 and the operations center 202 (or other remote site), the cable headend 208 performs two primary functions. First, the cable headend 208 acts as a distribution center, or signal processor, by relaying the program signal to the set top terminal 220 in each subscriber's home. In addition, the cable headend 208 acts as a network controller 214 by receiving information from each set top terminal 220 and passing such information on to an information gathering site such as the operations center 202.

Figure 3:
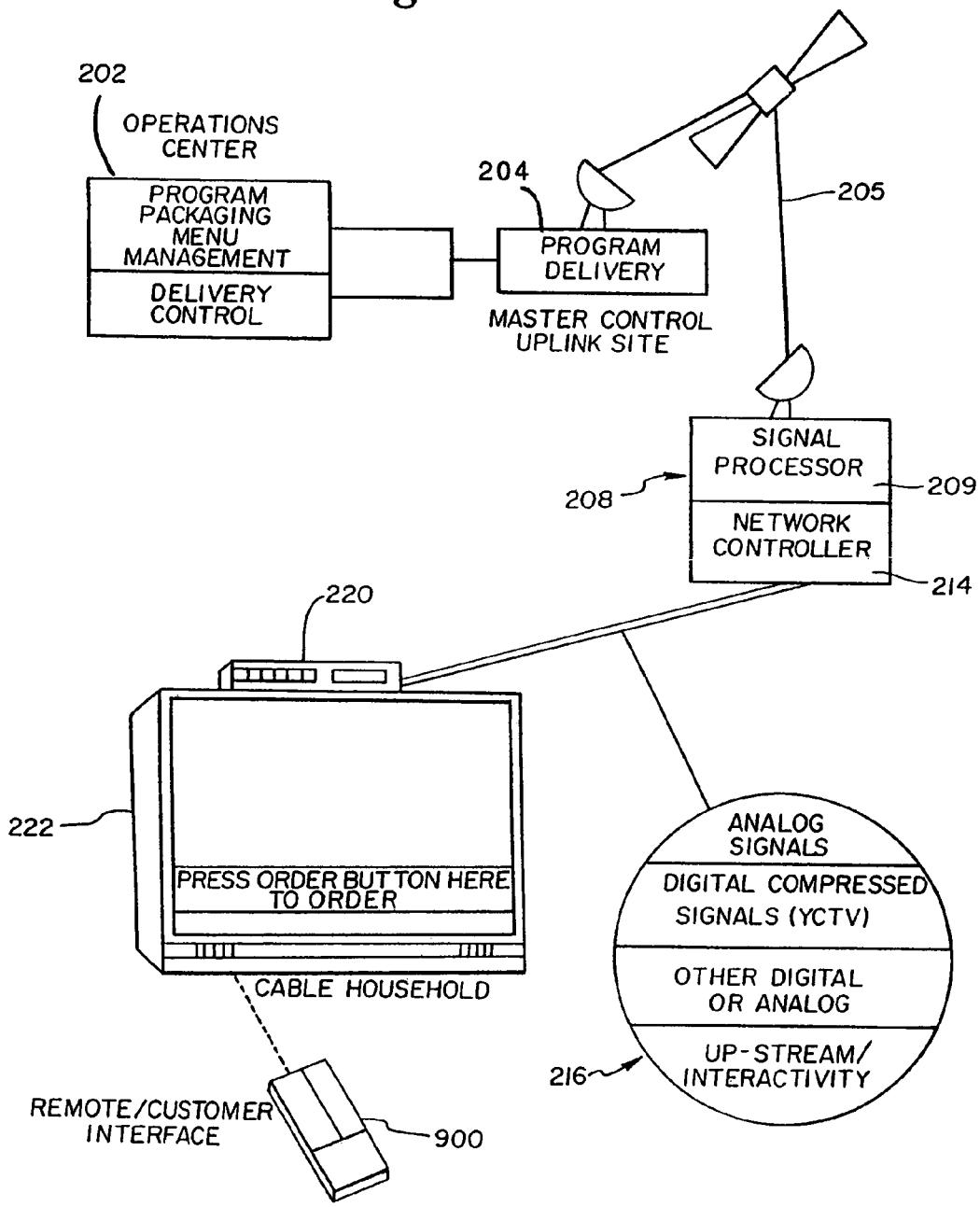
FIG. 3 is a schematic of the operation of the primary components of the system.

FIG. 3 shows an embodiment where the cable headend 208 and the subscriber's home are linked by certain communications media 216. In this particular embodiment, analog signals, digitally compressed signals, other digital signals and up-stream/interactivity signals are sent and received over the media 216. The cable headend 208 provides such signaling capabilities in its dual roles as a signal processor 209 and network controller 214.

As a signal processor 209, the cable headend 208 prepares the program signals that are received by the cable headend 208 for transmission to each set top terminal 220. In the preferred system, the signal processor 209 re-routes or demultiplexes and recombines the signals and digital information received from the operations center 202 and allocates different portions of the signal to different frequency ranges. Cable headends 208 which offer different subscribers different program offerings may allocate the program signals from the operations center 202 in various manners to accommodate different viewers. The signal processor 209 may also incorporate local programming and/or local advertisements into the program signal and forward the revised signal to the set top terminals 220. To accommodate this local programming availability, the signal processor 209 must combine the local signal in digital or analog form with the operations center program signals. If the local cable system uses a compression standard that is different than the one used by the operations center 202, the signal processor 209 must also decompress and recompress incoming signals so they may be properly formatted for transmission to the set top terminals 220. This process becomes less important as standards develop (i.e., MPEG 2). In addition, the signal processor 209 performs any necessary signal decryption and/or encryption.

As a network controller 214, the cable headend 208 performs the system control functions for the system. The primary function of the network controller 214 is to manage the configuration of the set top terminals 220 and process signals received from the set top terminals 220. In the preferred embodiment, the network controller 214 monitors, among other things, automatic poll-back responses from the set top terminals 220 remotely located at each subscribers' home. The polling and automatic report-back cycle occurs frequently enough to allow the network controller 214 to maintain accurate account and billing information as well as monitor authorized channel access. In the simplest embodiment, information to be sent to the network controller 214 will be stored in RAM within each subscriber's set top terminal 220 and will be retrieved only upon polling by the network controller 214. Retrieval may, for example, occur on a daily, weekly or monthly basis. The network controller 214 allows the system to maintain complete information on all programs watched using a particular set top terminal 220.

The network controller 214 is also able to respond to the immediate needs of a set top terminal 220 by modifying a program control information signal received from the operations center 202. Therefore, the network controller 214 enables the delivery system to adapt to the specific requirements of individual set top terminals 220 when the requirements cannot be provided to the operations center 202 in advance. In other words, the network controller 214 is able to perform "on the fly programming" changes. With this capability, the network controller 214 can handle sophisticated local programming needs such as, for example, interactive television services, split screen video, and selection of different foreign languages for the same video. In addition, the network controller 214 controls and monitors all compressors and decompressors in the system.

The delivery system 200 and digital compression of the preferred embodiment provides a one-way path from the operations center 202 to the cable headend 208. Status and billing information is sent from the set top terminal 220 to the network controller 214 at the cable headend 208 and not directly to the operations center 202. Thus, program monitoring and selection control will take place only at the cable headend 208 by the local cable company and its decentralized network controllers 214 (i.e., decentralized relative to the operations center 202, which is central to the program delivery system 200). The local cable company will in turn be in communication with the operations center 202 or a regional control center (not shown) which accumulates return data from the set top terminal 220 for statistical or billing purposes. In alternative system embodiments, the operations center 202 and the statistical and billing sites are collocated. Further, telephone lines with modems are used to transfer information from the set top terminal 220 to the statistical and billing sites.

5. Set Top Terminal

The set top terminal 220 is the portion of the delivery system 200 that resides in the home of a subscriber. The set top terminal 220 is usually located above or below the subscriber's television, but it may be placed anywhere in or near the subscriber's home as long as it is within the range of the subscriber's remote control device 900. In some aspects, the set top terminal 220 may resemble converter boxes already used by many cable systems. For instance, each set top terminal 220 may include a variety of error detection, decryption, and coding techniques such as anti-taping encoding. However, it will become apparent from the discussion below that the set top terminal 220 is able to perform many functions that an ordinary converter box cannot perform.

The set top terminal 220 has a plurality of input and output ports to enable it to communicate with other local and remote devices. The set top terminal 220 has an input port that receives information from the cable headend 208. In addition, the unit has at least two output ports which provide communications from the set top terminal 220 to a television and a VCR. Certain menu selections may cause the set top terminal 220 to send control signals directly to the VCR to automatically program or operate the VCR. Also, the set top terminal 220 contains a phone jack which can be used for maintenance, trouble shooting, reprogramming and additional customer features. The set top terminal 220 may also contain stereo/audio output terminals and a satellite dish input port.

Functionally, the set top terminal 220 is the last component in the delivery system chain. The set top terminal 220 receives compressed program and control signals from the cable headend 208 (or, in some cases, directly from the operations center 202). After the set top terminal 220 receives the individually compressed program and control signals, the signals are demultiplexed, decompressed, converted to analog signals (if necessary) and either placed in local storage (from which the menu template may be created), executed immediately, or sent directly to the television screen.

After processing certain signals received from the cable headend 208, the set top terminal 220 is able to store menu templates for creating menus that are displayed on a subscriber's television by using an array of menu templates. Before a menu can be constructed, menu templates must be created and sent to the set top terminal 220 for storage. A microprocessor uses the control signals received from the operations center 202 or cable headend 208 to generate the menu templates for storage. Each menu template may be stored in volatile memory in the set top terminal 220. When the set top terminal receives template information it demultiplexes the program control signals received from the cable headend 208 into four primary parts: video, graphics, program logic and text. Each menu template represents a different portion of a whole menu, such as a menu background, television logo, cursor highlight overlay, or other miscellaneous components needed to build a menu. The menu templates may be deleted or altered using control signals received from the operations center 202 or cable headend 208.

Once the menu templates have been stored in memory, the set top terminal 220 can generate the appropriate menus. In the preferred embodiment, the basic menu format information is stored in memory located within the set top terminal 220 so that the microprocessor may locally access the information from the set top terminal instead of from an incoming signal. The microprocessor next generates the appropriate menus from the menu templates and the other menu information stored in memory. The set top terminal 220 then displays specific menus on the subscriber's television screen that correspond to the inputs the subscriber selects.

If the subscriber selects a specific program from a menu, the set top terminal 220 determines on which channel the program is being shown, demultiplexes and extracts the single channel transmitted from the cable headend 208. The set top terminal 220 then decompresses the channel and, if necessary, converts the program signal to an analog NTSC signal to enable the subscriber to view the selected program. The set top terminal 220 can be equipped to decompress more than one program signal, but this would unnecessarily add to the cost of the unit since a subscriber will generally only view one program at a time. However, two or three decompressors may be desirable to provide picture-on-picture capability, control signal decompression, enhanced channel switching or like features.

In addition to menu information, the set top terminal 220 may also store text transmitted from the cable headend 208 or the operations center 202. The text may inform the subscriber about upcoming events, billing and account status, new subscriptions, or other relevant information. The text will be stored in an appropriate memory location depending on the frequency and the duration of the use of the textual message.

Also, optional upgrades are available to enhance the performance of a subscriber's set top terminal 220. These upgrades may consist of a cartridge or computer card (not shown) that is inserted into an expansion slot in the set top terminal 220 or may consist of a feature offered by the cable headend 208 or operations center 202 to which the user may subscribe. Available upgrades may include on line data base services, interactive multi-media services, access to digital radio channels, and other services.

In the simplest embodiment, available converter boxes such as those manufactured by General Instruments or Scientific Atlanta, may be modified and upgraded to perform the functions of a set top terminal 220. The preferred upgrade is a circuit card with a microprocessor which is electronically connected to or inserted into the converter box.

6. Remote Control Device

The primary conduit for communication between the subscriber and the set top terminal 220 is through the subscriber interface, preferably a remote control device 900. Through this interface, the subscriber may select desired programming through the system's menu-driven scheme or by directly accessing a specific channel by entering the actual channel number. Using the interface, the subscriber can navigate through a series of informative program selection menus. By using menu-driven, iconic or alpha-character access, the subscriber can access desired programs by simply pressing a single button rather than recalling from memory and pressing the actual channel number to make a selection. The subscriber can access regular broadcast and basic cable television stations by using either the numeric keys on the remote control 900 (pressing the corresponding channel number), or one of the menu icon selection options.

In addition to enabling the subscriber to easily interact with the cable system 200, the physical characteristics of the subscriber interface 900 should also add to the user friendliness of the system. The remote control 900 should easily fit in the palm of the user's hand. The buttons of the preferred remote control 900 contain pictorial symbols that are easily identifiable by the subscriber. Also, buttons that perform similar functions may be color coordinated and consist of distinguishing textures to increase the user friendliness of the system.

7. Menu-Driven Program Selection

The menu-driven scheme provides the subscriber with one-step access to all major menus, ranging from hit movies to sport specials to specialty programs. From any of the major menus, the subscriber can in turn access submenus and minor menus by cursor or alpha-character access.

There are two different types of menus utilized by the preferred embodiment, the Program Selection menus and the During Program menus. The first series of menus, Program Selection menus, consists of an Introductory, a Home, Major menus, and Submenus. The second series of menus, During Program menus, consists of two primary types, Hidden menus and the Program Overlay menus.

Immediately after the subscriber turns on the set top terminal 220, the Introductory menu welcomes the subscriber to the system. The Introductory menu may display important announcements from the local cable franchise, advertisements from the cable provider, or other types of messages. In addition, the Introductory menu can inform the subscriber if the cable headend 208 has sent a personal message to the subscriber's particular set top terminal 220.

After the Introductory menu has been displayed the subscriber may advance to the next level of menus, namely the Home menu. In the preferred embodiment, after a certain period of time, the cable system will advance the subscriber by default to the Home menu. From the Home menu, the subscriber is able to access all of the programming options. The subscriber may either select a program directly by entering the appropriate channel number from the remote control 900, or the subscriber may sequence through incremental levels of menu options starting from the Home menu. The Home menu lists categories that correspond to the first level of menus called Major menus.

If the subscriber chooses to sequence through subsequent menus, the subscriber will be forwarded to the Major menu that corresponds to the chosen category from the Home menu. The Major menus further refine a subscriber's search and help guide the subscriber to the selection of his choice.

From the Major menus, the subscriber may access several submenus. From each submenu, the subscriber may access other submenus until the subscriber finds a desired television program. Similar to the Major menu, each successive level of Submenus further refines the subscriber's search. The system also enables the subscriber to skip certain menus or submenus and directly access a specific menu or television program by entering the appropriate commands on the remote control 900.

The During program menus (including Hidden Menus and Program Overlay Menus) are displayed by the set top terminal 220 only after the subscriber has selected a television program. In order to avoid disturbing the subscriber, the set top terminal 220 does not display the Hidden Menus until the subscriber selects the appropriate option to display a Hidden Menu. The Hidden Menus contain options that are relevant to the program selected by the viewer. For example, a Hidden Menu may contain options that enable a subscriber to enter an interactive mode or escape from the selected program.

Program Overlay Menus are similar to Hidden Menus because they occur during a program and are related to the program being viewed. However, the Program Overlay Menus are displayed concurrently with the program selected by the subscriber. Most Program Overlay Menus are small enough on the screen to allow the subscriber to continue viewing the selected program comfortably.

B. Network Controller Description

1. Monitoring and Control of Set Top Terminals

Figure 4:
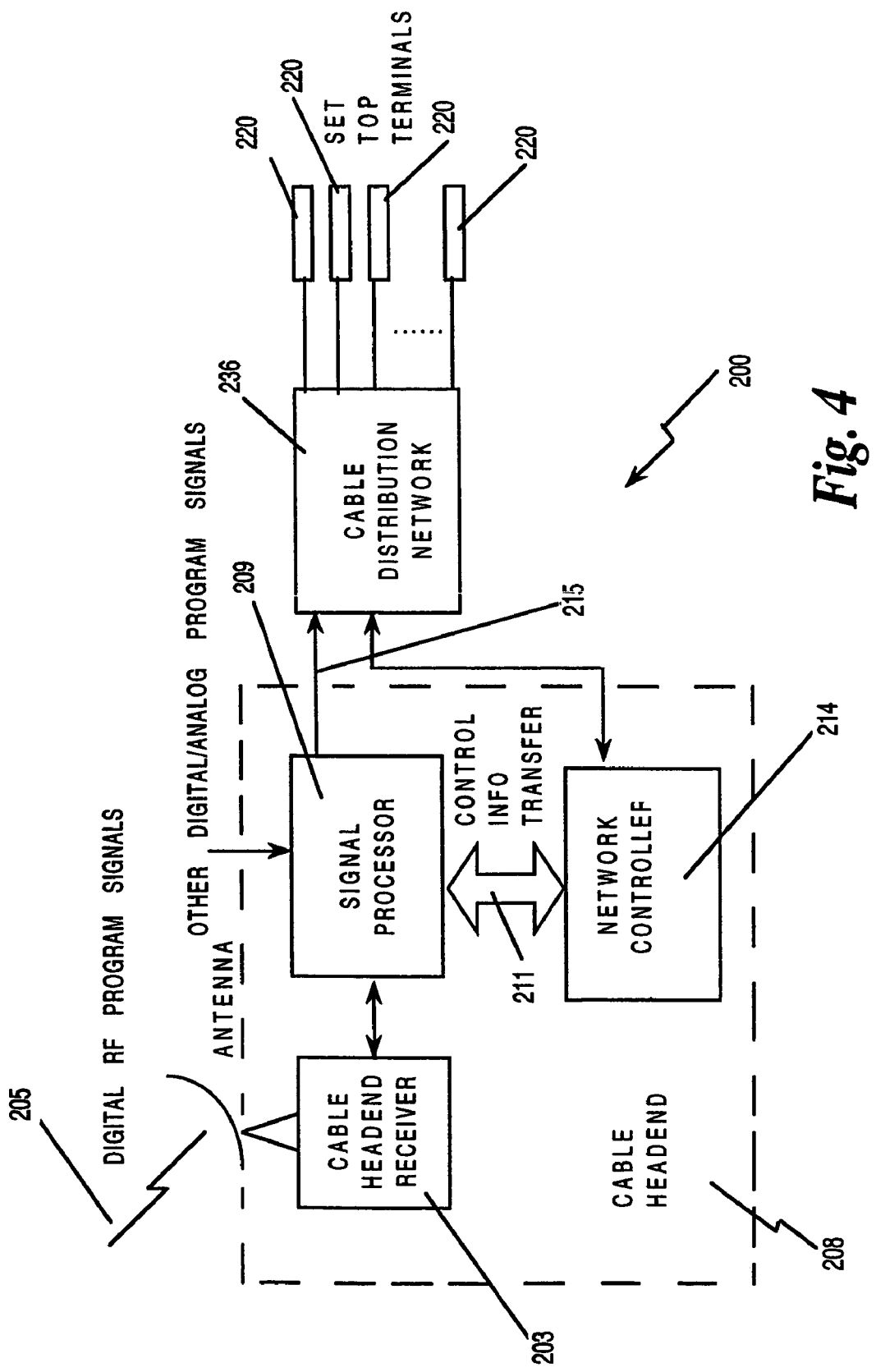
FIG. 4 is a diagram of the primary components of the cable headend.

FIG. 4 shows the network controller 214 of the present invention as part of a digital cable headend 208 operating in an expanded cable television program delivery system, indicated generally at 200. The network controller 214 monitors program selections at subscribers' homes, maintains accurate account and billing information and authorizes both subscriber channel access and particular set top terminals 220 to operate in the system.

The network controller 214 performs its monitoring and control capability by working with other system components housed, in part, within the cable headend 208. These cable headend components include a cable headend receiver 203 and a signal processor 209. As shown in the FIG. 4, digital RF program signals 205 are received and processed for further distribution to a subscriber's home through a set top terminal 220. The program signals 205 are digitally compressed and multiplexed signals that may be processed at the cable headend 208 or simply passed through to the cable distribution network. In the embodiment shown in FIG. 4, the program signals 205 are received by the cable headend receiver 203 and transmitted to the signal processor 209.

The signal processor 209 prepares the program signals 205 that are received by the cable headend 208 for transmission to each set top terminal 220. In the preferred system, the network controller 214 supervises and, in some cases, instructs the signal processor 209 in routing the signals to subscribers. In this way, the network controller 214 and signal processor 209 work with one another to perform basic control functions in the cable television system 200. Typically, this work is accomplished by the transfer of control information, represented at 211, between the network controller 214 and the signal processor 209.

Although it is preferred that the signal processor 209 and network controller 214 be co-located at the cable headend 208, the network controller 214 may be remotely located from the cable headend 208, as long as it remains in communication with the signal processor 209 in order to exchange control information 211.

In many instances, the program signals 205 received from the operations center 202 must be modified prior to being sent to the set top terminals 220. These modifications to the program control information 211 are made by the network controller 214 working in conjunction with the signal processor 209 to send a set top terminal control information stream (STTCIS). From the signal processor 209, the network controller 214 receives the program signals 205, which include cable franchise specific information added by the operations center 202. The network controller 214 modifies the program signals 205, if necessary, and communicates the new information back to the signal processor 209. The signal processor 209 then forwards the information to the set top terminal 220 in the form of the STTCIS, arrow 215. In most instances, the network controller 214 will modify the program signals 205 by adding additional information; however, the program signals 205 can be passed through the cable headend 208 to the set top terminal 220 without any modification.

The signal processor 209 and network controller 214 are both capable of handling the addition of simple local availabilities (e.g., local advertisements) into the signal sent to the set top terminal 220. The network controller 214 is also capable of handling more sophisticated local programming needs such as targeting video commercials, infomercials, interactive programming and certain data services. The network controller 214 receives all electronic signals sent by the set top terminal 220, including those sent in response to interactive service requests and some data service requests. The network controller 214 coordinates the necessary switching and access to allow the subscriber to enjoy these services.

The network controller 214 has the capability of performing "on the fly programming" changes, assisting in (i) masking portions of subscriber's television screens (split screen video), (ii) selecting different audio signals for the same video (foreign languages), and (iii) interactive features. In addition, the network controller can create programming changes. For last minute changes to programming (such as for a local emergency or important regional events), an operator using the network controller 214 can modify the program signals 209 "on the fly" and change menus available to the subscriber. This accommodates short notice changes to program packaging that cannot be handled by the operations center 202 in advance.

In order to accommodate split screen techniques for promo and demo video (which will be described later), undesired video portions of the television or menu screen may be masked. The network controller 214 can send the necessary control information to inform the set top terminal 220 to mask portions of a specific channel's video. For example, a video channel with a split screen showing four separate videos would require a three-fourths mask to focus the viewer on the featured video clip.

Tiered programming allows different users to view different video even though they are "tuned" to the same channel. For example, the network controller 214 may know the demographics of its subscribers through a database generated, in part, from prior subscriber choices, an interactive selection, or other means. Using the demographics information, the network controller 214 may target commercials to the correct audience by showing different commercials to subscriber's with different demographics. Information on programs watched may also be used to target commercials. Even though subscribers will believe they are "tuned" to one channel, they will be switched to a different channel for the tiered video and targeted commercial. Alternatively, individual subscribers may be offered a menu with the option of several commercials from which to choose.

To accommodate foreign speaking subscribers, multiple audio channels for television programming may be provided. The subscriber may be shown menus of programs available in the subscriber's native language. The function of choosing the correct audio to correspond to the selected language may be handled by either the set top terminal 220 or the network controller 214 depending upon the configuration. Local programming in several languages or additional audio channels for a foreign language translation of a popular television program may be provided by the network controller 214. Using a picture-on-picture feature, sign language may be similarly made available to certain set top terminals 220 for the deaf. The sign language video may be transmitted to the set top terminal 220 on a separate channel. Also, a text overlay for the deaf may be easily produced on the lower part of the screen. The control signals for producing the text overlay may be handled by the network controller 214.

In other embodiments, the network controller 214 can act as a central computer and provide intra-set top terminal interactive games, inter-set top terminal interactive games, computer bulletin board type services, message services (Electronic mail), etc. For example, a subscriber may play war games with six of his (anonymous) fellow subscribers each in their own home each operating a separate tank. The network controller 214 gathers the players using set top terminal 220 communications and acts as the referee. The network controller software "plays" the game and generates the video control signals to be transmitted to the set top terminals 220. From the video control signals, the set top terminal generates a view of the playing field and shows movement of the tanks. Using a similar method, a bulletin board or message system can be set up to discuss a particular program such as "Twin Peaks Whodunit" for enthusiasts with set top terminals 220.

2. Monitoring and Control of Cable Headend Signal Processor

Figure 5:
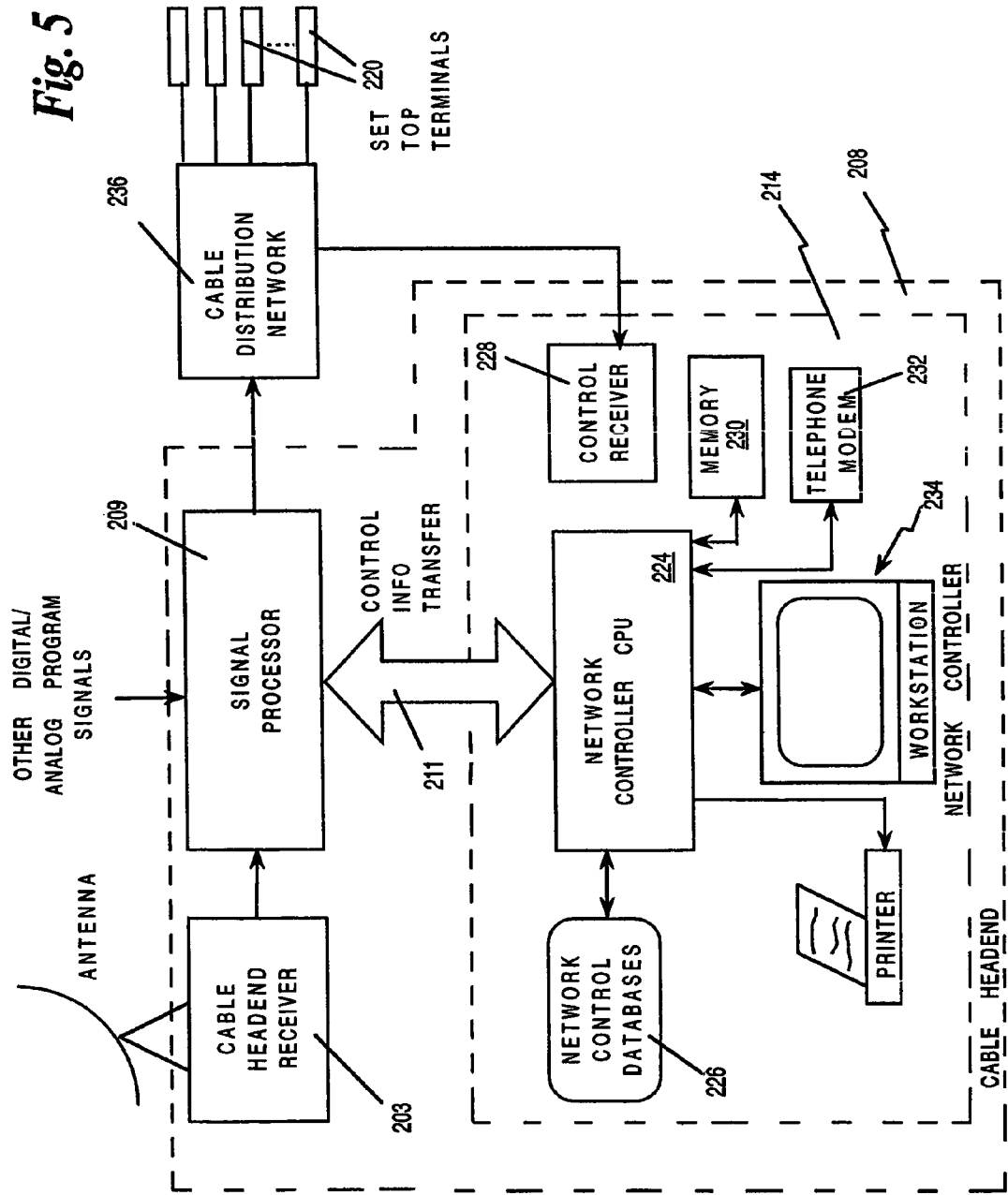
FIG. 5 is a diagram of the cable headend showing the primary components of the network controller.

FIG. 5 shows the network controller's major components and how these components relate with other components of the cable system 200. The network controller's internal components include a network controller CPU 224, databases 226, control receiver 228, local memory 230 and telephone modem 232. The network controller's CPU 224 and databases 226 may be accessed through an operator control station, which may include peripherals such as a computer workstation, CRT display, and printer, represented by the workstation 234.

Information required to operate the network controller 214 will be stored in databases 226 and local memory 230 (e.g., either in RAM, ROM, or magnetic or optical Read/Write devices) at the cable headend 208 as well as in memory (RAM and/or ROM) within each subscriber's set top terminal 220. In the preferred embodiment, two-way communications between the network controller 214 and set top terminal 220 will occur over cable lines. Many other methods of communication, including those which do not require cables or wires, may be used with the present invention. Using two-way communication, interactive television programming can be accommodated through the network controller 214. In addition, the preferred network controller 214 will be able to access set top terminals 220 via phone lines for trouble shooting, special features or sophisticated reprogramming.

The network controller CPU 224 controls the interface, depicted at 211, between the network controller 214 and the signal processor 209. This interface 211 allows control information to flow or transfer between the two cable headend 208 components. Standard RS-232 or RS-422 links, an IEEE-488 bus or other interface media may be used. During standard operation, program control information is passed through this interface 211 to the network controller CPU 224 from the signal processor 209 (i.e., the program control information having been sent to the signal processor 209 over satellite from the operations center 202 with the RF program signals 205, not shown in FIG. 5). The network controller CPU 224 processes the program control information based on data stored in the network control databases. This processing includes modifying the program control information to accommodate regional programming needs.

After processing, the network controller CPU 224 passes the program control information, including any modifications, back to the signal processor 209 for distribution over the cable system 200, via the cable distribution network 236. In this fashion, the network controller 214 provides programming and network control instructions to the set top terminals 220 through the signal processor 209.

The processing of program control information by the network controller CPU 224 can also make use of any data received by the network controller's control receiver 228. The control receiver 228 is a microprocessor-based device that receives "status reports" directly from the set top terminals 220. The status reports received by the control receiver 228 generally include information that allows the network controller 214 to track, among other things, a subscriber's program access history, as described below. The control receiver 228 can store the status reports internally in a local storage or memory device and transfer them to the network controller CPU 224. Typically, the control receiver 228 is interfaced with the network controller CPU 224 using standard RS-232 or RS-422 links, an IEEE-488 bus or the like.

In the preferred embodiment, the network controller CPU 224 scans the control receiver 228 at a predetermined rate (e.g., once every few seconds) to initiate the status report transfer. Upon transfer, the network controller CPU 224 adds the data and control information in the status reports to the network control databases 226 by: checking for changes in previously received status information, processing the new information and updating the corresponding parameters in the network control databases 226. The network controller 214 processes the information stored in its databases with any program control information relayed through the signal processor 209 from the delivery system's operations center 202. This processing capability allows the network controller 214 to modify prior control signals and create new ones. The network controller 214 transfers both modified and unmodified control signals, along with any local combined program signals 205, to the signal processor 209 to be combined with others program signals 205 for distribution over the cable system 200.

3. Modifying the Program Control Information Signal

Tables A-C, described below, provide an example of some information that can be sent in the program control information signal to the set top terminals 220. The program control information signal generated by the operations center 202 provides data on the scheduling and description of programs. The program control information signal may be sent through the network controller 214 or, in an alternate configuration, directly to the set top terminal 220 for display to the subscriber. In the preferred embodiment, the program control information signal is stored and modified by the network controller 214 and sent to the set top terminal 220 in the form of a set top terminal control information stream (STTCIS). This configuration can accommodate, among other things, differences in individual cable systems and possible differences in set top terminal 220 devices.

The set top terminal 220 integrates either the program control signal or the set top terminal control information stream together with data stored in the memory of the set top terminal 220, to generate on-screen menu displays for assisting the subscriber in choosing programs for viewing. (Throughout the description the term "program control information" is being used to indicate control information coming from the cable headend 208 to the set top terminal 220, whether it is sent directly from the operations center 202, processed by the network controller 214 and then forwarded to the set top box (STTCIS), or transmitted over telephone lines.)

The types of information that can be sent using the program control signal includes: number of program categories, names of program categories, what channels are assigned to a specific category (such as specialty channels), names of channels, names of programs on each channel, program start times, length of programs, description of programs, menu assignment for each program, pricing, whether there is a sample video clip for advertisement for the program, and any other program, menu or product information. In addition, the program control information signal may be used periodically to reprogram or reconfigure a set top terminal 220 or group of set top terminals 220 (described in detail in co-pending patent application Ser. No. 08/160,281, now issued U.S. Pat. No. 5,798,785 entitled, REPROGRAMMABLE TERMINAL FOR SUGGESTING PROGRAMS OFFERED ON A TELEVISION PROGRAM DELIVERY SYSTEM, filed by the same assignee incorporated herein by reference).

The goal of the menu driven program selection system 200 used with the present invention is to allow the subscriber to choose a program by touring through a series of menus utilizing a remote control 900 (FIG. 3) or similar device providing cursor movement. The final choice in the series of menus will identify one particular channel and one time for activation of that channel. Armed with a channel and activation time, the set top terminal 220 can display the selected program on the television for the viewer. To achieve this goal one embodiment of the present invention assigns an intelligent alpha-numeric code to each program. This alpha-numeric code identifies the category of the program, the menu in which the program should be displayed, its transmission time(s), and the position on the menu that the program should be displayed.

In this embodiment, the program control information, including menu codes, is sent continuously from the operations center 202 to the network controller 214, and ultimately to the set top terminal 220. For example, four hours worth of programming information can be sent via the program control information signal continuously using the information shown in Tables A-C.

Table A shows the basic programming information that may be sent to the set top terminal 220. The program descriptions shown are coded abbreviations. For example, C for comedy, N for news, S for sports, A for cartoons, and TX for text. If there is a textual description for a program, such as a movie, the description may be given following that program's coded description or may be communicated following the four hours' worth of programming information. As is shown in the coded listing, program descriptions for programs greater than a half hour in length need not be repeated (each half hour). The video description code informs the set top terminal 220 of whether there is still or live video available to advertise the program.

For example, a sporting program may be assigned a code of B35-010194-1600-3.25-Michigan St. vs. USC. The letter B would assign the program to category B, sports. The second alpha-numeric character number 3 would assign the program to the third menu of the sports category. The third character of the code, number 5, assigns the program to the fifth program slot on the third menu. The next six characters, Jan. 1, 1994, represent the date. The following four characters, 1600 represent the start time which is followed by the length of the program and the program name. This entry represents a sports show, a college football game, which will be aired at 4:00 PM on New Years day 1994.

TABLE A

| *Program Name | *Program Length | *Menu code | *Description | *Video |
|---|---|---|---|---|
| 12:00 PM | | | | |
| 1 Cheers | .5 | E24 | C | N |
| 2 Terminator | 2.0 | A33 | Tx | S |
| 3 Prime Time | 1.0 | D14 | N | N |
| 4 Football Special | .5 | B24 | S | N |
| . | | | | |
| . | | | | |
| . | | | | |
| 12:30 PM | | | | |
| 1 Simpsons | .5 | E14 & C13 | C | S |
| 4 Football Game | 3.0 | B13 | S | N |
| . | | | | |
| . | | | | |
| . | | | | |

In the 12:30 Channel 1 entry of Table A, two menu codes are shown. By allowing two menu codes, programs that may fit under two different category descriptions may be shown in both menus to the subscriber. With this minimal amount of information being communicated to the set top terminal 220 on a regular basis, the terminal is able to determine the proper menu location for each program and the proper time and channel to activate for the subscriber after his menu selection.

Table B shows an example Events Table that may be downloaded to a set top terminal 220 using the Event Data file, which contains information about events and pricing. As shown in the table, the three columns of the Events Table identify the field number, the field itself and the type of information downloaded in the Event Data file. The first column contains the field numbers 1 through 11. The middle column contains the corresponding field parameters, including the event type, event ID, global channel ID, price, start time, end time, start date, end date, P-icon, name and description. The third column contains corresponding field type information. As shown in this field type information typically consists of an unsigned integer; hours, minutes and seconds; months, day and year; and ASCII character identifier.

TABLE B

| Field # | Field | Type |
|---|---|---|
| 1 | Event Type<br>1 = YCTV™<br>2 = Pay-per-view<br>3 = Reg. TV | Unsigned Int |

TABLE B-continued

| Field # | Field | Type |
|---|---|---|
| 2 | Event ID | Unsigned Int |
| 3 | Global Channel ID | Unsigned Int |
| 4 | Price (in Cents) | Unsigned Int |
| 5 | Start Time | HH:MM:SS |
| 6 | End Time | HH:MM:SS |
| 7 | Start Date | MM/DD/YY |
| 8 | End Date | MM/DD/YY |
| 9 | P-Icon | ASCIIZ |
| 10 | Name | ASCIIZ |
| 11 | Description | ASCIIZ |

Table C shows an example Event Data file. In particular, Table C shows two data streams corresponding to two event types. The first data stream identifies a YCTV™ event in the first field. The second field designates the event ID, which is 1234 in this example. The third field includes the global channel ID number two. The fourth field indicates the cost of 50 cents for this event. The fifth and sixth fields indicate the respective start and end times of 3:00 a.m. to 3:00 p.m., respectively. The seventh and eighth fields show the corresponding start and end date, designated as Aug. 25, 1993 and Aug. 27, 1993, respectively. Field nine indicates the Picon set to PBS.PCX graphics file. Finally, fields ten and eleven indicate the name and description of the event selected, which in this case is Sesame Street and Barney. The second data stream in the Event.Dat example shown in Table C includes analogous information for Terminator IV, which is designated in field one as a pay-per-view event.

TABLE C

Event Data Example

1`1234`2`50`03:00:00`15:00:00`08/25/93`08/27/93`pbs.pcx`Sesame Street & Barney's Sesame Street and Barney Abstract
2`1234`2`50`20:00:00`22:00:00`08/25/93`08/25/93`t4.pcx`Terminator 4`Terminator 4 Abstract The program control information signal and STTCIS can be formatted in a variety of ways and the on-screen menus can be produced using different methods. For instance, if the program control information signal carries no menu format information, the menu format for creating the menus can be fixed in ROM at the set top terminal 220. This method allows the program control information signal to carry less information but has the least flexibility since the menu formats cannot be changed without physically swapping the ROM holding the menu format information.

In the preferred embodiment, the menu format information is stored at the set top terminal 220 in temporary memory, either in a RAM or EPROM. This configuration provides the desired flexibility in the menu format while still limiting the amount of information needed to be communicated through the program control information signal. New menu format information would be sent using the program control information signal or the STTCIS to the set top terminals 220 each time there was a change to a menu.

In the simplest embodiment, the menus remain fixed and only the text changes. Thus, the program control information signal can be limited to primarily text and a text generator can be employed in the set top terminal 220. This simple embodiment keeps the cost of the set top terminal 220 low and limits the bandwidth necessary for the program control information. Another simple embodiment uses a separate channel full-time (large bandwidth) just for the menu information.

4. Processing the Program Control Information Signal

Figure 6A:
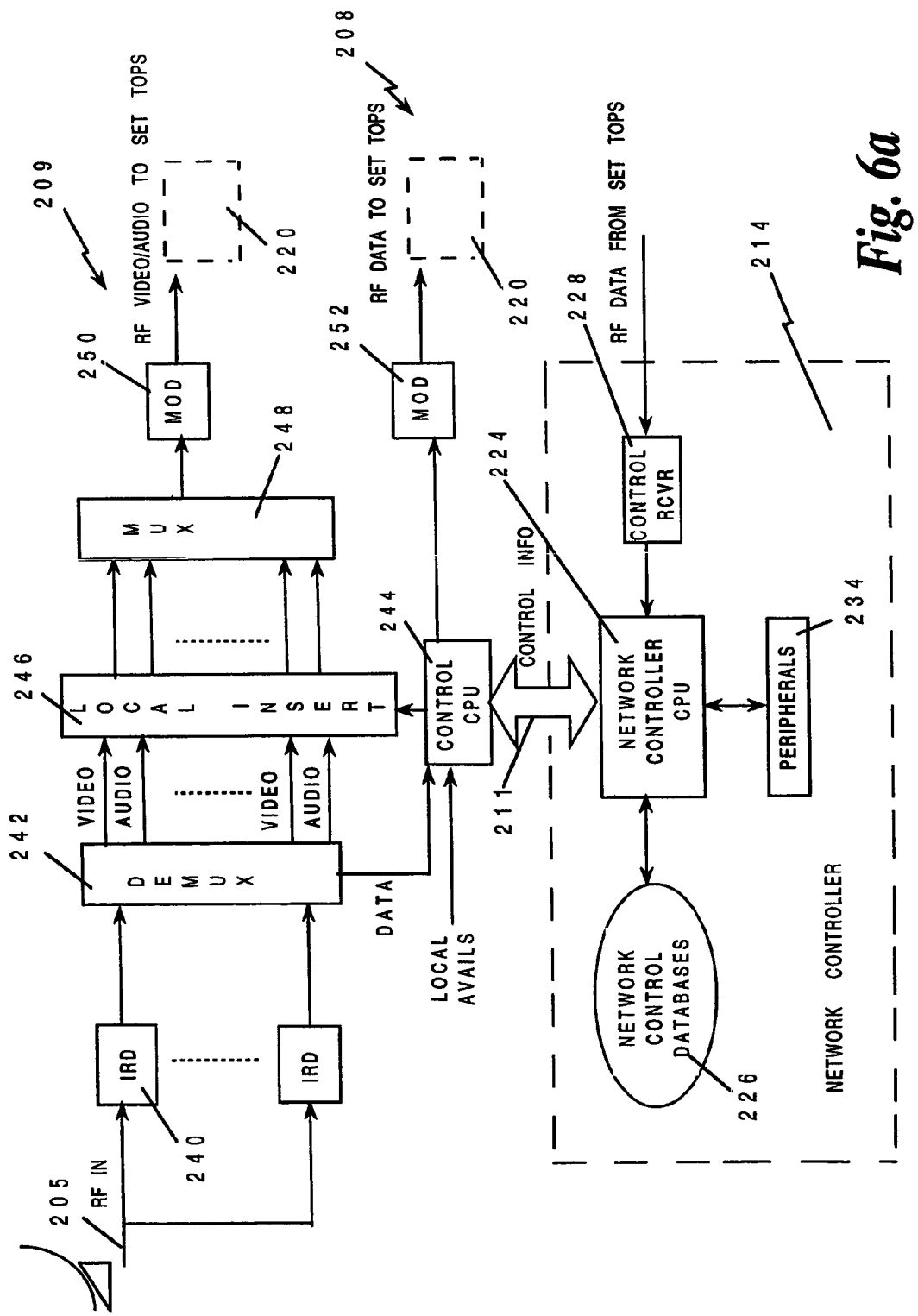
FIG. 6a is a schematic of a basic cable headend having network controller components.
Figure 6B:
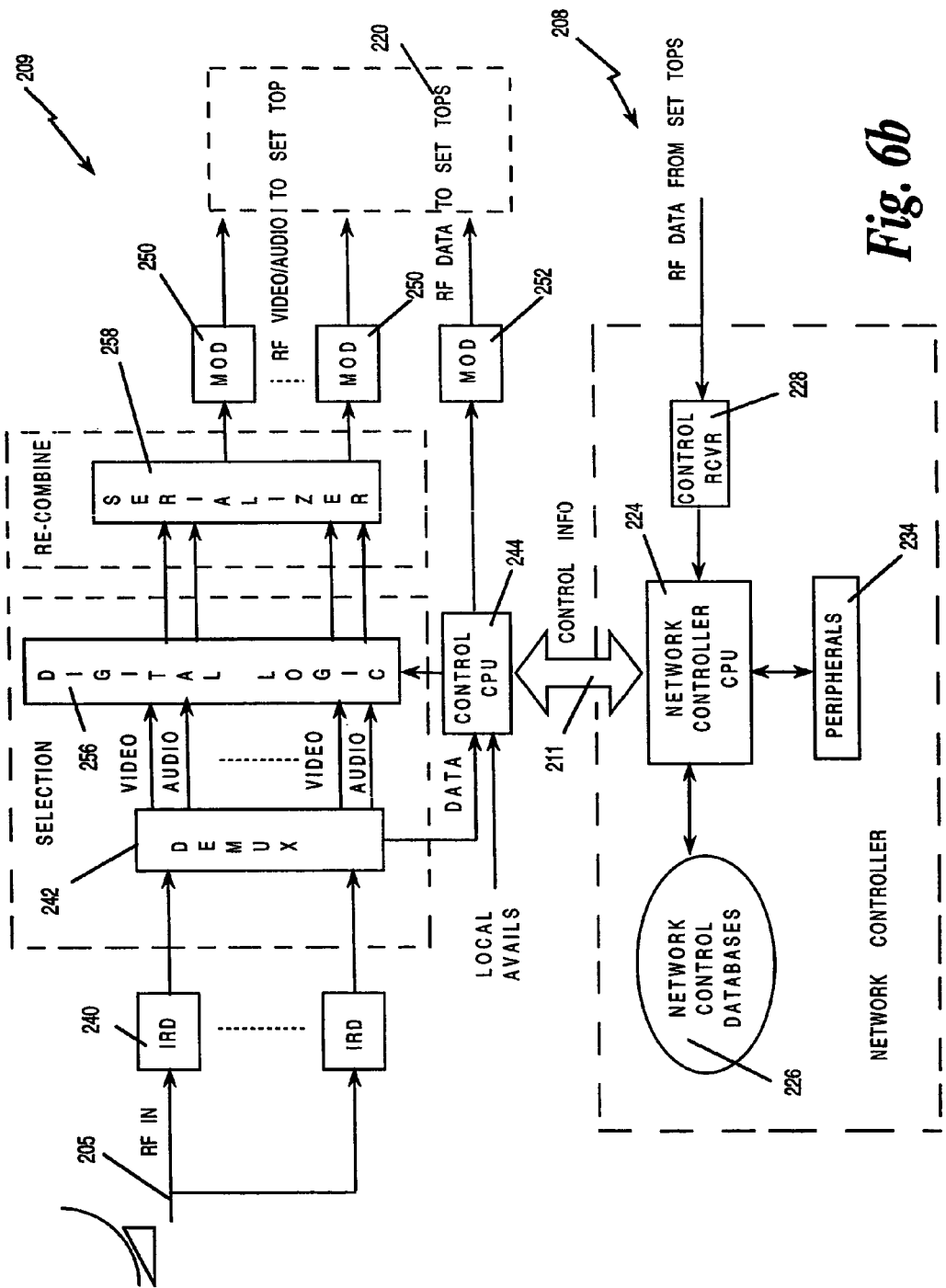

FIGS. 6a and 6b show a more detailed schematic of the components of the cable headend 208, focusing on the interplay between the network controller 214 and the signal processor's 209 major hardware components. The network controller 214 uses, among other components, the signal processor 209 to implement its monitoring and control capabilities. Although the network controller 214 of the present invention will work with nearly any cable headend signal processing equipment, it is preferred that the signal processing equipment be modern equipment capable of handling digitally compressed video.

FIG. 6a depicts an embodiment of the basic signal processing capabilities of the cable headend 208 and shows connections to components of the network controller 214. As shown in the figure, RF cable signals 205 are received at the headend 208 through a bank of integrated receiver demodulators (IRDs) 240. Each IRD 240 includes customary RF processing equipment, including a low noise amplifier, a demodulator and other filtering devices (not shown). As each RF feed is fed through the individual IRDs 240, the signals are manipulated and transferred to the demultiplexer and other signal processing equipment for further processing. The demultiplexer 242 splits each cable TV signal into its respective video and audio signal components. In addition, the demultiplexer 242 extracts data from the cable television signals and inputs such data to the control CPU 244.

The control CPU 244 exchanges control information with the network controller 214, as shown at 211. This control information is exchanged between the signal processor's control CPU 244 and the network controller CPU 224. In particular, the network controller 214 and signal processor 209 pass control information through the interface linking the two CPUs in order to perform any modifications to the program control information signal. The network controller CPU 224 oversees such modifications, accessing various network control databases 226 for guidance in instructing the signal processor's control CPU 244. The instructions provided by the network controller 214 in turn guide the signal processor 209 in combining and/or adding programming signals and advertisements for transmission to the set top terminals 220.

The local insertion component 246 of the signal processor 209 allows the control CPU 244 to execute the instructions received from the network controller 214 and insert any local programming and advertisements. Once such regional programming and advertisements have been inserted, the local insertion component 246 passes the various signals to a multiplexer 248 that combines the various programming and advertising signals. The output of the multiplexer 248 is transferred to RF modulator 250 that disseminates the composite video and audio signals to the set top terminals 220. The data extracted from the cable television signals by the demultiplexer 242, which is also sent to the control CPU 244, is transmitted to the set top terminal 220 using a separate RF modulator 252.

The network controller 214 accommodates two-way RF data communications with the set top terminals 220. Upstream data transmissions from the set top terminals 220 are received by the network controller's control receiver 228. These upstream data transmission capabilities are described in detail below.

FIG. 6b diagrams another embodiment of a basic cable headend 208 having a network controller 214 and more sophisticated signal processing equipment. Again, RF cable television signals 205 are fed into a bank of IRDs 240 as described above. These signals 205 are demultiplexed into individual video and audio signal components, with data being extracted and sent to the control CPU 244. The individual video and audio signal components are fed into a digital logic circuit 256 that is flexible enough to select individual video and audio signals for repackaging. The network controller 214 oversees such repackaging by: (i) receiving the program control information from the control CPU 244, (ii) modifying or manipulating the signal as necessary, and (iii) transferring the modified program control information signal back to the control CPU 244.

With instructions from the network controller 214, the control CPU 244 may insert local avails into the digital logic system 256 and execute the various selections of individual video and audio signals for subsequent transmission to the set top terminals 220. Once individual video and audio signals have been selected and all local insertions have been made, the outputs of the digital logic circuitry 256 are transferred to a serializer 258 which recombines all the signals into a serialized format. The serially-formatted signals are in turn transferred to RF modulators 250 for distribution over the cable network 200. The selection and recombining components of the signal processing equipment are described in greater detail in a co-pending patent application Ser. No. 08/160,283, now issued U.S. Pat. No. 5,682,195, entitled DIGITAL CABLE HEADEND FOR CABLE TELEVISION DELIVERY SYSTEM, incorporated herein by reference; however, such sophisticated combining circuitry is not necessary for the operation of the network controller 214. Rather, a simpler signal processing system may readily be used.

In the embodiments diagrammed in FIGS. 6a and 6b, the signal processor 209 may, acting alone or in conjunction with control instructions from the network controller 214, incorporate local programming and/or local advertisements into the program signals and forward the revised signal to the set top terminals 220. To accommodate this local programming availability, the signal processor 209 must combine the local signal in digital or analog form with the program signals 205 received from operations center 202. If a local cable system 200 uses a compression algorithm or standard that is different than the one used by the operations center 202, the signal processor 209 must also decompress and recompress incoming signals so they may be properly formatted for transmission to the set top terminals 220. In addition, the signal processor 209 performs any necessary signal decryption and/or encryption.

Figure 7:
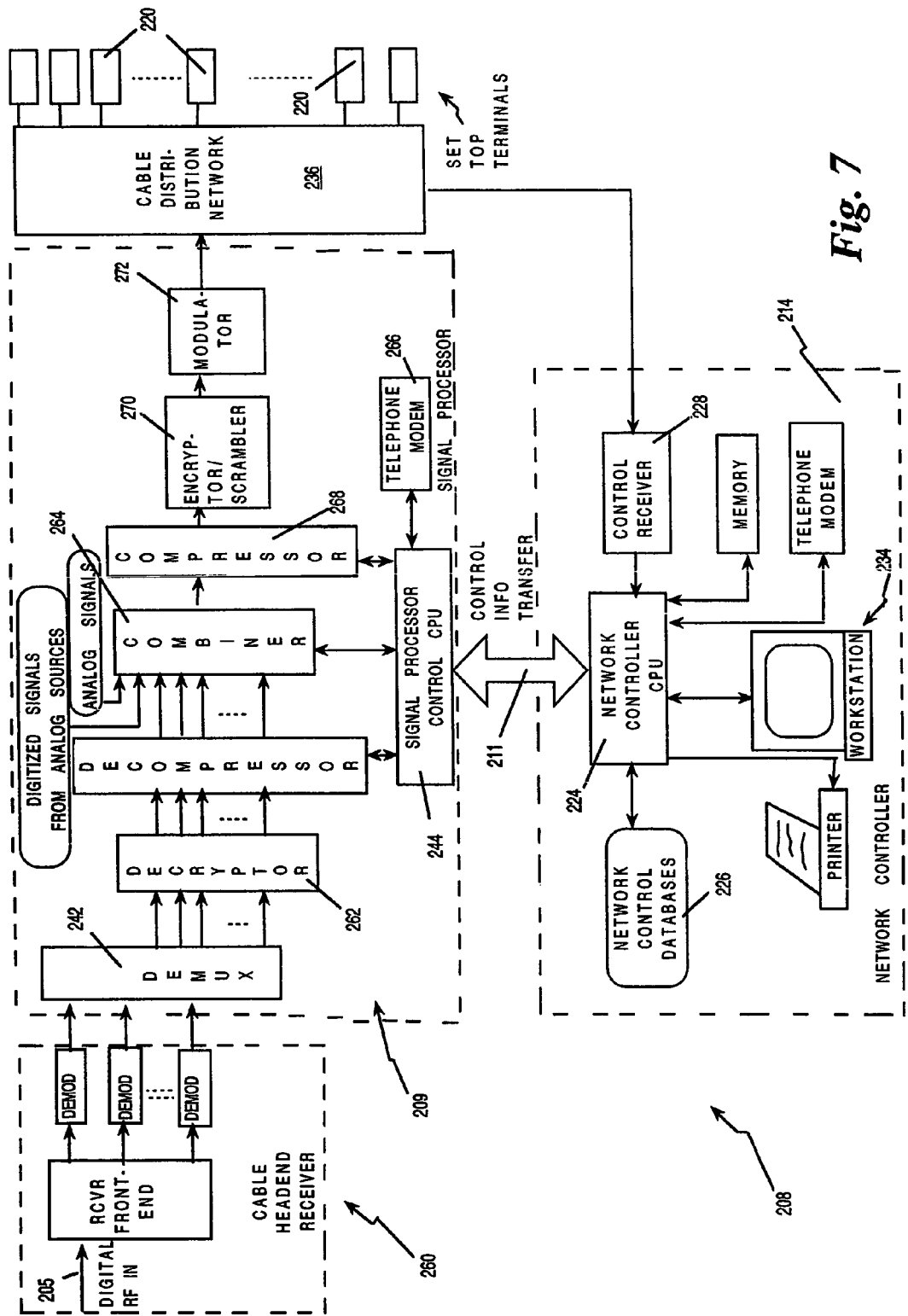
FIG. 7 is a detailed diagram of the components of the cable headend.

FIG. 7 diagrams an alternative embodiment of a digital/analog cable headend 208. In particular, this embodiment includes decompression and recompression capabilities, showing the types of signal processing components that the network controller 214 may control. As shown in FIG. 7, the cable headend 208 receiver front-end, indicated at 260, demodulates the received transponder signals 205, which may contain four, six, eight or more audio/video channels of information, into a digital bit stream of multiplexed digitized MPEG or MPEG 2 format video. The signal processor 209 receives the multiplexed signals and initially performs any demultiplexing required to process the received signals. The demultiplexers 242 separate the multiplexed signals into separate individual MPEG or MPEG 2 format digital channels. Depending on the transponder signal received, the demultiplexer 242 may have four, six, eight or more cross connects to the combiner 264. The outputs of the demultiplexers 242 are selectively enabled by the control CPU 244. Those outputs of the multiplexer 248 that are enabled are then input to the combiner.

Decrypting may be necessary and can be conducted by a separate decrypting device 262 included as part of the signal processor's internal components. The signal processor's control CPU 244 may be controlled by a remote site (such as a national site) via a modem or similar connection 266. Therefore, the remote site is able to control the output of the demultiplexers 242. Alternatively, instead of enabling the outputs of the demultiplexers 242, the inputs of the combiner 264 may be selected by the control CPU 244. By enabling or selecting multiplexer 248 outputs, the control CPU 244 is able to control which television programs are combined and transmitted to the viewers.

The combiner 264 combines the enabled or selected outputs of the demultiplexers 242 into the proper format and outputs the signals through a compressor 268, and an encryptor 270 (if desired), to a digital modulator 272. The modulator 272 outputs a modulated RF carrier combined with other carriers onto the cable distribution network 236. The set top converter terminals 220 in subscribers' homes select and demodulate a particular channel selected by the user. As selections are made, the set top terminal 220 stores the programs accessed in its local storage for later transmission to the network controller 214 at the cable headend 208.

5. Changing Menu Content by Modifying the Program Control Information Signal

Figure 8A:
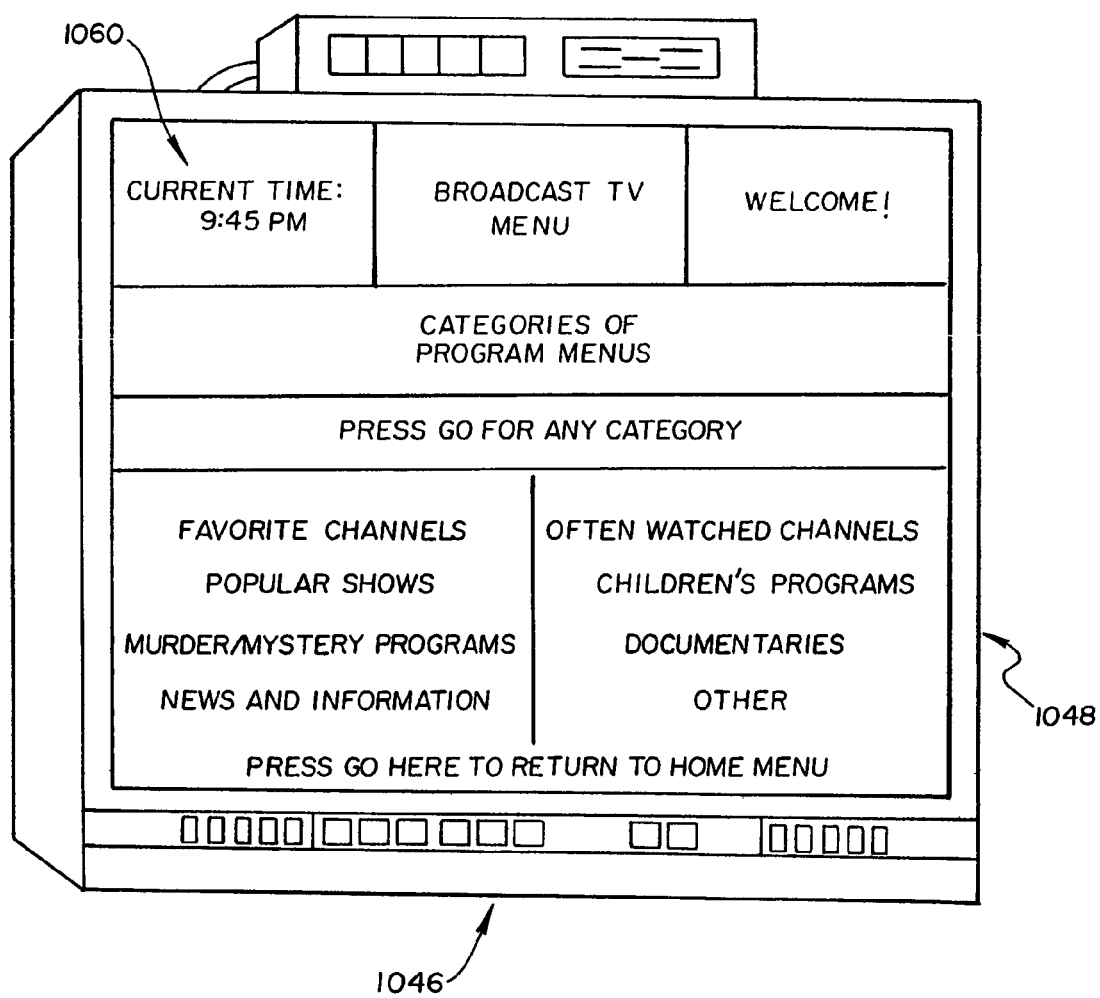
FIG. 8a is a drawing of a broadcast television menu screen to be displayed on a set top terminal.
Figure 8B:
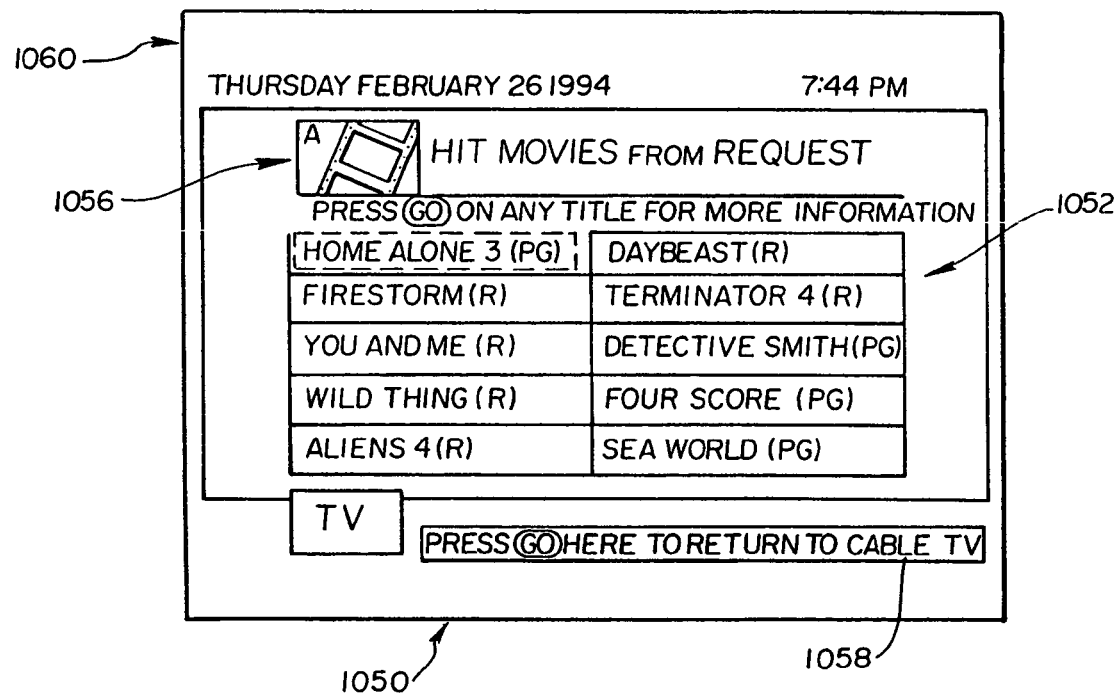
FIG. 8b is a drawing of a hit movie menu screen to be displayed on a set top terminal.
Figure 8C:
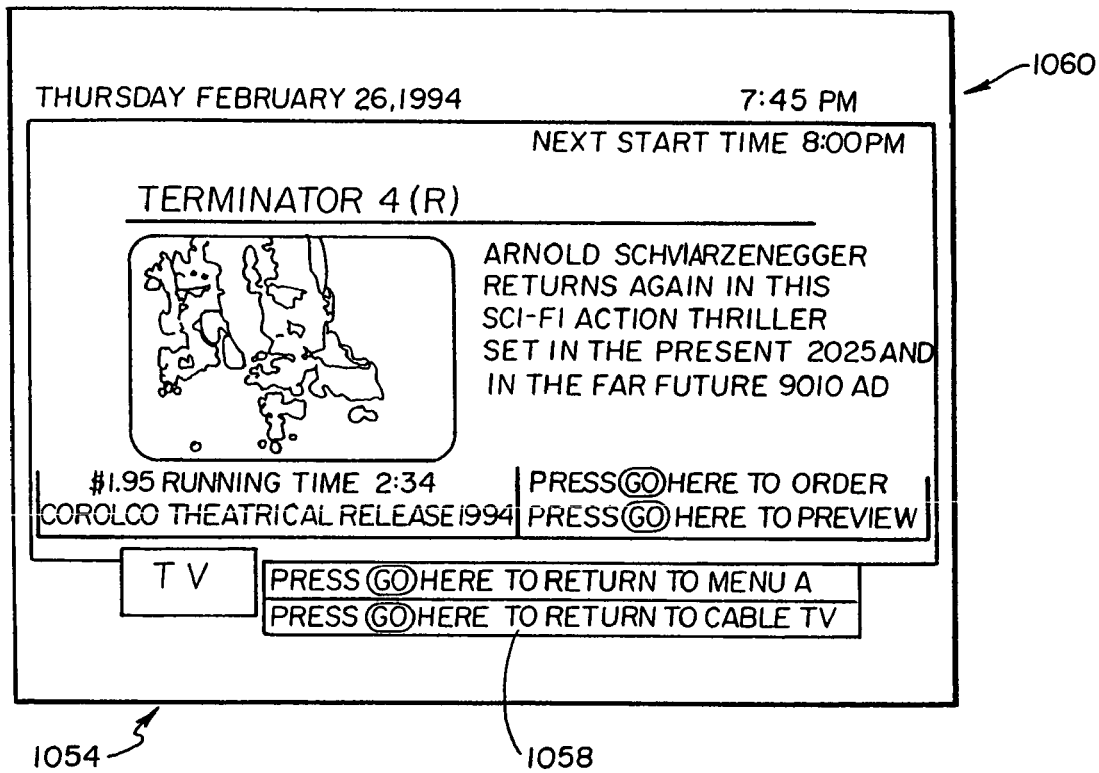
FIG. 8c is a drawing of a hit movie description menu screen to be displayed on a set top terminal.

FIGS. 8*a* through 8*c* are sample menu screens produced by a set top terminal 220 using the program control information signal. FIG. 8*a* shows a menu which enables the viewer to select a program category from among a choice of eight program categories 1048. FIG. 8*b* shows a menu 1050 for the viewer to select a hit movie from among ten hit movies 1052. FIG. 8*c* depicts a menu 1054 which provides information about a movie and enables a viewer to order the movie for viewing.

FIGS. 8*a* through 8*c* show text generated by a set top terminal 220. This text is generated using information received via the program control information signal by a text generator (not shown) in the set top terminal unit 220. Those portions of the text that generally remain unchanged for a period of weeks or months may be stored in EEPROM or other local storage. For example, the text "HIT MOVIES from" 1056 will consistently appear on each hit movies' major menu. This text may be stored on EEPROM or other local storage. Further, text such as that which appears at the lower center part of the screen "PRESS HERE TO RETURN TO CABLE TV" 1058 appears many times throughout the menu sequence. This text may also be stored locally at the set top terminal 220.

Text which changes on a regular basis, such as the movie titles 1052 (or other program selections), will be transmitted to the set top terminal 220 by either the operations center 202 or the cable headend 208. In this manner, the cable headend 208 may change the program selections available on any menu by modifying the program control information signal sent by the operations center 202 and transmitting the change.

It is preferred that the text, e.g., 1048, 1052, 1056, etc., be generated by the set top terminal 220 separately from the graphics because the text can be stored locally in a more compact manner requiring less storage space at the set top terminal 220. In addition, it allows for easy communication of text changes from the operations center 202 or cable headend 208 to the set top terminal 220.

FIGS. 8*a* through 8*c* show the use of day, date and time information 1060 on menus. This information may be obtained in a variety of ways. The day, date, and time information 1060 may be sent from the operations center 202, the cable headend 208 (signal processor 209 or network controller 214), the uplink site 204, or generated by the set top terminal unit 220 internally. Each manner of generating the day, date, and time information 1060 has advantages and disadvantages which may change given the particular embodiment and costs.

In the preferred embodiment, the day, date, and time 1060 are generated at a central location such as the operations center 202 and are adjusted for regional changes in time at the cable headend 208. In particular, the network controller 214 modifies the PCI signal to accommodate regional day, date and time information and changes and additions in regional programming and advertisements. These modifications are automatically processed by the network controller CPU 224 upon initiation of the Modifying PCI software routine, as described below. In an alternate embodiment, the network controller's control station operator can manually enter programming, advertising and menu modifications.

6. Receiving Information from Set Top Terminals

Figure 9A:
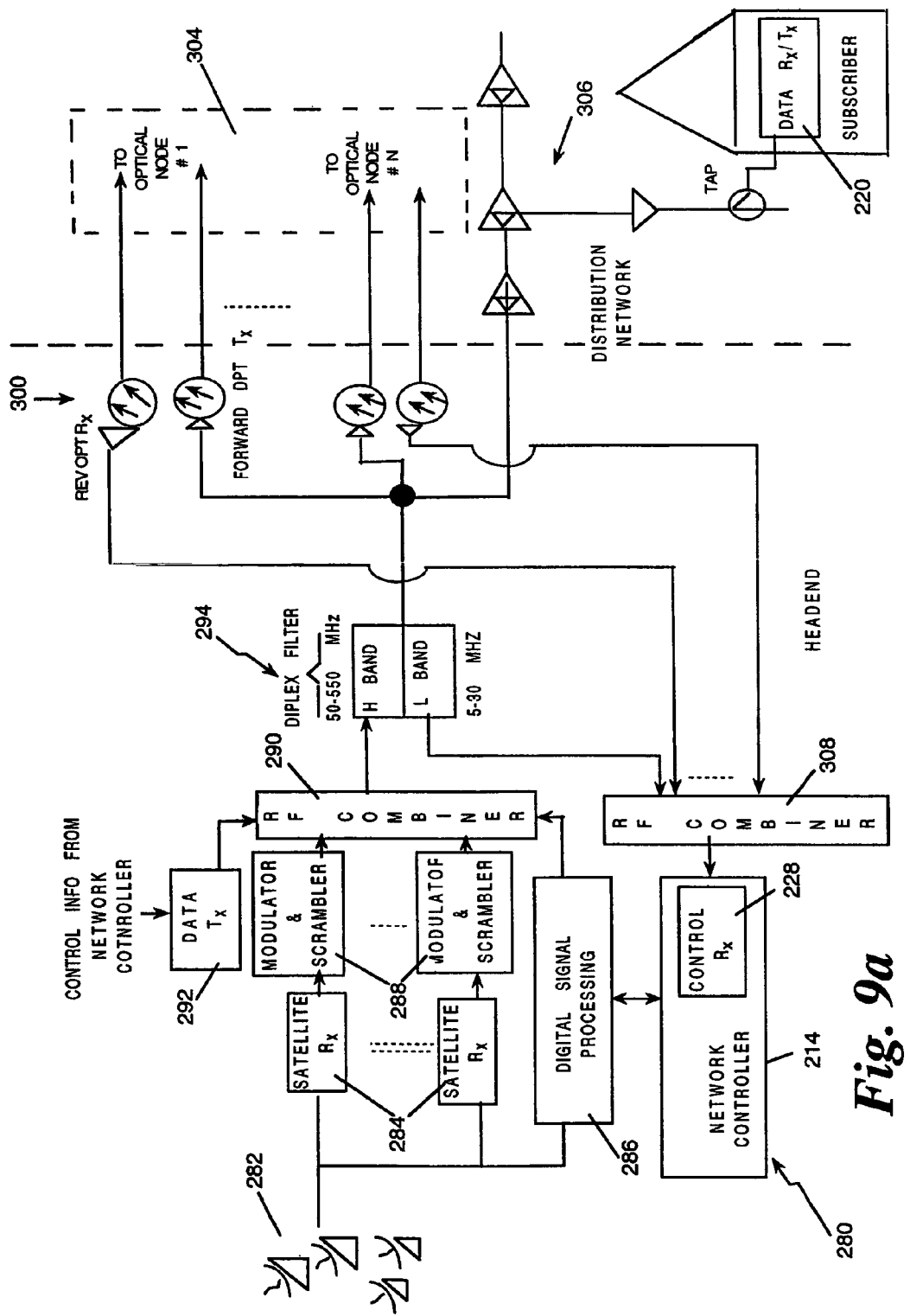
FIG. 9a is a diagram for out-of-band two-way data transmission for a digital/analog headend.
Figure 9B:
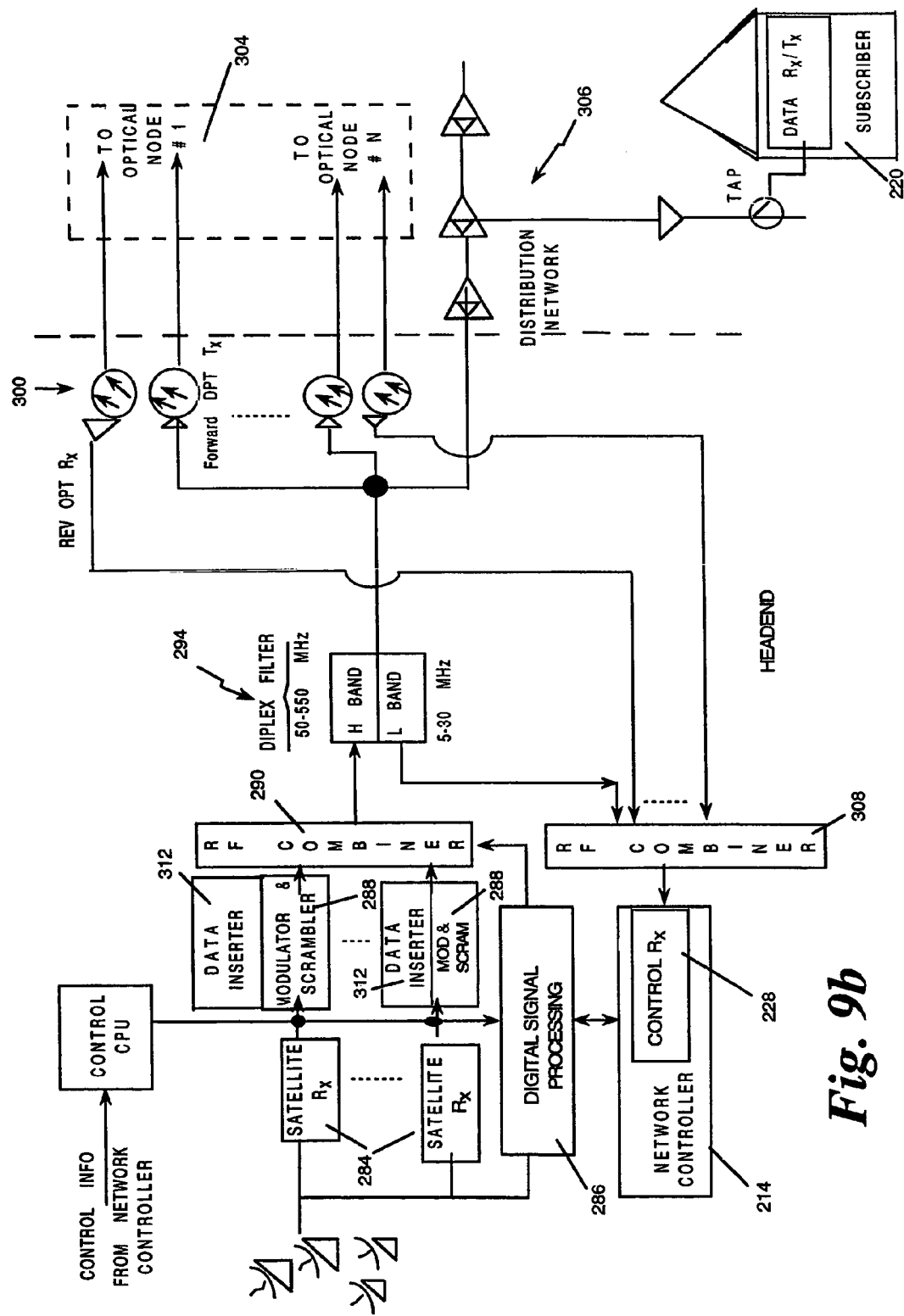
FIG. 9b is a diagram for in-band two-way data transmission for a digital/analog headend.

The network controller 214 is equipped to receive information from the set top terminals 220 on a regular or random basis. FIGS. 9*a* and 9*b* diagram separate embodiments for upstream data transmission for a digital/analog cable headend 208. In particular, FIG. 9*a* diagrams an out-of-band two-way data transmission system 280 wherein satellite feeds 282 are received at the cable headend 208 by a number of satellite receivers 284 and digital signal processing equipment 286. The satellite receivers 284 are used for analog transmissions and the digital signal processing equipment 286 is used to process digital programming signals. The analog signal paths allow analog cable television programming signals to be received by the set of satellite receivers 284 and to be passed to a series of modulators and scramblers 288 the output of the modulators and scramblers 288 is sent to an RF combiner 290.

A data transmitter (Data Tx) 292 makes use of the control information transferred to the signal processing equipment from the network controller 214. This data transmitter inserts data into the RF combiner 290. Through the use of a separate data transmitter, any downstream data transmissions may be sent to a set top terminal 220 on an out-of-band frequency (i.e., out of the frequency band used for video signal transmissions).

Digital signals are also input to the RF combiner 290 from the digital signal processing equipment 286. These digital signals are typically assigned to separate frequency bands. Once the data, analog and digital signals have been combined using the RF combiner 290, the composite signals are further processed at the cable headend 208 for distribution over the cable network. This further processing involves using a diplex filter 294 that accommodates two-way RF communications over the cable distribution network.

The diplex filter 294 requires that the various sets of signals be translated to different frequency bands. Typically, services to the home are sent in a downstream band, which begins at 54 MHz and extends today to typically 550 MHz. Other systems that use a maximum frequency less than or greater than 550 MHz, however, may readily be accommodated by the embodiment shown in FIG. 9*a*. Downstream services may include TV channels, FM radio, digital/audio signals and various control and information data streams.

Upstream transmissions from the set top terminal 220 are typically sent in the frequency band between 5 and 50 MHz. Other frequency limits may, however, be employed in special cases. For example, the industry is currently experiencing movement toward using 5 to 42 MHz for upstream services.

Although the diplex filter 294 is not an inherently bi-directional device, it may be made bi-directional by splitting the spectrum between downstream and upstream signals, as described above. The diplex filter 294 effectively becomes bi-directional by passing high-band signals in the downstream direction and passing low-band signals in the upstream direction. For downstream transmission capability, all signals in the high-band of 50 to 550 MHz are passed to a fiber/coax translation point, indicated generally at 300.

At the fiber/coax translation point 300, optical energy is relayed to the various optical nodes 304. This distribution of optical energy typically involves splitting the optical energy among the nodes 304 and transporting the energy downstream on one or more downstream fibers. In addition, electrical energy signals are sent over coaxial cables, through a series of amplifiers 306 along the cable for distribution to individual subscribers. Individual subscribers simply tap into the amplifiers along the coaxial cable in order to receive programming and downstream data signals.

Upstream data transmission are sent to the cable headend 208 from each optical node 300 over fiber and input into the cable headend's RF combiner 308. Upstream transmissions over cable are accommodated using carrier frequencies in the lower frequency band. These upstream data transmissions over the coaxial cable are passed through the diplex filter 294, which filters out all high-band frequencies and passes all low-band frequencies. Subsequently, the diplex filter 294 transfers such low-band frequencies to the RF combiner 308. The RF combiner 308 combines all upstream data transmissions from the set top terminals 220 and inputs these combined data signals into the network controller 214 for later processing.

FIG. 9b shows an alternative embodiment to FIG. 9a. In particular, FIG. 9b shows the same overall configuration as the embodiment above (and is commonly numbered) although downstream data transmissions from headend 208 to the set top terminals 220 are accomplished through in-band two-way data transmission. Thus, the primary difference between the diagrams shown in FIGS. 9a and 9b is that the latter embodiment uses a method of inserting data into the downstream programming signals themselves for distribution to the set top terminals 220 in the cable network.

Basically, the data placed on the programming signals using a set of data inserters 312 that are electrically connected to each modulator and scrambler component 288. In this way, data can be inserted in-band along with video and audio signals, thereby modulating the data on the same respective carrier frequencies used by the video and audio signals. The inserted data is thus combined with video and audio signals and input into the RF combiner 290 for downstream distribution. As described above, digital signals are also combined using the RF combiner 290 and disseminated over the cable network. Upstream transmissions are accomplished as described above in conjunction with the discussion for FIG. 9a.

Upstream information received from the set top terminals 220 typically includes, for example, program access data gathered at each set top terminal 220. Such information may be communicated to the network controller 214 through a variety of methods including any of the following methods: (1) cyclic polling, (2) random access, and (3) telephone modems. Cyclic polling and random access methods make use of the two-way RF system diagrammed in FIGS. 9a and 9b, described above.

As described below, the preferred embodiment employs a cyclic polling method. Although various polling schemes will work with the present invention, a roll-call polling scheme is preferred over other schemes such as hub polling or token-passing since roll-call polling provides the greatest degree of centralized control.

Using this preferred method, program access information is stored at each set top terminal 220 until it is polled by the network controller 214 for information retrieval using a polling request message format 920 as shown in FIG. 10a. This frame format 920 may include such program control information as shown in Tables A-C above, typically consisting of six fields: (1) a leading flag 922 at the beginning of the message, (2) an address field 924, (3) a subscriber region designation 926, (4) a set top terminal identifier 928 that includes a polling command/response (or P/F) bit 930, (5) an information field 932, and (6) a trailing flag 934 at the end of the message.

The eight-bit flag sequence that appears at the beginning and end of a frame, 922 and 934, respectively, is used to establish and maintain synchronization. Such a sequence typically consists of a "01111110" bit-stream. The address field 924 designates a 4-bit address for a given set top terminal 220. The subscriber region designation 926 is a 4-bit field that indicates the geographical region in which the subscriber's set top terminal 220 is housed. The set top terminal identifier 928 is a 16-bit field that uniquely identifies each set top terminal 220 with a 15-bit designation followed by an appended P/F bit 930. Although field size is provided by this example, a variety of sizes can be used with the present invention.

The P/F bit 930 is used to command a polling response from the set top terminal 220 addressed, as described below. The frame format 920 also provides a variable-length information field 932 for other data transmissions, such as information on system updates. The frame format 920 ends with an 8-bit flag 934 (or trailing flag) that is identical in format to the leading flag 922, as set forth above. Other frame formats will be apparent to one skilled in the art and can be easily adapted for use with the system.

Using any such polling request message format 920, the network controller 214 interrogates each set top terminal 220 sequentially, one by one. In this type of access strategy, the network controller 214 is designated as the central controller of the cable distribution network 200 and is responsible for control of the communications links between itself and the set top terminals 220. This control includes issuing commands to the set top terminals 220 and receiving responses back from the set top terminals 220.

Basically, the network controller 214 instructs the signal processor 209 to transmit to each set top terminal 220 a polling request, which asks whether a set top terminal 220 has any information to transmit. The set top terminals 220 are identified by the unique address and set top terminal identifier 928. It is preferred that the set top terminal 220 transmit information and messages to the network controller 214 only when given permission by the network controller 214 to do so.

Where, for example, specialty programs have been accessed since the previous poll, the set top terminal 220 is given permission to transmit a polling response in the form of a status report that includes any such access information. The network controller's control receiver 228 is tasked with the receipt of set top terminal 220 polling responses or status reports. These status reports generally include information that allows the network controller 214 to track a subscriber's program access history. As described above, the control receiver can store the status reports locally and/or transfer them to the network controller CPU 224.

The network controller CPU 224 immediately processes each polling response as it is received from each set top terminal 220. The network controller CPU 224 updates pertinent databases 226 with the received information, and then sends another polling request to the next set top terminal 220 on its list. A set top terminal 220 with no information to transmit so indicates in a reply to the network controller 214. Once all set top terminals 220 have been given permission to transmit status reports, a cycle is complete and a new cycle begins.

Through a polling cycle, the network controller 214 acquires the information needed to operate the system 200. During the cycle, the network controller 214 sends signals to the set top terminals 220 to authorize both their operation and access to specific channels. If, for example, a subscriber has failed to pay a recent bill, the network controller 214 can deauthorize the subscriber's set top terminal 220. Likewise, when a subscriber orders a program or channel, the network controller 214 checks the subscriber's account for good standing by reading the proper database file. After the check, the network controller 214 then either authorizes or deauthorizes access by the set top terminal 220 using the data transmitted in a modified program control information signal. As a result, the cycle requires a series of requests and responses to operate.

FIG. 10b shows an example frame format 920' for the status reports received from the set top terminals 220 during the polling cycle. This frame format is substantially identical to the polling request message format 920 (FIG. 10a), and includes: (1) a leading flag at the beginning of the message, (2) an address field, (3) a subscriber region designation, (4) a set top terminal identifier that includes a polling command/response (or P/F) bit, (5) an information field, and (6) a trailing flag at the end of the message, each designated by a common number with respect to FIG. 10a, but with the prime indicator (') added.

Again, the information field 932' remains variable in length so that the status of an indeterminate number of programs accessed, as represented at 933', can be included in the frame. In this way, the control message length of the polling request message is minimal since the network controller 214 does not transmit such access information. After a polling response by a given set top terminal 220, however, the control message length increases in proportion to the number of programs accessed.

During transmission, the P/F bit 930, 930' is used to carry out the polling function. In particular, the P/F bit 930 is set to a "1" position to command a polling response from the set top terminal 220 whose address is identified in the frame 928. The set top terminal 220 addressed must respond to the command with the same P/F bit 930' also set to the "1" position. The response will include the number of programs accessed and their corresponding event identification numbers as shown in FIG. 10b at 933'. In cases where the set top terminal 220 has not accessed any programs since the previous polling cycle, the set top terminal 220 responds with the P/F bit 930' set to "1" and the programs access block denoting zero programs accessed.

The second method for the network controller 214 to receive information from the set top terminals 220 is through the use of a random access scheme. In an alternate embodiment that uses this method, individual set top terminals 220 can send control-related messages to the network controller 214 without being polled. This scheme is particularly useful in networks where subscriber regions include potentially large numbers of subscribers. High concentrations of subscribers may be found, for example, in large metropolitan areas. In such cases, the polling cycle can be replaced with a more sophisticated random access strategy such as carrier-sense multiple access with collision detection (CSMA/CD). In this scheme, each set top terminal 220 must "listen" before it transmits and then does so only if it senses an idle medium. When the return link to the network controller 214 is silent, a given set top terminal 220 can transmit its messages. Any messages sent from a set top terminal 220 to the network controller 214 would set the P/F bit 930' to a "0" position to indicate that the message is not in response to any command or polling request. In addition to CSMA/CD, other random access schemes can be used with the system, such as CDSL.

The third method for the network controller 214 to receive information from the set top terminals 220 is through the use of telephone modems. In an alternate embodiment, the set top terminals 220 communicate program access information and orders to the network controller 214 using telephone modems. In this embodiment, the set top terminals 220 are equipped with a modem port to facilitate such operation. Thus, communications between a given set top terminal 220 and the network controller 214 can be established over telephone lines when cable traffic or other primary traffic is congested. The preferred method of using telephone modems is in combination with a control or "hit" signal from the network controller 214. A group (or region) of set top terminals 220 is "hit" simultaneously by the network controller 214 via the cable. Only those set top terminals 220 within the group that have data for the network controller 214 call the network controller 214 by modem. The network controller 214 is equipped with a bank of modems (organized to rollover telephone calls) to answer the incoming calls.

Among the three methods discussed for the network controller 214 to receive information from the set top terminals 220, the use of the cyclic polling scheme depicted in FIGS. 10a and 10b, is preferred. Polling is preferred because it allows the network controller 214 to conduct and control communications with set top terminals 220 over the cable network in an orderly fashion. In particular, the network controller 214 can schedule data retrieval by polling the set top terminals 220 one by one. A random access method, on the other hand, does not allow the network controller 214 to maintain such orderly communications. Instead, the network controller 214 receives data from the set top terminals 220 at random, depending on when the cable medium is idle. This random reception of data lessens the degree of control that the network controller 214 has over set top terminal transmissions. Likewise, the third method, which uses telephone modems, is less desirable than the polling method since the use of modems does not allow for upstream interactivity over the cable medium.

7. Processing Information Received from Set Top Terminals

Figure 11:
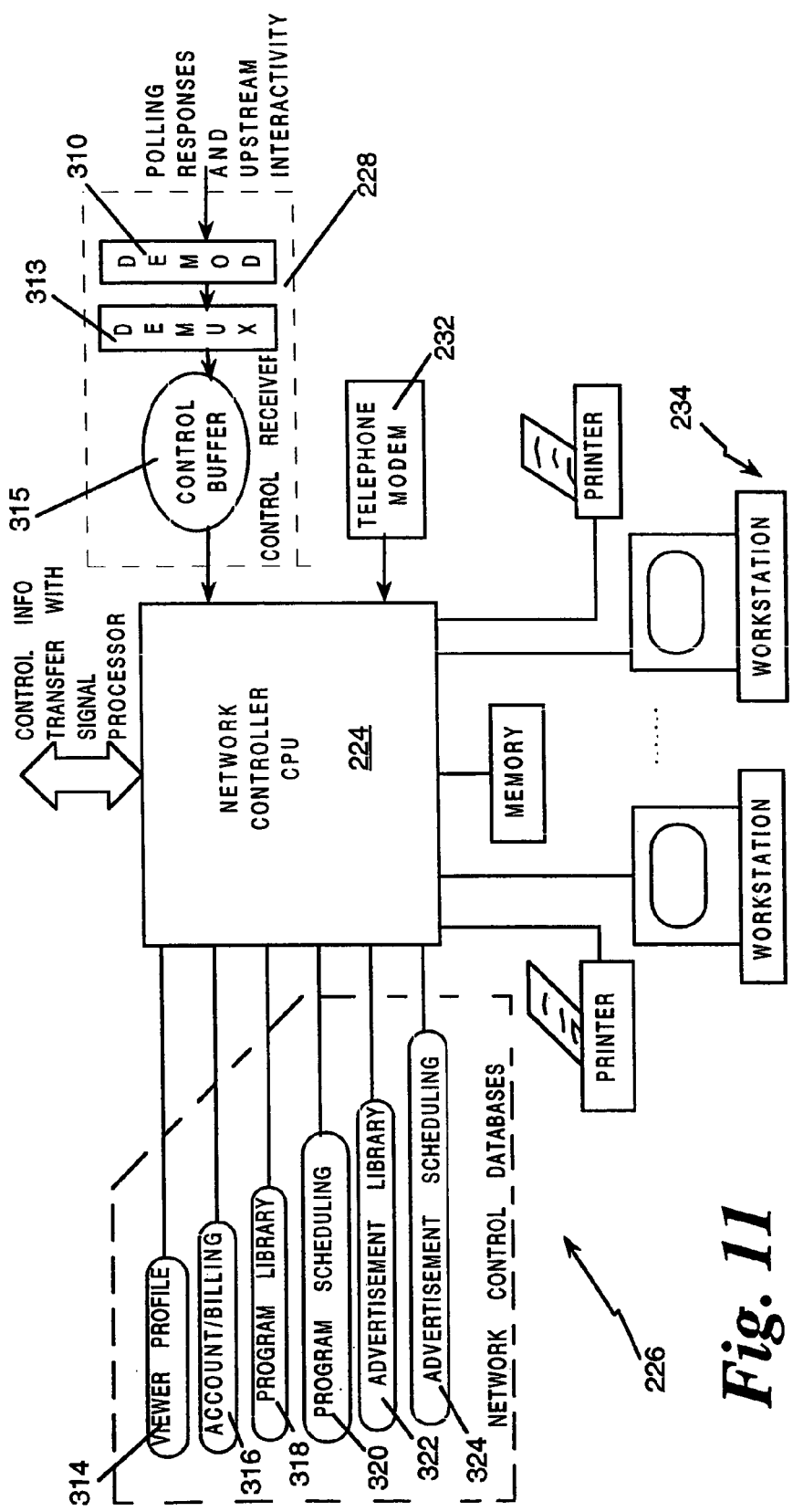
FIG. 11 is a diagram of the network controller CPU and its relational components.

Regardless of the scheme used by the set top terminals 220 to access the network controller 214, any polling responses and upstream interactivity is received by the network controller's control receiver 228 as shown in FIG. 11, depicting the components of the control receiver 228, which includes a demodulator 310 and demultiplexer 313 to demodulate and demultiplex transmissions received from any set top terminal 220 in the cable distribution network 200. As described above, the control receiver 228 transfers, through a control buffer 315, the received information to the network controller CPU 224 for processing.

Processing is accomplished by the network controller CPU 224. Operator instructions are input to the network controller CPU 224 through the operator control station 234 that includes, for example, a computer/workstation with a CRT display, printer and other peripherals. Multiple operator control stations 234 can be used to assist in control operations.

Regional operator control stations (not specifically shown, but substantially identical to stations 234) may be used and may include multiple operator control stations each assigned to a particular subscriber region corresponding to a geographic region where set top terminals 220 are located. Thus, each regional operator control station is assigned to a subscriber region, providing monitoring and control capabilities over such regions. All regional program control information is transferred to the network controller CPU 224 for processing, as in the case where a single control station 234 is used. Likewise, during this processing, portions of the network control databases 226 may also be updated.

No set number of databases 226 are required for the network controller 214 to perform its operations, and a single temporary database may be used. In the preferred embodiment, however, the network controller 214 uses several databases (indicated at 226) that are accessed during network control operations. These databases 226 are identified in FIG. 11 and include: (1) the Viewer Profile database 314, (2) the Account/Billing database 316, (3) the Program Library database 318, (4) the Program Scheduling database 320, (5) the Advertisement Library database 322, and (6) the Advertisement Scheduling database 324.

Figure 12:
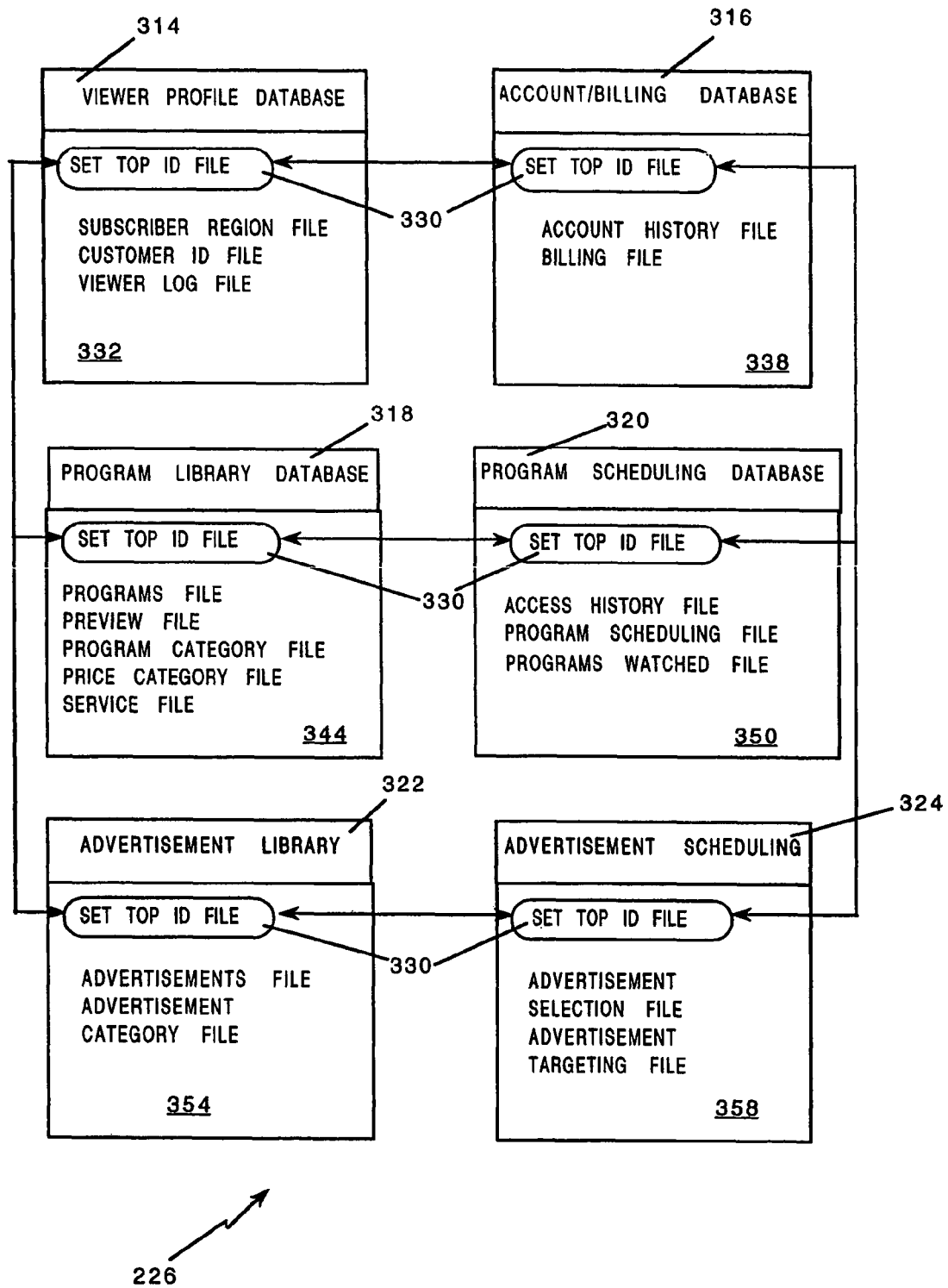
FIG. 12 is diagram of the network control database structure.

FIG. 12 shows one example of a network controller's basic database structure including the databases identified in the preceding paragraph. The data stored in these databases is not simply raw data. Rather data may be processed, correlated and appropriately indexed to create a true relational database 226.

As shown in FIG. 12, the Viewer Profile database 314 includes: (i) a Set top ID File, (ii) a Subscriber Region File, (iii) a Customer ID File and (iv) a Viewer Log File, the latter three files being indicated generally as a file group 332. The Set top ID File 330, common to each of the databases comprising the network controller's database 226, contains set top converter records with each record representing a unique set top terminal 220. Examples of information stored in this file includes set top terminal type, software version and set top terminal identification/serial number. The Set top ID File 330 contains the key data that links each relational database with one another, as described below.

The Subscriber Region File, part of file group 332, includes information such as headend 208 assignment, regional operator control workstation assignment and a designation for the subscriber's geographical area. The Customer ID and Viewer Log Files, part of file group 332, include the subscriber's personal information, such as name, address and telephone number, and information on the subscriptions to cable services for each customer as well as a personal profile for each viewer, respectively.

The personal profile consists of demographic information that may be gathered in a number of ways. The set top terminal 220 builds the personal profile for each viewer and stores the information in a memory file by viewer name. To build a personal profile in the preferred system, the viewer answers a series of questions presented on a series of menu screens. These personal profile screens request the viewer to input information such as name, sex, age, place of birth, place of lower school education, employment type, level of education, amount of television program viewing per week, and the number of shows in particular categories that the viewer watches in a given week such as, sports, movies, documentaries, sitcoms, etc. Any demographic information which will assist the set top terminal 220 in targeting advertisements to the viewer may be used.

In addition to gathering demographics at the set top terminal 220, the personal profile can be compiled using other methods. For instance, the information can be gathered using questionnaires sent by mail and subsequently entered in the Viewer Profile Database 314 by the network controller's control station operator.

As an alternative to gathering demographic data, a simulated profile can be generated using an algorithm similar to that described below that analyzes access history and viewing habits. Using test information generated from a statistically significant number of viewers, the simulated profile algorithm estimates the viewer's age, education, sex and other relevant information. The analysis requires reviewing the viewer's programs watched and statistically comparing the viewer's programs watched with the test group. Also, the algorithm can place the subscriber or viewer in a viewer category. This analysis is transparent from the subscriber's point of view and attempts to accurately profile the viewer. Various viewers or viewer categories can later be targeted with different advertisements.

The Account/Billing database 316 includes (i) the Set top ID File 330, and (ii) an Account History File, and (iii) a Billing File, the latter two files indicated at 338. The Set top ID File, as described above, contains information unique to each subscriber, including set top terminal type, software version and set top terminal identification/serial number. The Account History and Billing Files contain information concerning each subscriber's past bills and account record and information on the most recent bill, including data from which the next billing report can be generated, respectively.

The Program Library database 318 include (i) the Set top ID File 330, and (ii) a Programs File, (iii) a Preview File, (iv) a Program Category File, (v) a Price Category File and (vi) Service File, the latter five files identified at 344. As usual, the Set top ID File identifies each set top terminal 220 by identification number. The Programs File contains information on every program offering in the system, including name, length and type of program. The Preview File contains information on previews for specialty programs stored in the Programs File. The Program Category File contains a set of categories into which each program may be placed, such as movies, sports, science fiction and news. The Price Category File contains information on pricing for various categories of programs, grouping programs and services into categories by price. The Service File maintains information on the various cable services available in the system 200.

Figure 16:
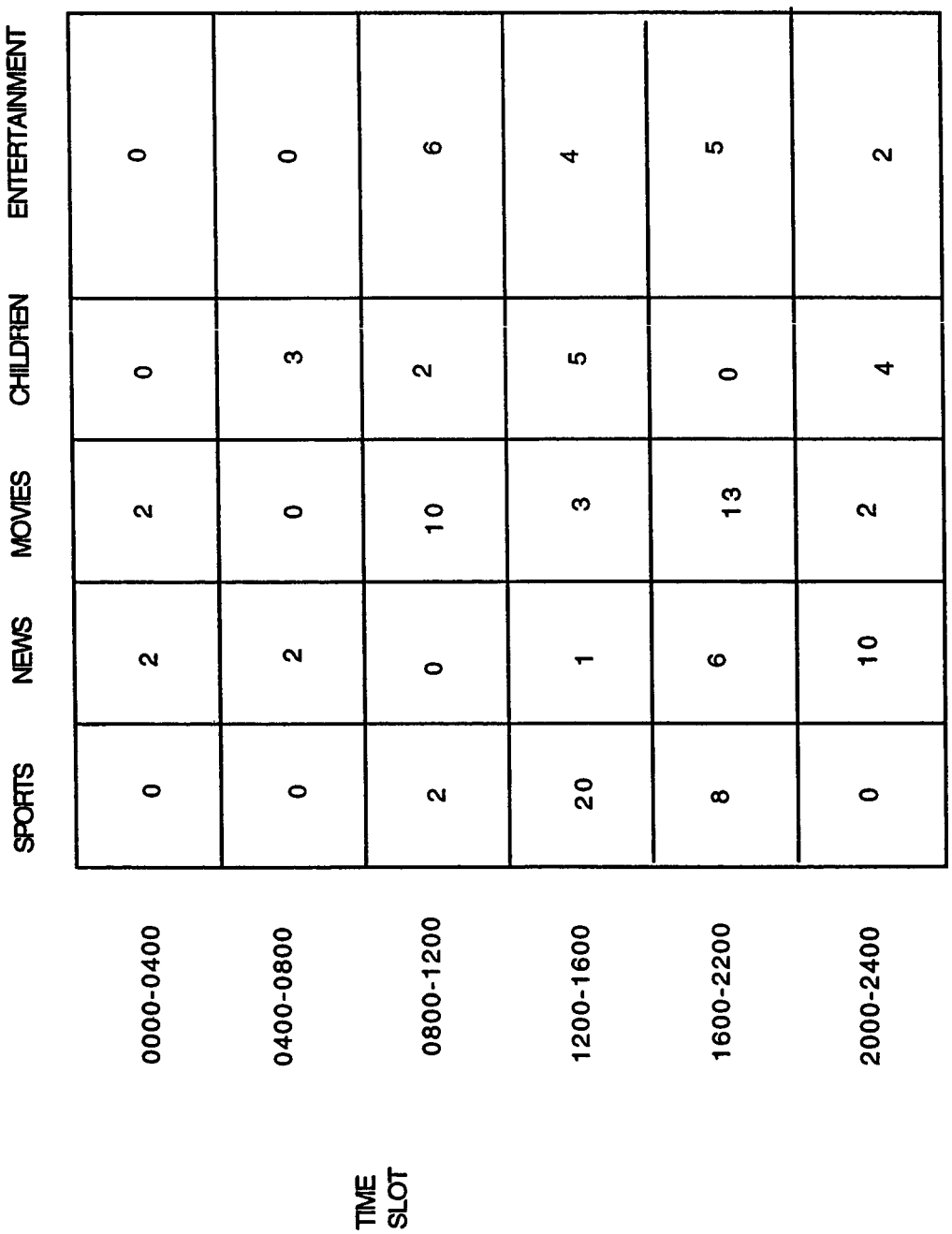
FIG. 16 is a diagram of a sample programs watched matrix.

The Program Scheduling database 320 includes (i) the Set top ID File 330, and (ii) an Access History File, (iii) a Programs Watched Matrices File and (iv) a Program Scheduling Library, the latter three files indicated at 350. The Access History File contains information on the programs that the set top terminal 220 has accessed and the Programs Watched Matrices contains information on the number of programs watched in a given program category during different times of day. Relative to the Programs Watched Matrices file, a programs watched matrix is shown in FIG. 16 and further described below. The Program Scheduling File contains information on the times of day and the corresponding programs that are being offered for viewing at each subscriber location.

The Advertisement Library database 322 includes (i) the Set top ID File 330, and (ii) an Advertisements File, and (iii) an Advertisement Category File, the latter two files being indicated at 354. The Advertisements File contains information on every advertisement in the system, including name, length and type of advertisement, and the Advertisement Category File contains a set of categories into which each advertisement can be placed The Advertisement Scheduling database 324 includes (i) the Set top ID File 330, and (ii) an Advertisement Selection File, and (iii) an Advertisement Targeting File, the latter two files identified at 358. The Advertisement Selection File contains information on the advertisements that have been offered to each subscriber and keeps track of the ones that have been selected. The Advertisement Targeting File contains information on the advertisements and advertisement categories that have been chosen by the system as being of the most interest to a specific subscriber.

The network control databases 314, 316, 318, 320, 322, 324 comprising the database 226 are relational databases generally keyed to information in a single file. Specifically, the relational key is a set top terminal 220 identification number stored in Set top Terminal ID File 330, as shown in FIG. 11. This set top terminal identification number allows the database files that correspond to a particular subscriber to be linked together by a common reference. In other words, the databases are structured such that subscribers are referenced in each database file by a unique set top terminal identification number. In this way, each database may be accessed based on set top terminal identification number alone. Thus, using a subscriber's set top terminal identification number, the network controller CPU 224 can access and process information pertaining to that subscriber from any of the above described database files. In configurations where multiple set top terminals 220 are allocated to a single customer (or household), a unique subscriber identification number may be added to the database 226 to group the set top terminals 220 by customer. With the set top terminal identification as a relational key, many additional databases may be created that correlate and store pieces of subscriber-specific information from the six databases and underlying files.

8. Overview of Software Routines

Figure 13:
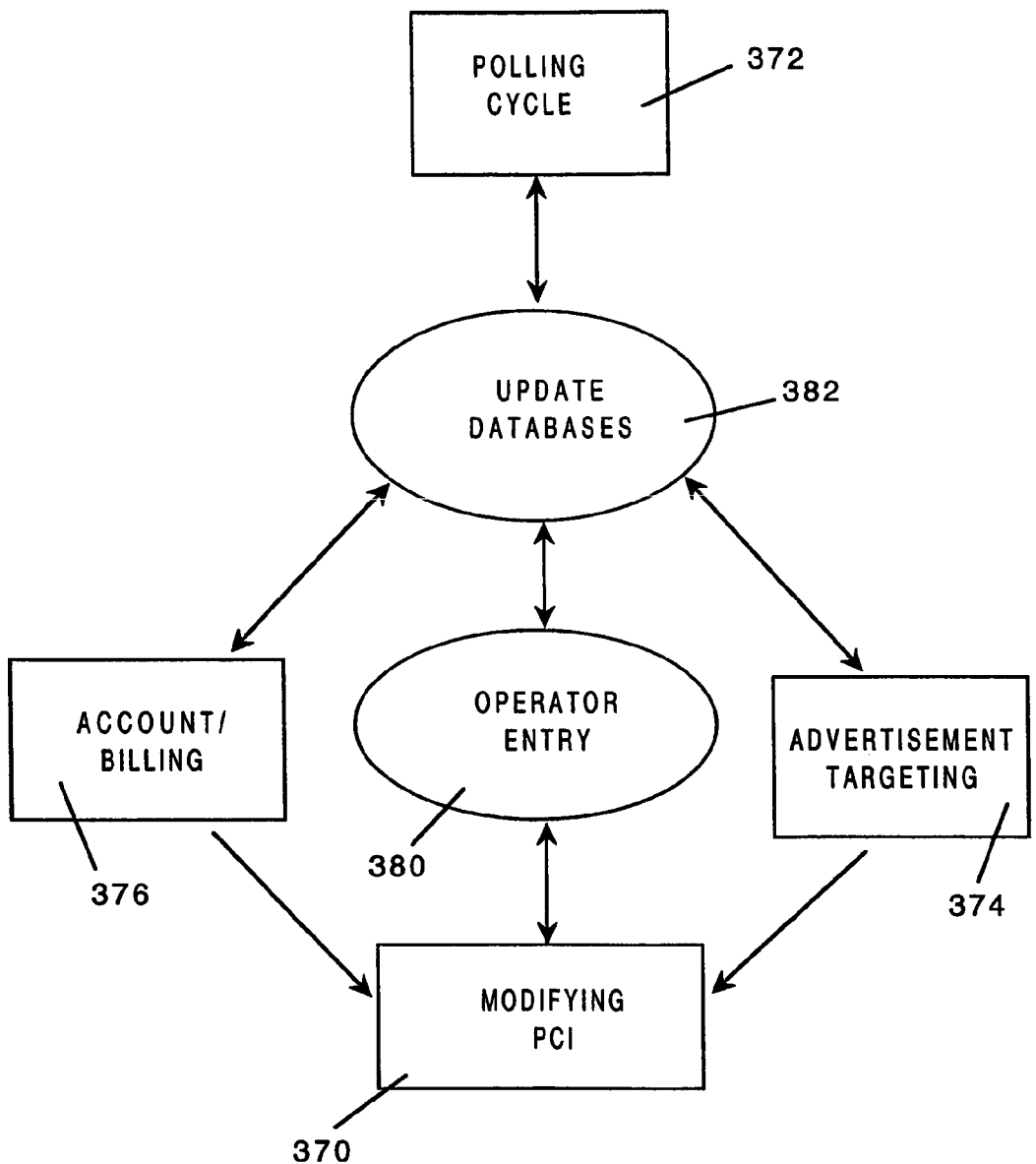
FIG. 13 is a diagram of the relationship between the major software routines.

FIG. 13 shows the major software routines initiated and executed by the network controller CPU 224. These routines are: (1) the Modifying PCI routine 370, (2) the Polling Cycle routine 372, (3) the Advertisement Targeting routine, and (4) the Account/Billing routine 376. Together, these routines, along with the operator entry and update functions 380, 382, respectively, enable the network controller 214 to perform its major functions.

The Modifying PCI routine 370 is the software that enables the network controller 214 to modify the program control information (PCI) signal received from the signal processor 209. This software routine generally allows the network controller CPU 224 to modify the PCI signal content so that changes and additions in programming and advertisements can be accommodated. Such changes and additions include access authorizations and deauthorizations in the form of authorization and deauthorization messages, respectively.

The Polling Cycle routine 372 is the software sequence that interactively executes the network controller's polling cycle allowing the network controller 214 to schedule and perform polling of all set top terminals 220 operating in the system 200. The software also provides the network controller 214 with a means of processing status reports received from set top terminals 220 in response to polling requests. For a random access system (not depicted), the software of this routine 372 would be changed.

The Advertisement Targeting routine 374 is the software that generates packages of television commercials and advertisements geared towards particular viewers and makes use of a viewer's demographic information and viewing habits to determine those advertisements that are of most interest to that particular viewer. In so doing, the routine 374 outputs packages of advertisements targeted towards each viewer.

The Account/Billing routine 376 is the software that the network controller CPU 224 runs to generate billing reports for each set top terminal 220. In general, the routine 376 correlates the programs accessed with pricing information to generate each report.

9. Modifying PCI Routine

Figure 14:
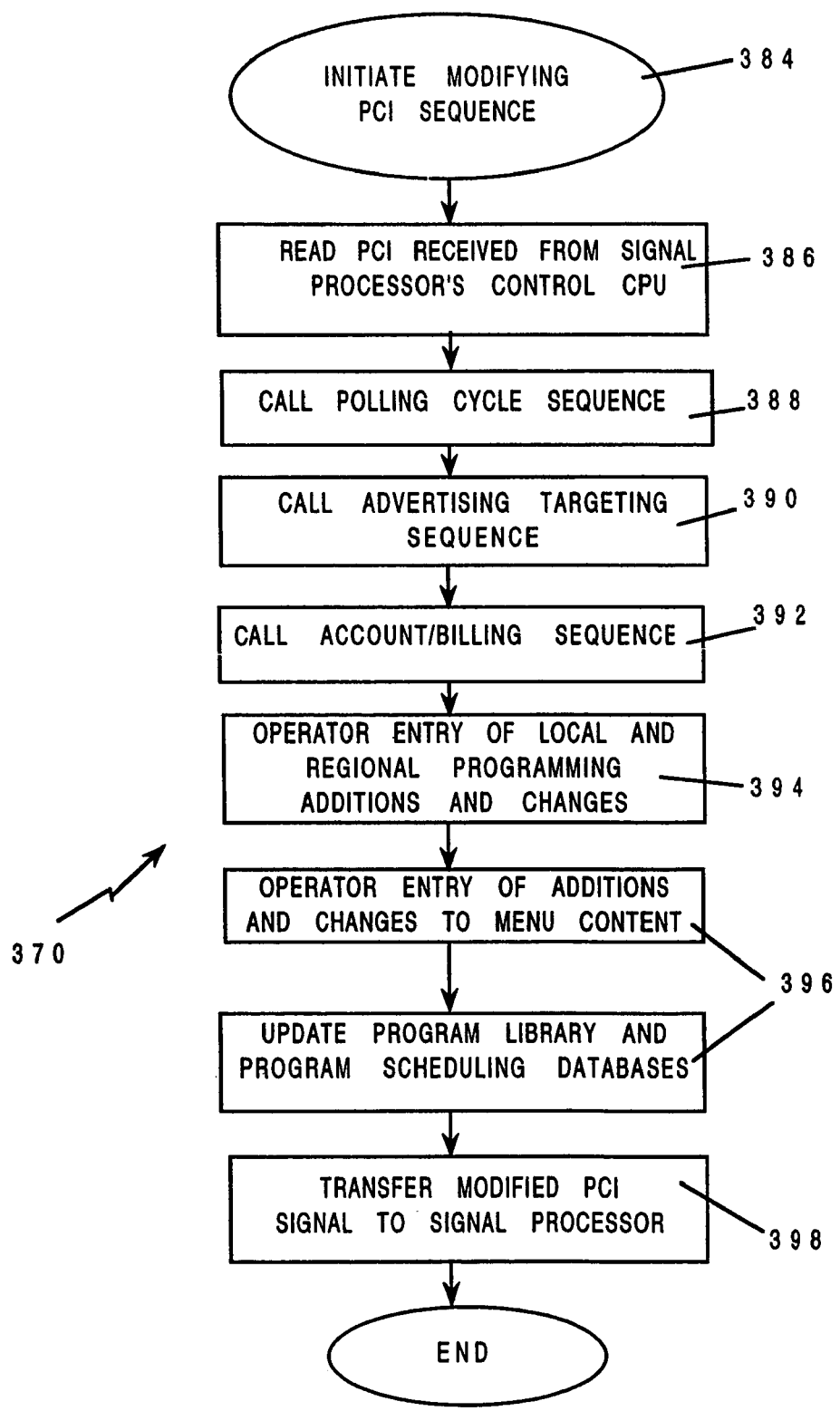
FIG. 14 is a block diagram of the software flow chart for the Modifying PCI routine.

FIG. 14 shows a software flow diagram for the network controller's Modifying PCI routine 370. The Modifying PCI routine (or sequence) is initiated, block 384, automatically by the network controller CPU 224 upon receipt of the program control information (PCI) signal from the signal processor 209. Once the network controller 214 receives the PCI signal, the network controller CPU 224 begins processing the signal by reading the PCI data carried by the signal, block 386.

After reading the PCI data, the network controller CPU 224 "calls" other routines to interactively process data and continue the modification process for each set top terminal 220. First, the network controller CPU 224 calls the Polling Cycle routine 372, at block 388, in order to request data retrieval of the information stored at individual set top terminals 220. Such information includes data on the programs accessed and those ordered for later viewing. As polling responses are received from the set top terminals 220, the network controller CPU 224 next calls, block 390, the Advertisement Targeting routine 374, which generally arranges groupings of commercials for different subscribers based, in part, on viewer demographic information and program access history.

The network controller CPU 224 next calls 392 the Account/Billing routine to begin processing all programming and channel access requests. The Account/Billing routine determines, among other things, whether the subscriber's account is in good standing, verifying that past bills have been paid and that access authorization is warranted. Upon completion of this verification process, a verification message will be sent to the network controller's operator control station 234 indicating that access should be granted.

In the preferred embodiment, an access authorization code may automatically be processed by the network controller CPU 224 and appended to the PCI signal originally received from the signal processor 209. This modified PCI signal and access authorization code will then be transferred back to the signal processor 209 for transmission to the set top terminals 220.

With continued reference to FIG. 14, in an alternate embodiment that uses the Modifying PCI Routine 370, at blocks 394 and 396, the operator manually enters any changes in programming and menu content, along with access authorizations, into the program scheduling database 320. The manual entry of programming and menu content in this embodiment, blocks 394, 396, requires that the operator access the database information generated and updated by the other routines and make necessary changes in the program scheduling database. The network controller CPU 224 reads this updated database information, generates a modified PCI signal, and sends, block 398, the signal to the signal processor 209.

If a subscriber account is delinquent, access to any new programs or channels ordered will not be authorized. Instead, the network controller CPU 224 will deny authorization and generate a deauthorization message to be included in the PCI signal that will be returned to the signal processor 209 for transmission to the set top terminals 220. Alternatively, the network controller CPU 224 generates a delinquency message that is transferred to the CRT display at the network controller's operator control station 234. Upon reviewing the message, the operator may then manually enter message text to be included in the PCI signal that informs the subscriber of a delinquent account.

10. Polling Cycle Routine

Figure 15:
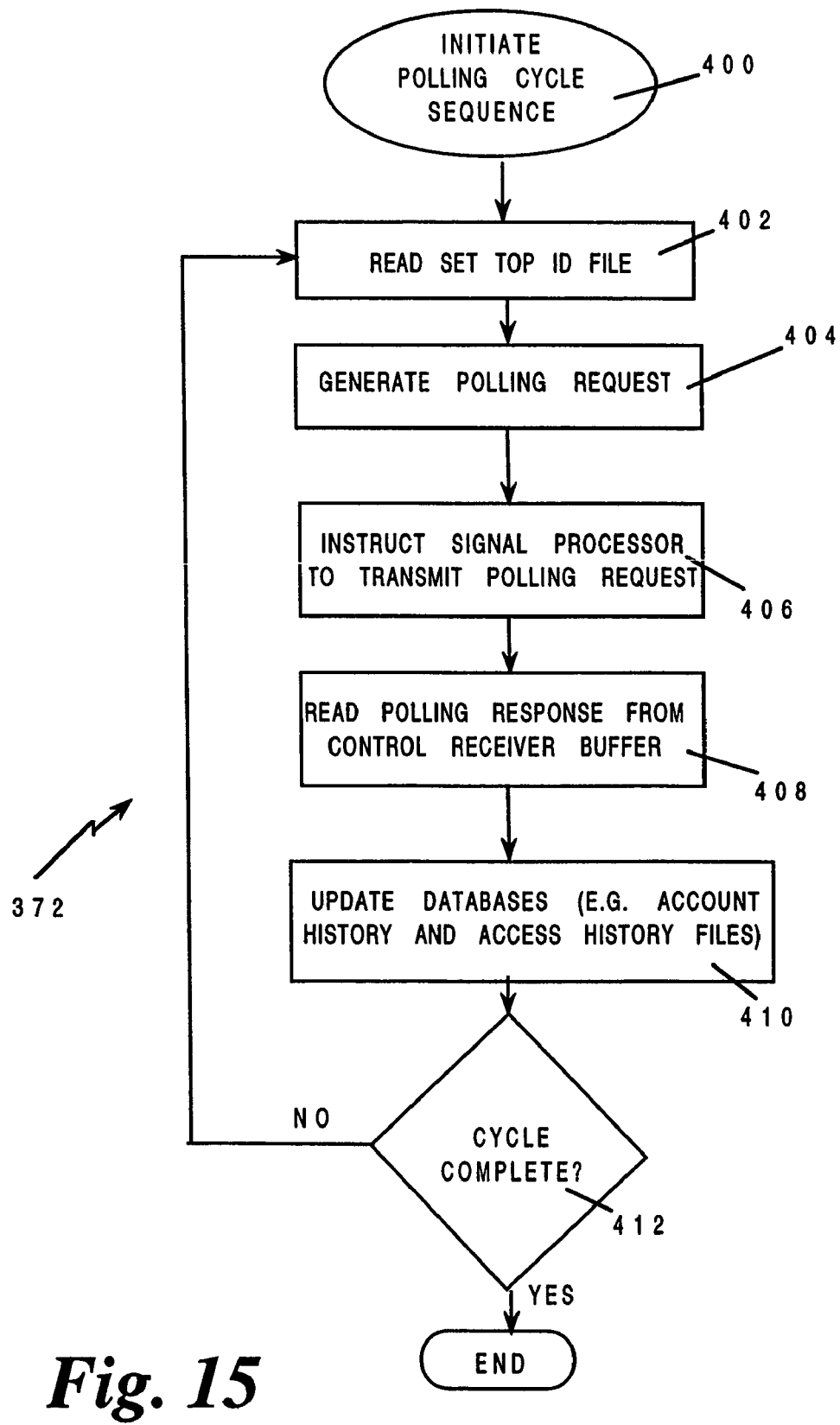
FIG. 15 is a block diagram of the software flow chart for the Polling Cycle routine.

FIG. 15 shows a software flow diagram for the network controller's Polling Cycle routine 372, which iteratively executes the network controller's polling cycle. The number of iterations correspond to the number of set top terminals 220 being polled. The network controller CPU 224 initiates the Polling Cycle sequence periodically on a predetermined basis, block 400. Typically, this period is set by the operator at the network controller's operator control station 234 at once per day, although other periods (e.g., multiple times per day or once per week) can be used.

Upon initiation of the sequence 400, as depicted at function block 402, the network controller CPU 224 reads the Set top Terminal ID File 330 and begins generating, block 404, a polling request frame (shown in FIG. 10a and described herein above) for the first set top terminal 220 identified in the file 330. Once the necessary polling request information is complete, the frame is transferred to the signal processor CPU 244 through the interface between the signal processor 209 and network controller 214. After transfer to the signal processor 209, the frames may be transmitted to the set top terminals 220, block 406. Meanwhile, the network controller's control receiver 228 awaits the corresponding response.

Upon receipt of a polling response, as depicted at block 408, the network controller CPU 224 reads the received information from the control buffer 315. The network controller 214 reads the information field of the polling response frame format, as described above. The network controller CPU 224 processes, indexes and stores the data in an appropriate format, updating the corresponding database files with the information received, block 410. The processing and indexing of the raw data into a relational database 226 is important to the ability of the network controller 214 to quickly take actions such as targeting commercials without lengthy processing time. The polling routine subsequently returns to the Set Top Terminal ID File 330, as shown at decision block 412, to continue the polling cycle for the next set top terminal 220 identified in the file 330. When the routine 372 sequences through the last set top terminal 220, the cycle is complete and the routine 372 ceases until the next polling period.

Most often, the files that require updates during the polling cycle are the Access History File and the Programs Watched Matrices File, both indicated generally at 350 in FIG. 12, and the Account History File 338. For example, FIG. 16 shows an example of a 30-day programs watched matrix, denoted 351, for one set top terminal 220 (not shown in FIG. 16). The matrix 351 is divided into six rows, corresponding to six four-hour time slots. The columns of the matrix 351 are divided, as necessary, by the program categories available for viewing. Each entry in the matrix 351 denotes the number of programs watched in a particular program category and time period.

After the status report is received on each set top terminal 220, the polling response routine (see FIGS. 10a and 10b) determines which time slot and category of program numbers in the matrix 351 need to be increased. Thus, entries in the matrix 351 are updated upon receipt of each set top terminal's polling status report, thereby maintaining a running total of the programs watched. For example, during the 0800-1200 time period, the matrix 351 shows that this set top terminal 220 has been used to watch ten movies during the past month. Preferably the program watched identifying information is stored in addition to the running totals in the Programs Watched Matrices file. Use of programs watched matrices is further described in the following section describing the Advertisement Targeting routine.

11. Basic Advertisement Targeting Routine

Figure 17:
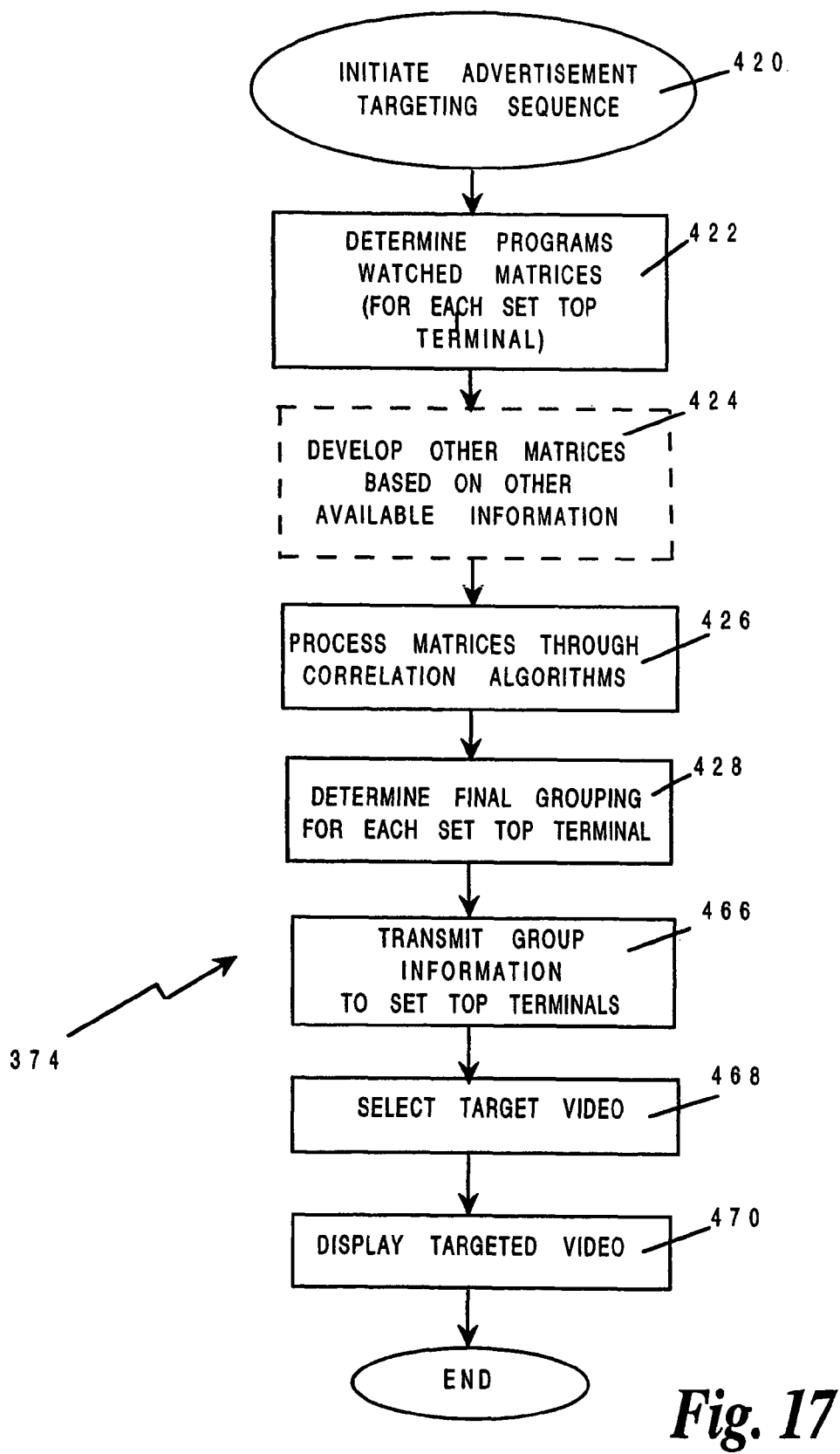
FIG. 17 is a block diagram of the software flow chart for the Basic Advertisement Targeting routine.

FIG. 17 shows the seven primary functions of the basic advertisement targeting routine 374. The function of this routine is to target video for set top terminals 220 based on historical viewing data and other data that is available at the network controller 214. Advertisements that may be targeted include video, commercials and infomercials, with infomercials being time varying video segments (e.g., thirty seconds, fifteen minutes).

When initiated, block 420, the first subroutine, identified at function block 422, accesses the programs watched matrices (exemplified by matrix 351) stored in the Programs Watched Matrices file in the Program Scheduling database 320. The subroutine uses a unique set top terminal ID to access a specific matrix for one set top terminal 220. These matrices are maintained and updated by the polling response routine.

The second subroutine, function block 424, which develops other matrices based on other available information, is an optional subroutine not required for the functioning of the system. For groups of set top terminals 220 or for each individual set top terminal 220, matrices may be developed based on the demographic information, billing information, pricing information, age information and other information which may be stored in the network controller 214 databases.

The third subroutine, block 426, processes all matrices through a set of correlation algorithms. In particular, this subroutine 426 takes matrices developed in the first two subroutines and processes the matrices until reaching a final matrix.

Figure 18:
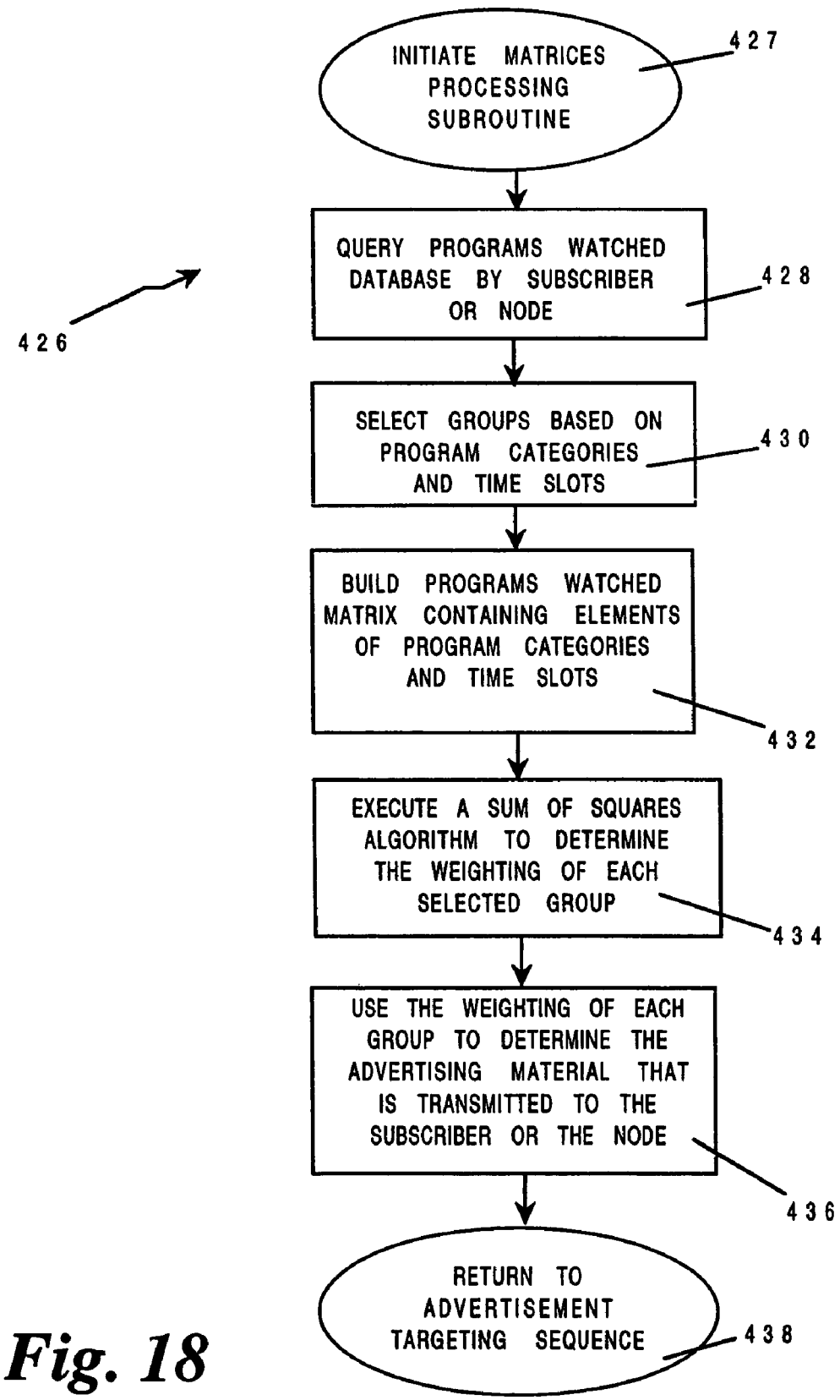
FIG. 18 is a block diagram of the subroutine flow chart for processing programs watched matrices through correlation algorithms.

FIG. 18 diagrams an embodiment of this matrices processing subroutine 426 which is called by the advertisement targeting sequence shown in FIG. 17. As shown in FIG. 18, the subroutine 426 is initiated 427 and then accesses or queries, block 428, the programs watched file and gathers information regarding either an individual subscriber or a node of subscribers. The software can gather the programs watched information in this way for individual subscribers or a set of subscribers.

Once the programs watched information has been gathered from the databases, the routine 426 selects and groups, function block 430, programs watched based on program categories and time slots. The software initially takes each program category (e.g., sports, news, movies, etc.) and establishes the number of programs watched for a given time slot. The time slots may be set to any length of time, including, for example, one, two, three or four hour timeframes. The software will loop through such a counting process for each group and timeslot and then proceed to build a programs watched matrix, block 432, based on the program categories and time slots. Essentially, all programs watched in a particular category and time slot will be entered into the programs watched matrix. Once the matrix has been built, the subroutine 426 will process the matrix for a given subscriber or node of subscribers through the correlation algorithms.

A number of correlation algorithms may be used to weight each selected program category group. For example, as shown at block 434, a sum of squares algorithm may be used to determine the weighting. Once the groups have been weighted, the weighted groups will be correlated, as at block 436, with various advertisements stored in the network control databases. The software can then select a set of the most heavily weighted advertisements for transmission to individual subscribers or sets of subscribers in a cable distribution network node. Having determined the weightings of each group and prioritizing the groups accordingly, the subroutine returns 438 to the advertisement targeting sequence 374 of FIG. 17.

Referring back to FIG. 17, the fourth subroutine, as represented at function block 428, uses the final matrix developed by the correlation and weighing algorithm described above, to select a grouping (or selective filter) for each set top terminal 220. The final groupings of advertisement that may be sent to the set top terminals 220 or node of set top terminals 220 may use a subroutine as diagramed in FIG. 19.

Figure 19:
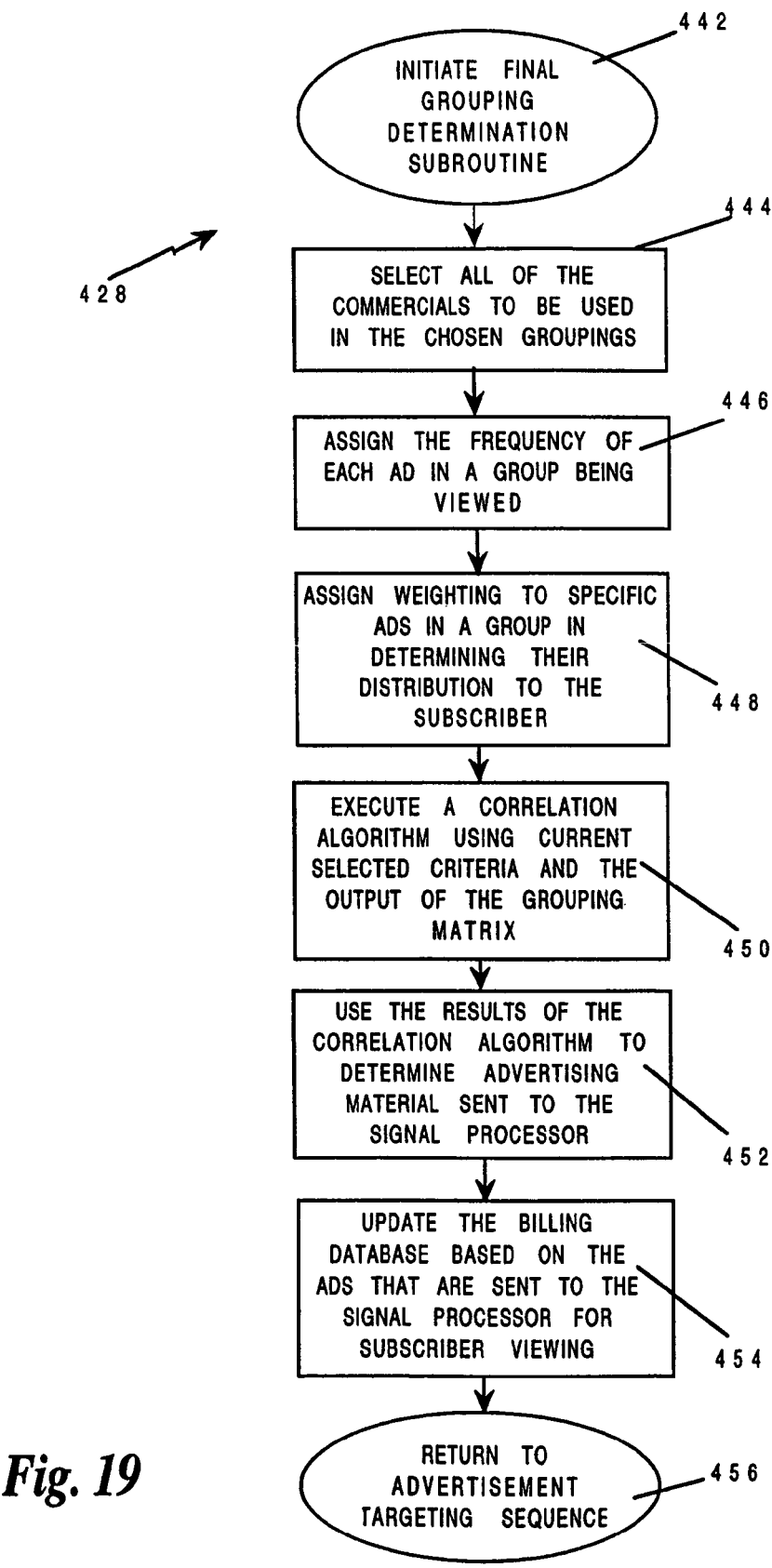
FIG. 19 is a diagram of the subroutine flow chart for determining final groupings of set top terminals.

The subroutine 428 depicted in FIG. 19 is called or initiated by the advertisement targeting sequence 374 of FIG. 17 in order to determine the final groupings. Basically, this subroutine selects a set of commercials that will be used in the chosen groupings, function block 444. This selection process typically involves advertisements from various advertisement categories (from a number of advertisers which have purchased "air time"). Each advertisement will subsequently be assigned a number of times that it will be shown in a given timeframe, block 446. This frequency of display may be based on various factors, including the number of requests and cost paid by the respective advertisers to have the commercial displayed. Such factors are used in the next step of the subroutine, block 448, which assigns a weighting to specific commercials or advertisements in each advertisement category or group. These weightings are used to prioritize the advertisements that will be sent to individual set top terminals 220 or nodes of set top terminals 220.

Once the advertisements have been weighted, the software executes its correlation algorithm, 450, using selected criteria (i.e., the various factors used to weight the advertisements) as well as the output of each programs watched matrix. Any number of correlation algorithms and weighting algorithms may be used with the software, including the sum of squares weighting algorithm described above.

The results from the correlation algorithm subsequently determine the advertisements and programming material that is sent to the signal processor 209 for distribution over the cable network, as represented at block 452. Once the subroutine 428 completes these steps, the network controller CPU 224 updates the account and billing database based on the ads that are sent to the signal processor 209 for subscriber viewing, as shown at block 454. These billing database updates allow the advertisers to track the costs and frequency of the advertisements targeted to specific set top terminals 220 or nodes of set top terminals 220. Following the updates, the subroutine returns to the advertisement targeting sequence shown in FIG. 17, block 456.

Figures 20A, 20B:
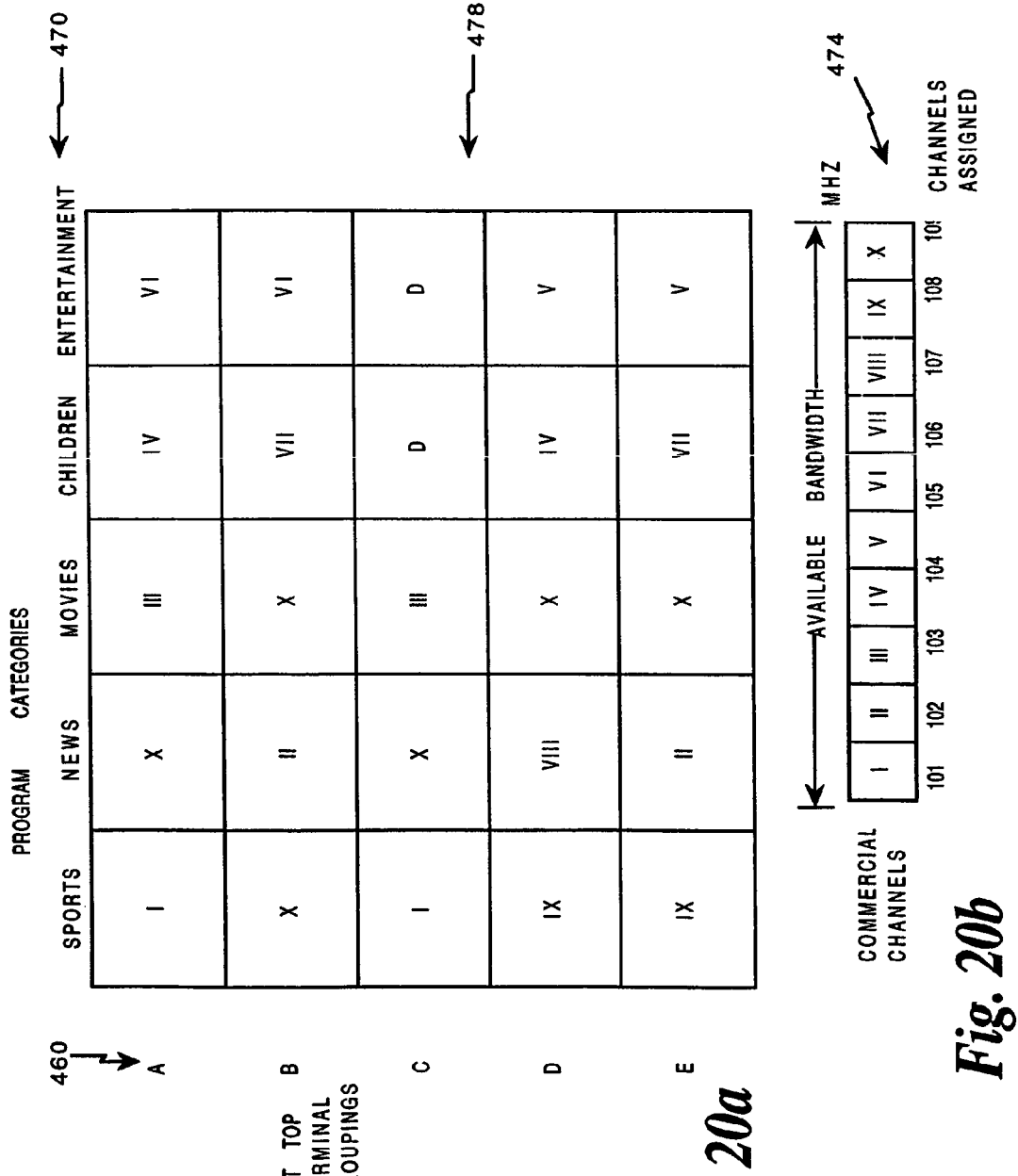
FIG. 20a is a diagram showing a sample assignment of advertising channels to set top terminal groups watching particular categories of programs.
FIG. 20b is a diagram assigning available bandwidth for multiple advertising channels.

Referring to FIG. 20a, set top groupings (A through E) 460 are shown. The number of set top groupings available is determined by the bandwidth available to transmit commercials. The bandwidth of the system will limit the number of commercials which are available at the set top terminal 220 at any given time.

Referring back to FIG. 17, the fifth subroutine, represented at function block 466, prepares set top group information for transmission to the set top terminals 220. This subroutine 466 modifies the PCI signal and includes set top group information in the information field of the frame format given earlier. The various methods for transmitting the group information to the set top terminals 220 are described below.

The sixth subroutine, block 468, selects the target video and is the last decision making process in targeting a commercial for a viewer and, can be performed by either the set top terminal 220 or the network controller 214. In the preferred embodiment, the set top terminal 220 performs this last step by correlating (or matching) the program being watched by the viewer with the set top group information that has been previously transmitted by the network controller 214, and the targeted video is then displayed, as shown at block 470. FIG. 20a shows an exemplary table matching set top terminal groups 460 and program category being watched 470 with a specific channel (continuously) showing commercials. The commercial channels are shown in FIG. 20b at 474 and are assigned Roman numerals I through X, for example. The number of set top groupings and channels showing commercials can vary. FIG. 20b shows a division of available bandwidth to carry ten videos, ten commercial channels. In this example, the channels 474 are numbered 101-110.

The network controller 214 will transmit group information to a set top terminal shown as row names 460 on FIG. 20a. The network controller 214 will also transmit data which informs the set top terminal 220 which of the multiple commercial channels 474 is assigned to a television program category shown as Columns 470 on FIG. 20a. Each set top terminal 220 only requires the data related to that set top terminal's assigned group (or row). For example, in FIG. 20a, the set top terminal in group A (row A) is provided with data on the commercial channel which are assigned for sports programs as I, children's programs as IV and movie category as III. In this manner, each set top terminal 220 is only required to store information related to its own grouping. Therefore, a set top terminal 220 which is in group A only needs to store the information related to group A, which is found in row A of FIG. 20a. This information includes one commercial channel assignment for each of the eight program categories. Using this information, the set top terminal 220 first determines the category of the television program currently being watched and then is able to quickly determine which channel to switch the viewer when an advertisement availability occurs during the program.

The network controller 214 can also perform the step of correlating program category watched 470 and set top terminal grouping 460 to select the target video. In order for the network controller 214 to perform this function, it must have information on the program currently being watched by the viewer. To obtain this information in a polling system, set top polling must occur on a real-time basis (i.e., 10 minutes).

During the target commercial selection process, the set top terminal programming will default to the existing commercial during a program if it is missing any of the information needed to determine which of the continuously playing commercial channels to show. In alternative embodiments, the default that is shown on the regular programming channel will correlate with one of the assigned set top groupings and program categories. FIG. 20a shows, at 478, that the default has been assigned to set top terminal grouping C for program categories "children" and "entertainment."

The three preferred methods to transmit targeted commercials to a set top terminal 220 are: (1) the Additional Bandwidth method (or individual video access); (2) the Multiple Channel method, and (3) the Split Screen method. Each method has certain advantages and disadvantages. The Additional Bandwidth method allows the most flexibility by more specifically targeting commercials before the commercials are transmitted to a set top terminal 220. However, it requires a great deal of available bandwidth in the delivery system. This is difficult with a cable system 200 but possible when a telephone or personal communications system is used to transmit the commercials to the set top terminal 220.

The Additional Bandwidth method allows the network controller 214 to run through a set top terminal's specific correlation algorithms and target specific commercials from hundreds for each set top terminal 220. This method allows for the greatest customizing of targeting and allows for a greater selection of commercials to be shown. Only after a commercial advertisement is selected by the network controller 214 for the specific set top terminal 220 does transmission of the commercial occur.

Figure 24A:
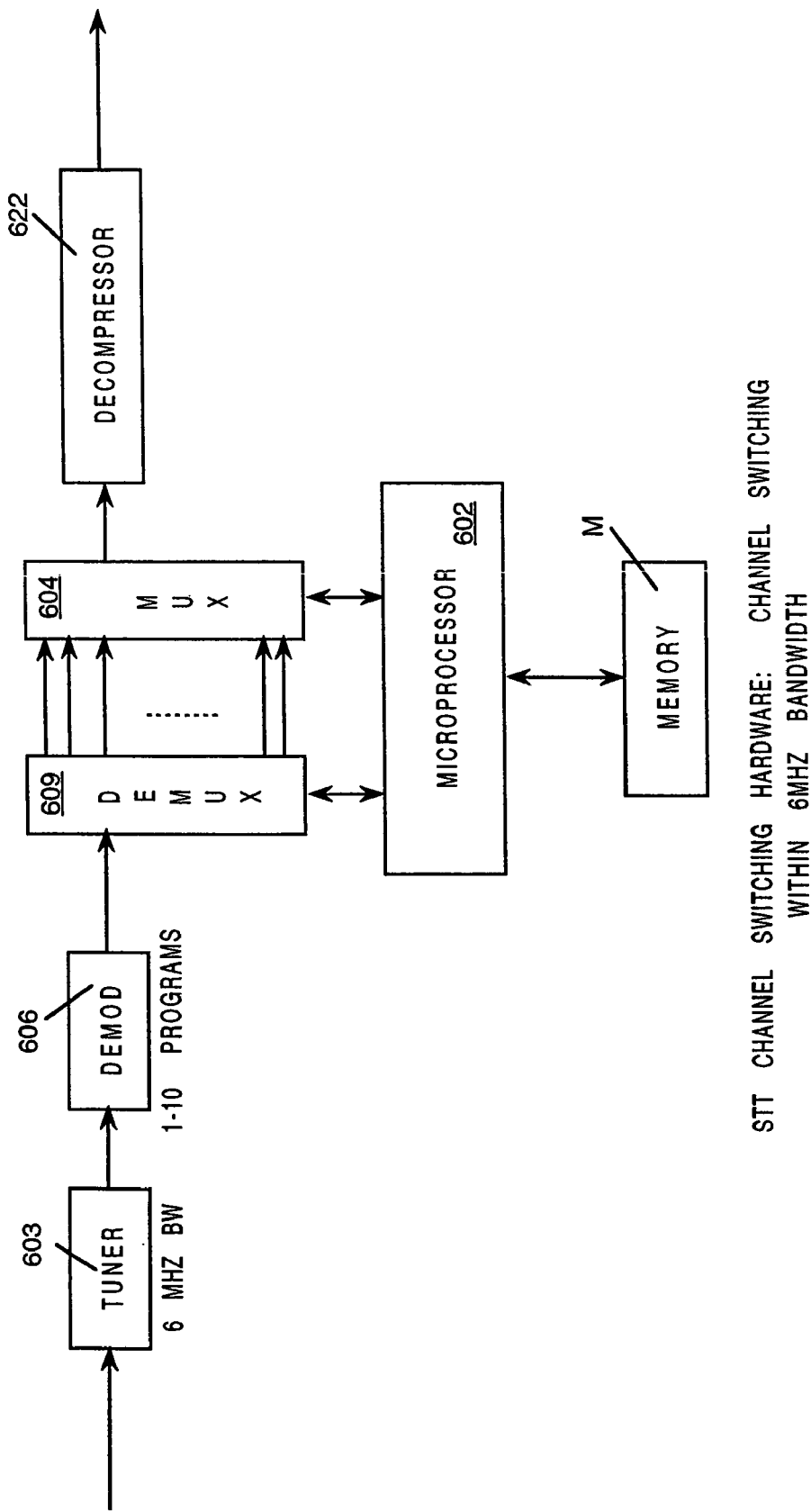
FIG. 24a is a schematic of a set top terminal.
Figure 24B:
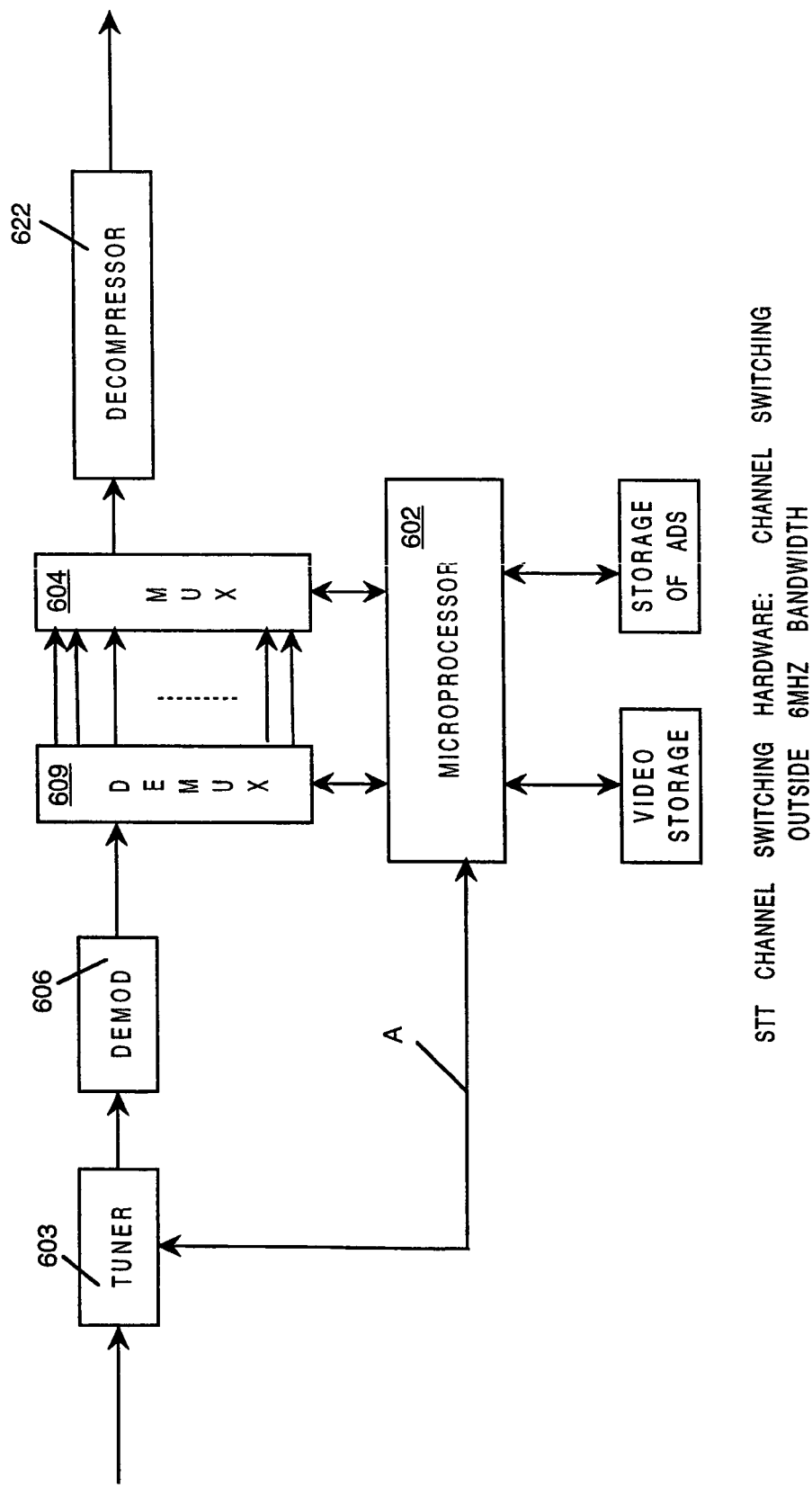
FIG. 24b is another schematic of a set top terminal.

The Multiple Channel method requires a set top terminal 220 "transparently" to change channels during a scheduled advertisement from the channel of the currently viewed program to the channel which is carrying the targeted commercial. Although this channel changing method may be transparent to the viewer, it creates difficulty in terms of timing and synchronizing the commercials to begin and end during an advertisement availability occurring in the normally scheduled program. The channel changing is done within the set top terminal 220 using the existing tuner(s). The hardware required to accommodate such transparent channel switching capabilities are shown in FIGS. 24a, and 24b. FIG. 24a shows the set top terminal hardware components which accommodate channel switching within a single 6 MHz channel bandwidth. These components include a tuner 603, a demodulator 606, a demultiplexer 609, a multiplexer 604, a decompressor 622, a microprocessor 602, and local memory M. The tuner 603 operates by tuning to a specific 6 MHz bandwidth which includes the displayed video and a number of channels carrying advertisements. The demodulator 606 processes these signals and sends them to the demultiplexor 609, which converts the received signal into separate program and advertisement signals. During this processing, the microprocessor 602 coordinates the demultiplexing of the programming signals. Once the video signal pauses for a commercial break, the microprocessor 602 instructs the multiplexer 604 to select the advertisement or advertisements for decompression and subsequent display on the subscriber's television. This hardware configuration allows the set top terminal 220 to switch between channels within the 6 MHz bandwidth and display various advertisements for viewing, regardless of the video currently being watched by the subscriber.

Where a targeted advertisement falls outside the tuned 6 MHz bandwidth containing the video that the subscriber is currently watching, the hardware configuration shown in FIG. 24b is used. In this configuration, the microprocessor 602 instructs the tuner 603 to return to another 6 MHz channel bandwidth, as represented by bi-directional arrow A.

Figure 24C:
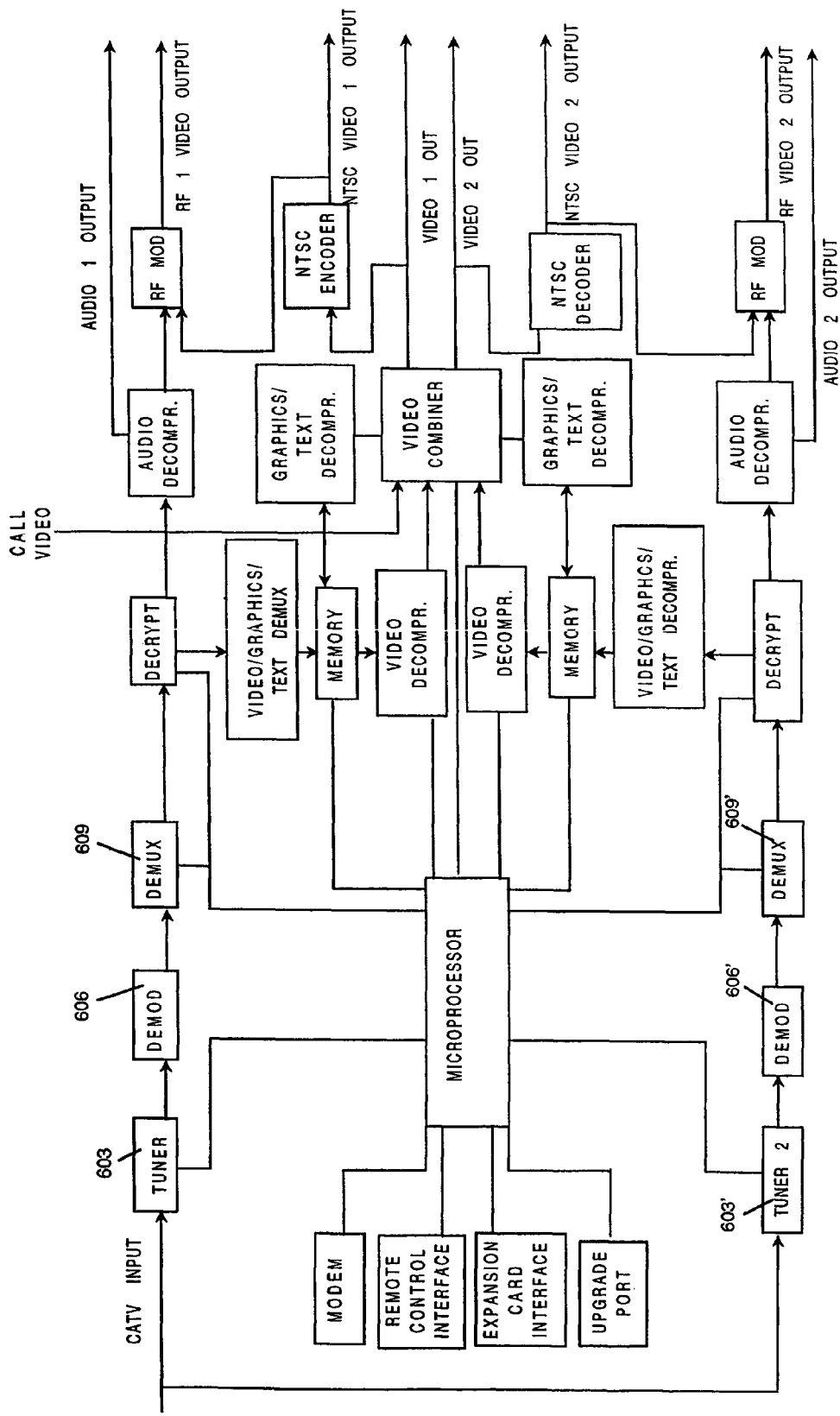
FIG. 24c is yet another schematic of a set top terminal.
Figure 24D:
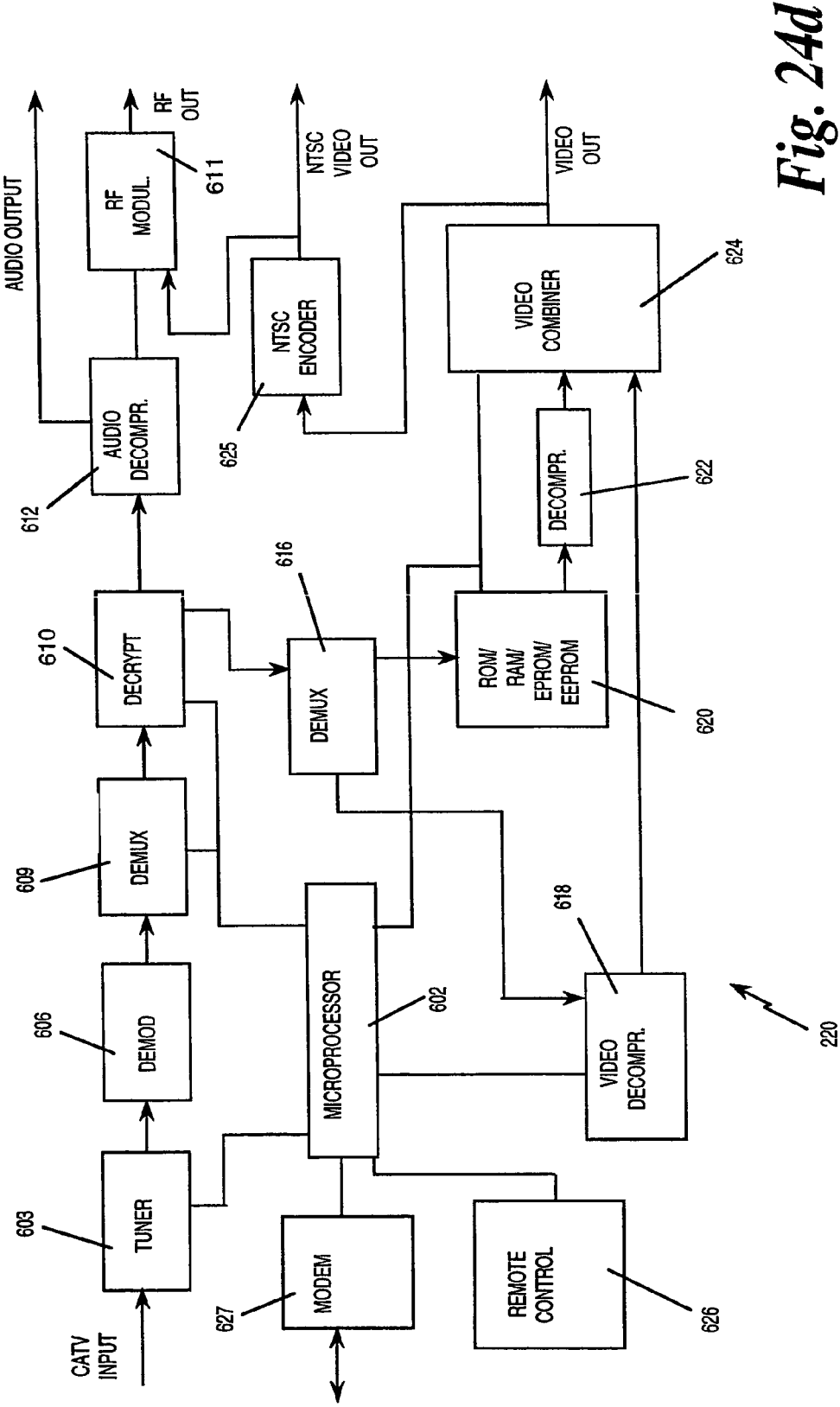
FIG. 24d is still another schematic of a set top terminal.

Working together, the microprocessor 602 and tuner 603 allow targeted advertisements, which have been transmitted in another 6 MHz bandwidth, to be tuned with minimal acquisition time and delay. In particular, this configuration allows the set top terminal 220 to tune outside a given 6 MHz bandwidth (to another 6 MHz bandwidth) in order to select a targeted advertisement for display. This alternative embodiment may require the use of a full screen mask in order to minimize any annoying screen rolling during the tuning process. The masking is intended to cover any glitches which would otherwise be displayed during the acquisition time (e.g., 0.5 seconds) for returning to another 6 MHz channel bandwidth.

Where the acquisition time or delay becomes unreasonable, an alternative embodiment can include the use of two tuners similar to the configuration shown in FIG. 24c. This alternative configuration using two tuners, trades an increased cost for lower acquisition times. In set top terminals 220 equipped with two tuners, the terminal can use the second tuner to tune the channel showing the commercial. (Set top terminals with two tuners are described in detail in co-pending patent application Ser. No. 08/160,194, now issued U.S. Pat. No. 5,990,927, entitled, ADVANCED SET TOP TERMINAL FOR CABLE TELEVISION DELIVERY SYSTEMS, incorporated herein by reference. Again, the channel changing is transparent to the viewer who believes the same channel is continuously being shown. The Multiple Channel method has the disadvantage of requiring that sufficient additional channels be available (by less bandwidth than Available Bandwidth method). Those skilled in the art will recognize a number of other configurations of set top terminal hardware that will accommodate a transparent channel switching feature.

The Split Screen method transmits multiple commercials on a single channel using a split screen technique; commercials being pre-recorded and prepared prior to transmitting to the set top terminal 220. Although many commercials can be transmitted on a single channel, in the preferred form of the split screen method, only four commercials are shown. As the number of commercials increases the size and the amount of video information transmitted for each commercial decreases proportionately (i.e., 6, 8, 12, etc.). Using split screen methodology, either a masking technique or a scaling and repositioning of video technique must be used at the set top terminal 220 to show the ad. The masking and repositioning-scaling techniques are further defined in co-pending application Ser. No. 08/160,193, now issued U.S. Pat. No. 5,734,853, entitled, SET TOP TERMINAL FOR CABLE TELEVISION DELIVERY SYSTEMS, owned by the assignee of the present invention and incorporated herein by reference. The scaling and repositioning technique produces better quality commercials, but requires expensive equipment at the set top terminal 220. The set top terminal 220 will perform audio switching with the split screen method to amplify the correct audio.

12. Alternatives to Basic Advertisement Targeting Routine

Figure 21:
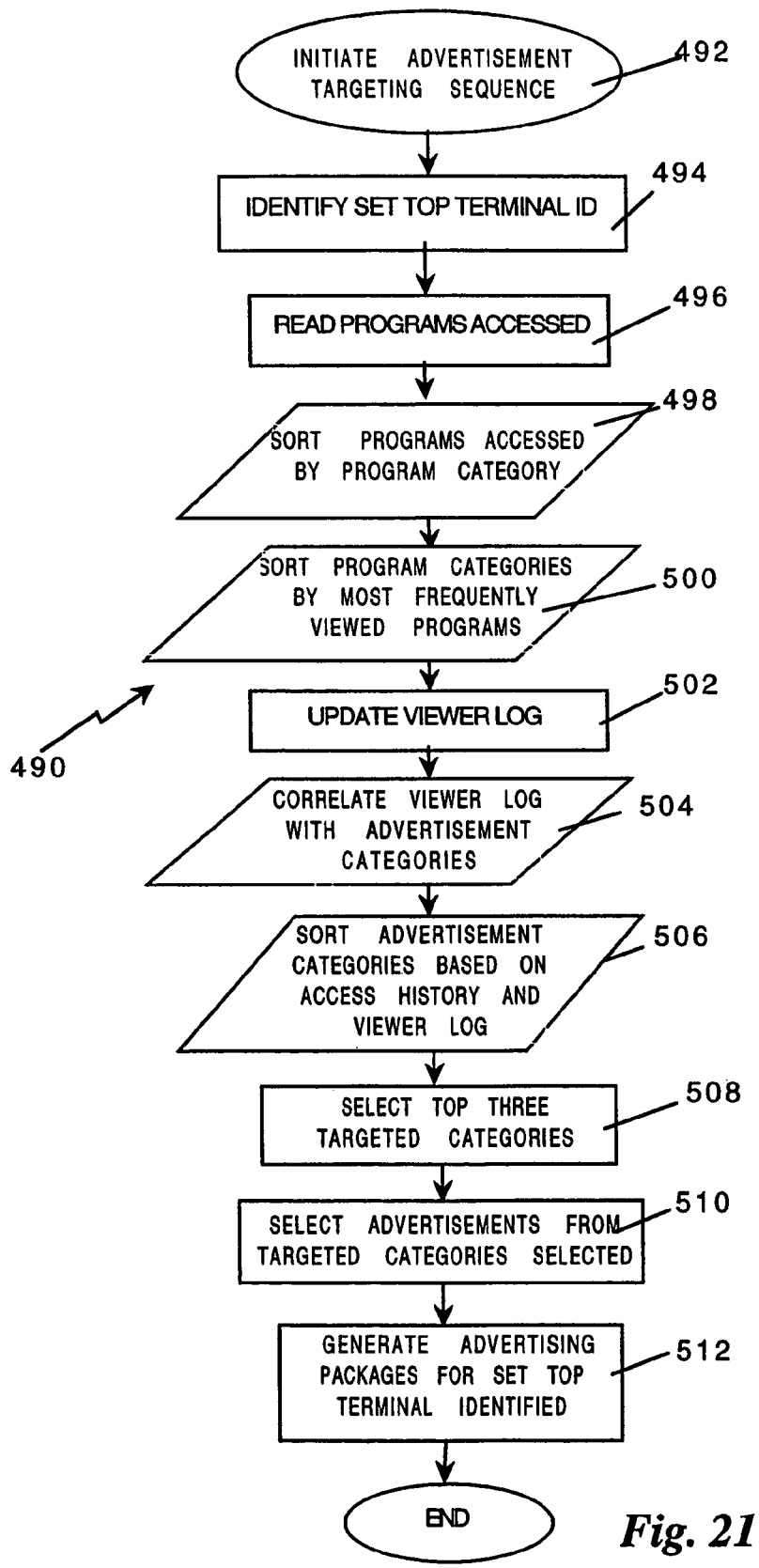
FIG. 21 is a diagram of the software flow chart for an alternative to the Basic Advertisement Targeting routine.

FIG. 21 shows a software program flow 490 that is an alternative to the network controller's Basic Advertisement Targeting routine 374, depicted in FIG. 17. The alternative program 490 allows each set top terminal 220 to be individually targeted with specific advertisements and is initiated automatically, block 492, by the network controller CPU 224 upon receipt of each polling response from a set top terminal 220. Thus, once the network controller 214 receives program access information from a set top terminal 220, the network controller CPU 224 begins the process of selecting a package of advertisements that is based on, among other things, that subscriber's demographic information and viewing history.

Upon receipt of a polling response from a set top terminal 220, the network controller CPU 224 reads the set top terminal identifier, 494, and the programs accessed, 496, from the polling response (or status report) (depicted in FIG. 10b). The network controller 214 writes information on the programs accessed to the Program Scheduling database 320, updating the Access History File which contains listings of all programs accessed within the past week, month or year.

With continued reference to FIG. 21, the network controller CPU 224 then calls a subroutine that sorts the programs accessed by program category, block 498. In turn, the program categories are sorted, 500, based on the number of times that programs appearing in each particular category are accessed. In so doing, this sorting subroutine determines and ranks those programs and program categories that are most frequently viewed by that set top terminal 220.

The subroutine can iteratively produce rankings for different time slots in a given day. In this way, different rankings can accommodate different viewing preferences during those time slots for a single set top terminal 220. For example, where rankings for eight three-hour time slots are desired, the subroutine determines a ranking of programs and program categories for each three-hour viewing period. Thus, a different ranking may be produced, for instance, for a morning time slot and an evening time slot. All rankings of programs and program categories for that set top terminal 220 are written to the Viewer Profile database 314, updating the Viewer Log File, as at function block 502.

Next, the network controller CPU 224 calls a subroutine that correlates the updated Viewer Log File with the Advertisement Categories File in the Advertisement Library database 322, block 504. By correlating these two files with one another, the subroutine assigns or correlates various categories of television commercials to each ranking of programs and program categories in the Viewer Log File. The categories of television commercials and advertisements that may be so assigned are found in the Advertisement Categories File indicated generally at 354 as part of the library 322 and may include: (1) Household Goods/Products, (2) Home Improvement and Maintenance, (3) Personal Hygiene, (4) Entertainment Items and Events, (5) Sporting Goods and Events, (6) Motor Vehicles and Related Products, (7) Foodstuffs and Beverages, and (8) Miscellaneous. Where, for example, the viewer has watched a sporting event, the Sporting Goods and Events, Home Improvement and Maintenance, and Foodstuffs and Beverages categories may be assigned to that particular sporting event/program and Sports program category.

Once the programs and program categories ranked in the Viewer Log File are correlated with the advertisement categories in the Advertisement Categories File, the routine calls a sorting subroutine that ranks the groups of advertising categories correlated based on other information in the database files. In the preferred system, this ranking is primarily based on data in the updated Access History File and the updated Viewer Log File, as shown at function block 506. By using data on the viewer's past program selections and demographic information, the subroutine ranks the correlated categories of advertisements according to those likely to be of most interest to that viewer.

After the advertisement categories have been sorted and ranked, the routine selects the top three advertisement categories as the targeted categories for a given time slot and viewer, block 508. Individual advertisements are then chosen from the Advertisements File, with all selections made from the targeted categories, 510. The advertisements that are selected are written to the Advertisement Targeting File from where advertising packages can be generated, function 512, for transmission to the set top terminal 220. Such packages are generated by the network controller CPU 224, which accesses the Advertisement Targeting File and includes the targeted advertisements in the PCI The entire routine is repeated for each set top terminal 220 and, alternatively, each viewer.

13. Account/Billing Routine

Figure 22:
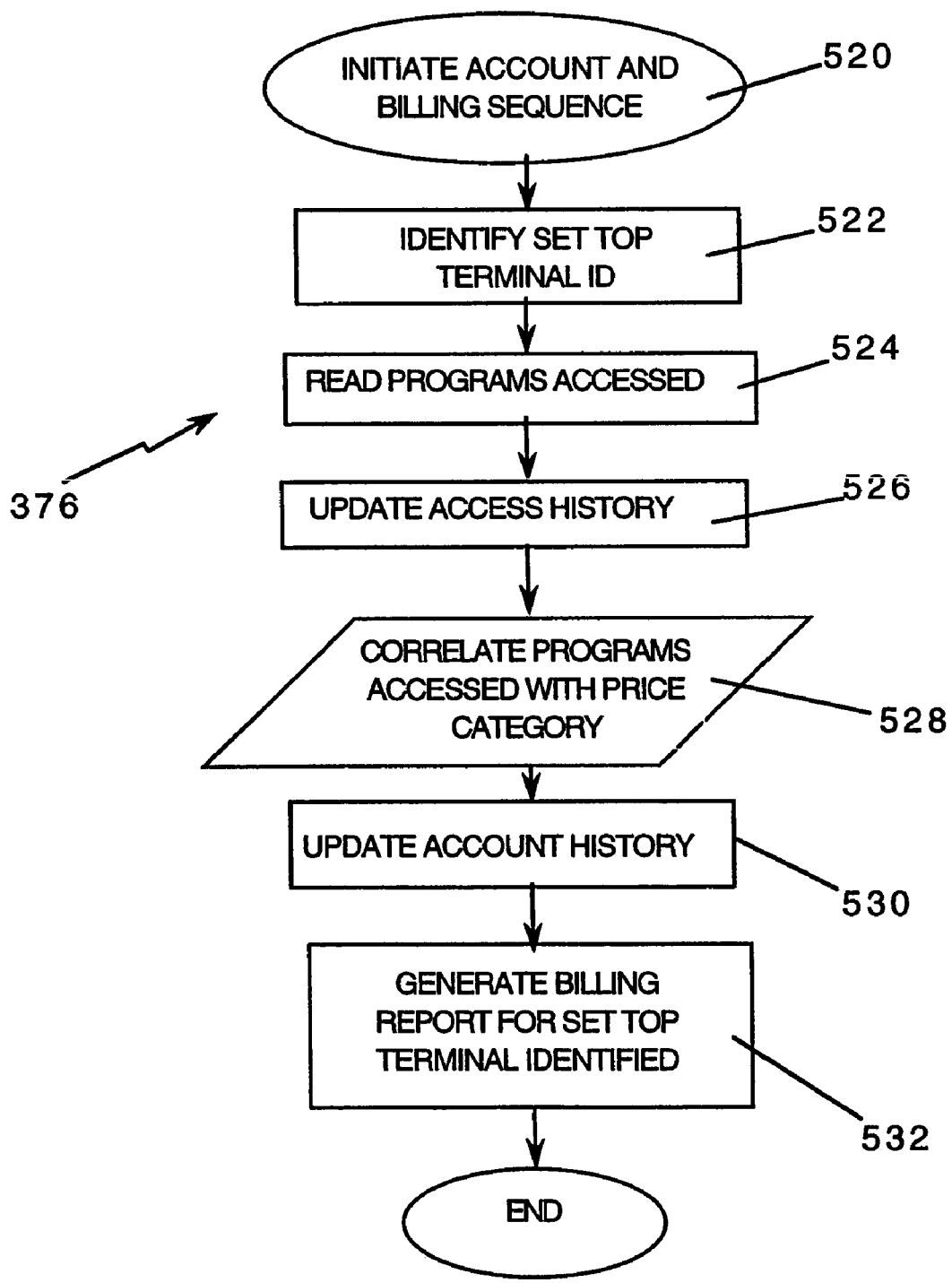
FIG. 22 is a diagram of the software flow chart for the Account/Billing routine.

FIG. 22 shows a software flow diagram for the network controller's Account/Billing routine 376, initiated automatically at block 520 by the network controller CPU 224 upon receipt of each polling response from a set top terminal 220. Upon receipt of such a response, the network controller CPU 224 identifies the set top terminal identifier from the polling response, block 522. The program access block in the polling response is also read, function 524, and the Access History File is updated with the received information, function 526. The routine then calls a subroutine that correlates the updated information in the Access History File with the Price Category File in the Program Library database, block 528. Once all programs accessed since the last polling cycle are assigned to a price category, the pricing information from each category is written to the Account History File, updating the file at 530. The network controller CPU 224 generates a billing report for each set top terminal 220 based on the updated account history, function 532. This billing report can be sent to the set top terminals 220 in a polling request. Specifically, in one embodiment, the information field of the frame format described in FIG. 9a is used to provide the set top terminal 220 with billing information.

Account information for each set top terminal 220 can be viewed through a monthly account review menu. The account information necessary to create the monthly account review menus may be stored either in the memory of the set top terminal 220 or at a remote location that communicates with the set top terminal 220. In the simplest embodiment, the set top terminal 220 records a subscriber's selections locally and calculates the monthly account review based upon the subscriber's selections which require the payment of fees. This monthly account information is stored locally and sent to the network controller 214 upon polling.

The Account/Billing routine is capable of processing account and billing information generated in other embodiments. For example, in an alternate embodiment, the subscriber's viewing selections and billing information may be continuously maintained at the network controller 214 or a remote site connected via communication lines to the cable headend 208. The network controller 214 or the remote site must regularly transmit the monthly account information to the set top terminal 220.

Each embodiment, such as local billing storage at the set top terminal 220, billing by the network controller 214 or billing by a remote site, has advantages and disadvantages. If the account information and processing is done locally at the set top terminal 220, each set top terminal 220 must be provided with the memory and necessary processing capability to maintain the account. This greatly increases the cost of a set top terminal 220. If the account information is maintained remotely, the remote site must remain in regular contact with the set top terminal 220 in order to provide the subscriber with billing information. To accommodate homes with multiple viewers two or more set top terminals 220 may be placed on a single bill or two accounts may be created for one set top terminal 220.

Figure 23:
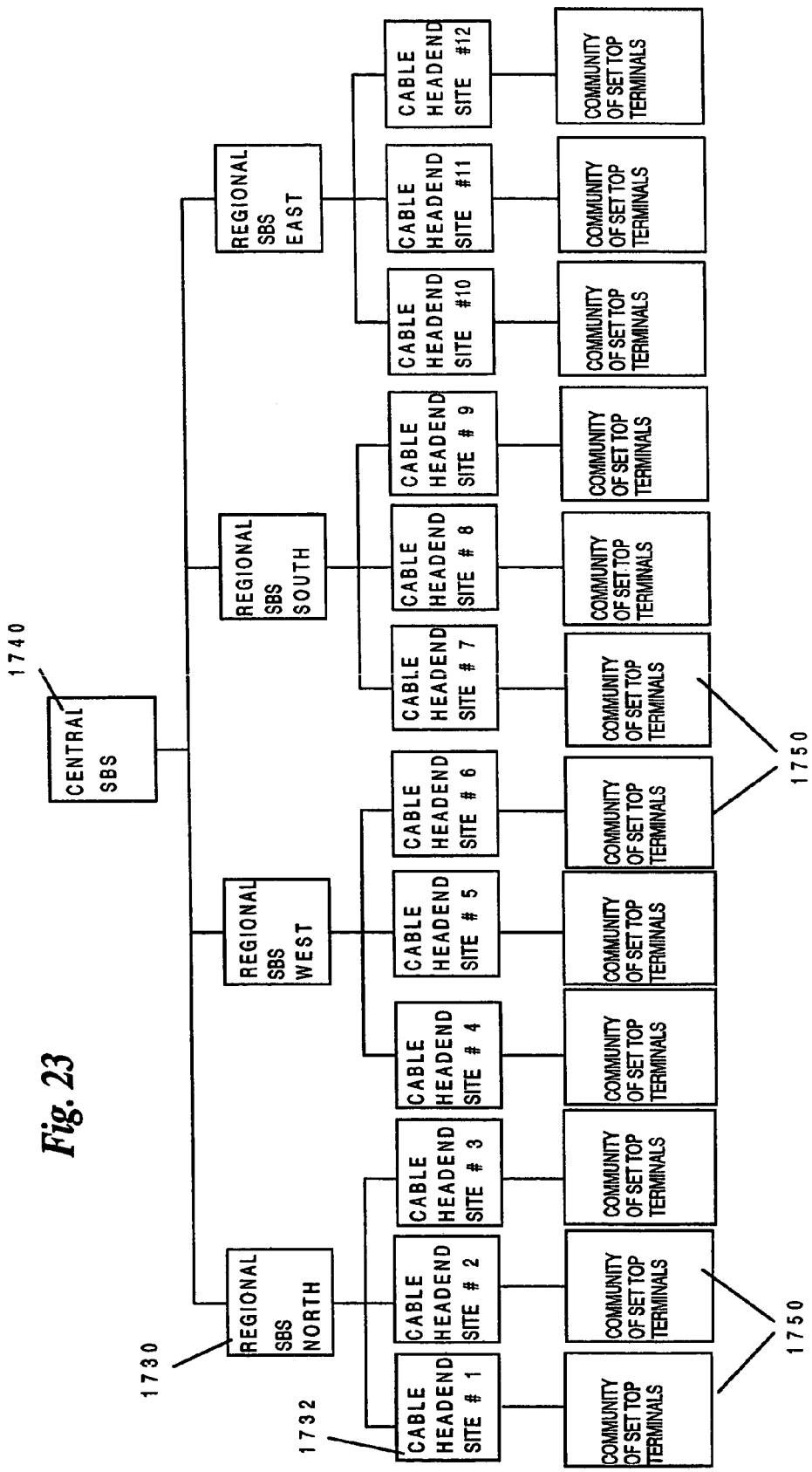
FIG. 23 is a diagram of an embodiment that uses remote statistical and billing sites.

FIG. 23 shows another embodiment in which billing may be accomplished through the use of remote statistical and billing sites (SBS). In this arrangement, statistical and billing information from individual communities of set top terminals 1750 is communicated through cable headend sites to regional statistical and billing sites 1730 (SBS). A regional SBS may serve several cable headend sites, shown at 1732. The regional SBS 1730 calculates billing and statistical information and passes necessary billing information back downstream through the network controller 214 at the cable headend 208 to an appropriate single set top terminal 220 in a subscriber's home. In addition, the regional SBS 1730 communicates the billing and statistical information received on program viewer choices to the central SBS 1740.

The central SBS 1740 accumulates the data received from a number of regional statistical and billing sites and calculates national statistical and billing information. In the preferred embodiment, the regional SBS 1730 prints and mails bills to subscribers. The central SBS 1740 can calculate program ratings, shares and HUTS (homes using televisions) for the nation and by region. With information from interactive TV programs, sophisticated statistical information may be gathered through the network controllers of the cable headends.

This arrangement for billing and statistical information provides the operators of the system with the advantages of distributive processing.

Remote billing sites may serve regions of the country by having each cable headend 208 in a region of the country connected to one regional billing site. The information from the regional billing sites may then be communicated on a less frequent basis to the operations center 202 or a central billing location. This method of distributed processing of billing enables the central billing location to receive fewer communications and be more efficient. In addition, the communication links between the cable headend's network controller 214 and regional sites will be of shorter distance than communication links to the operations center 202 from the cable headends 208. This should result in a cost savings to the system operator.

Regional statistical and billing may, however, be eliminated and all communications from the cable headend 208 may proceed to the Central SBS 1740. In fact, the Central SBS 1740 can be collocated with the operations center 202 and all functions performed at one central location. If the cable program packaging and delivery system 202 is established in just one locale, the network controller 214 can perform all the statistical and billing procedures.

C. Targeted Advertising Using Menu System

C.1. Menu Structure

Figure 25:
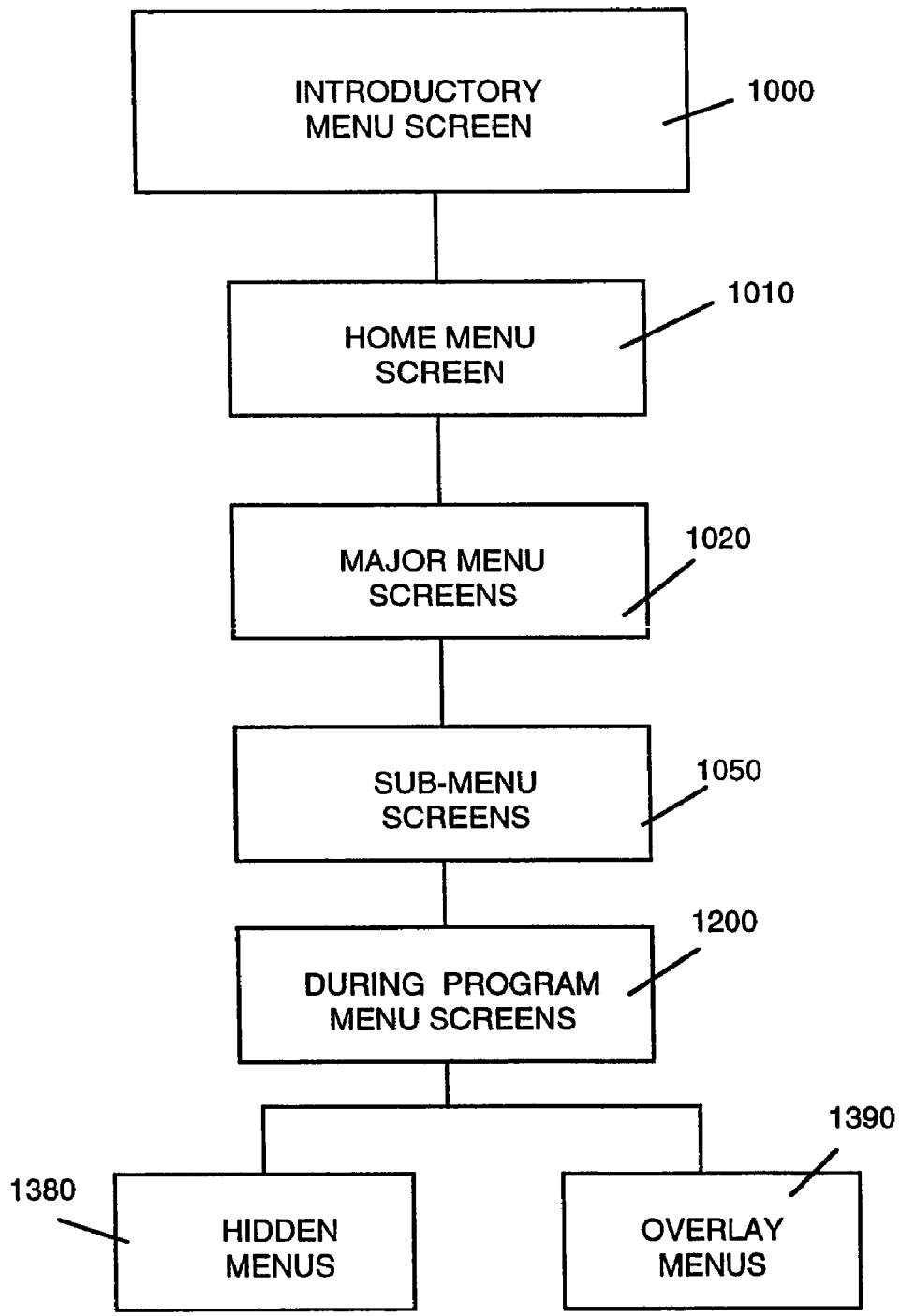
FIG. 25 is a flow chart of the progression of primary menus in the menu driven system of the set top terminal.

FIG. 25 shows a series of menus having a normal or standard format for a variety of alternative embodiments of the invention. An Introductory menu screen 1000 that is displayed upon power up, and that contains important messages, followed by a Home menu 1010 with major programming categories is the basis upon which many alternative embodiments of the menu driven selection process can be built.

Skipping a sequence or level of the menu structure is possible and perhaps desired in certain instances. In simple alternate embodiments it is possible to combine the Home menu 1010 and the Introductory menu 1000 into one menu that performs both functions. It will be obvious to one skilled in the art that the specific functions of the Home menu 1010 and the Introductory menu 1000 may be exchanged or shared in a number of ways. It is also possible to allow a user to skip directly from the Introductory menu 1000 to a submenu 1050. This can be accomplished most easily with a separate direct access remote control 900 button. Generally, a user will access a television program through execution of a submenu 1050.

The During program menus 1200 are enacted by the set top terminal 220 only after the user has selected a television program. These menus provide the user with additional functionality and/or additional information while he is viewing a selected program. The During program menus 1200 sequence can be further subdivided into at least two types of menus, Hidden Menus 1380 and Program Overlay Menus 1390.

To avoid disturbing a user during viewing of a program, the Hidden Menus 1380 are not shown to the user but instead "reside" at the set top terminal 220 microprocessor. The Hidden Menus 1380 do not effect the selected program audio. The microprocessor awaits a button entry either from the remote control 900 or the set top terminal 220 buttons before executing or displaying any Hidden Menu options. The Hidden Menus 1380 provide the user with additional functions such as entering an interactive mode or escaping from a selected program.

Program Overlay Menus 1390 are similar to Hidden Menus 1380 in that they occur during a program. However, the Program Overlay Menus 1390 are overlayed onto portions of the television screen and not hidden. The Program Overlay Menus 1390 allow the user to continue to watch the selected television program with audio but place additional information on portions of the television screen. Most overlays cover small portions of the screen allowing the user to continue to comfortably view the program selection. Other Overlays that are by their nature more important than the program being viewed will overlay onto greater portions of the screen. In an embodiment, some Program Overlay Menus 1390 reduce or scale down the entire program video screen and redirect the video to a portion of the screen.

Figure 26:
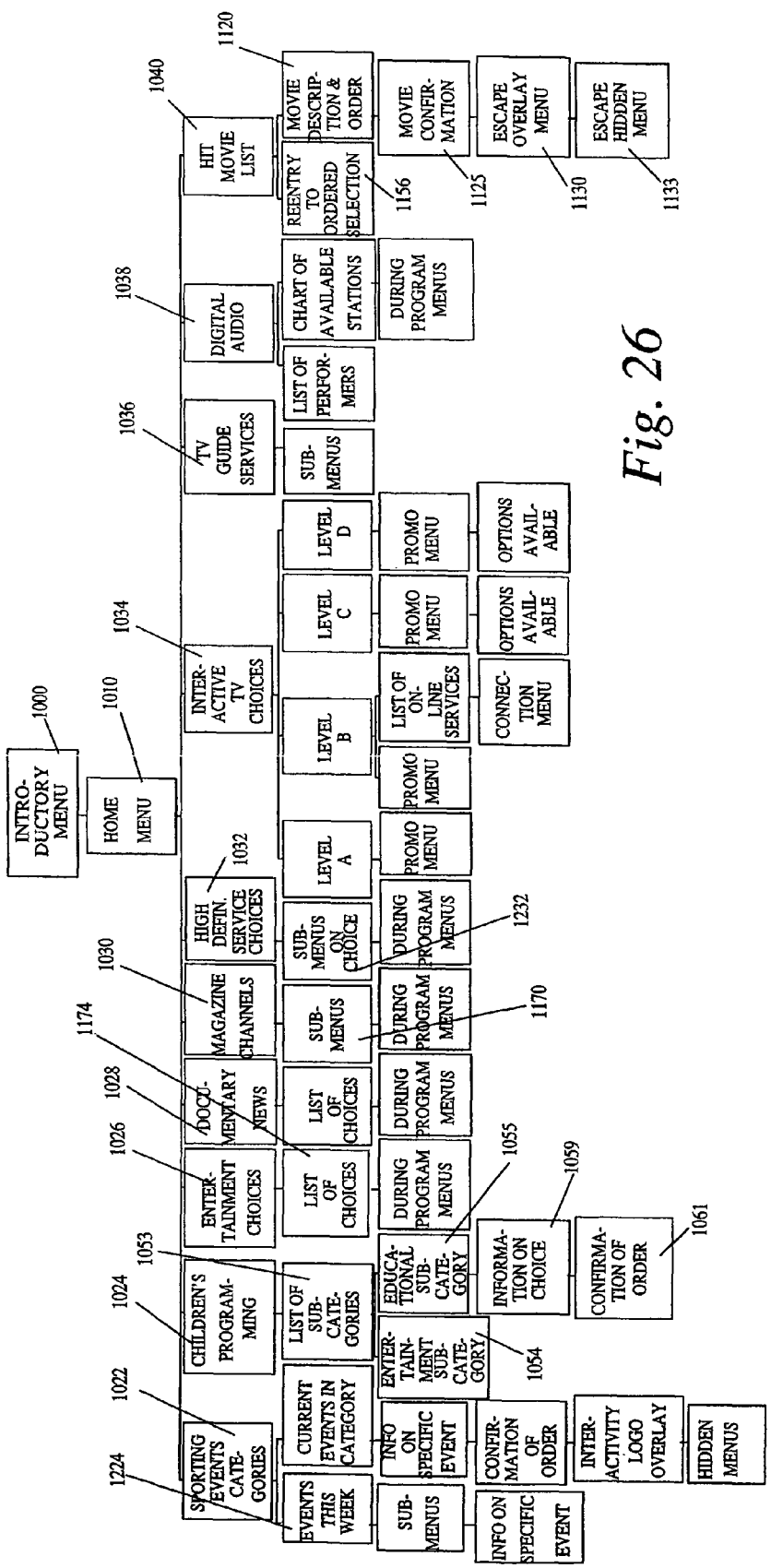
FIG. 26 is a drawing of basic menus according to an embodiment of the invention.

FIG. 26 shows an embodiment for user selection of television programming. The Introductory menu 1000 followed by the Home menu 1010 is the preferred sequence of on-screen displays. In the embodiment shown in 26, the Home menu 1010 provides a choice of ten major menus 1022, 1024, 1026, 1028, 1030, 1032, 1034, 1036, 1038 and 1040. Upon selection of a major menu 1020 from the Home menu 1010, the program proceeds to the major menu 1020 offering further viewer selections. Each major menu 1020 may be customized to target the expected viewership. Depending on the number of available program choices, the major menus 1020 either breakdown the major category into sub-categories or provide the user with access to further information on a particular program.

For example, the major menu 1024 for children's programming provides a list of subcategories 1053 from which the user selects. Upon selection of a subcategory, a submenu 1054, 1055 listing program choices within that sub-category is shown to the user. Upon selection of a particular programming choice within the submenu 1055, the user is then provided with a second submenu 1059 describing the program that the user has selected. From this menu, the user may now confirm the program choice and receive a confirmation submenu 1061 from the set top terminal 220 software.

Since the system utilizes digital signals in compressed format, High Definition Television programming can also be accommodated through the menu system. In addition, since the set top terminal 220 has two way communication with the cable headend, interactive television programming is possible, with return signals generated by the set top terminal 220. Similarly, the system can support "movies on demand" where a user communicates through the set top terminal 220 with an automated facility to order movies stored at the facility.

Using this on-screen menu approach to program selection, there is nearly an unlimited number of menus that can be shown to the user. The memory capability of the set top terminal 220 and the quantity of information that is sent via the program control information signal are the only limits on the number of menus and amount of information that can be displayed to the user. The approach of using a series of menus in a simple tree sequence is both easy for the user to use and simply implemented by the set top terminal 220 and the remote control 900 with cursor movement. A user interface software programmer will find many obvious variations from the preferred embodiment shown.

Figure 27A:
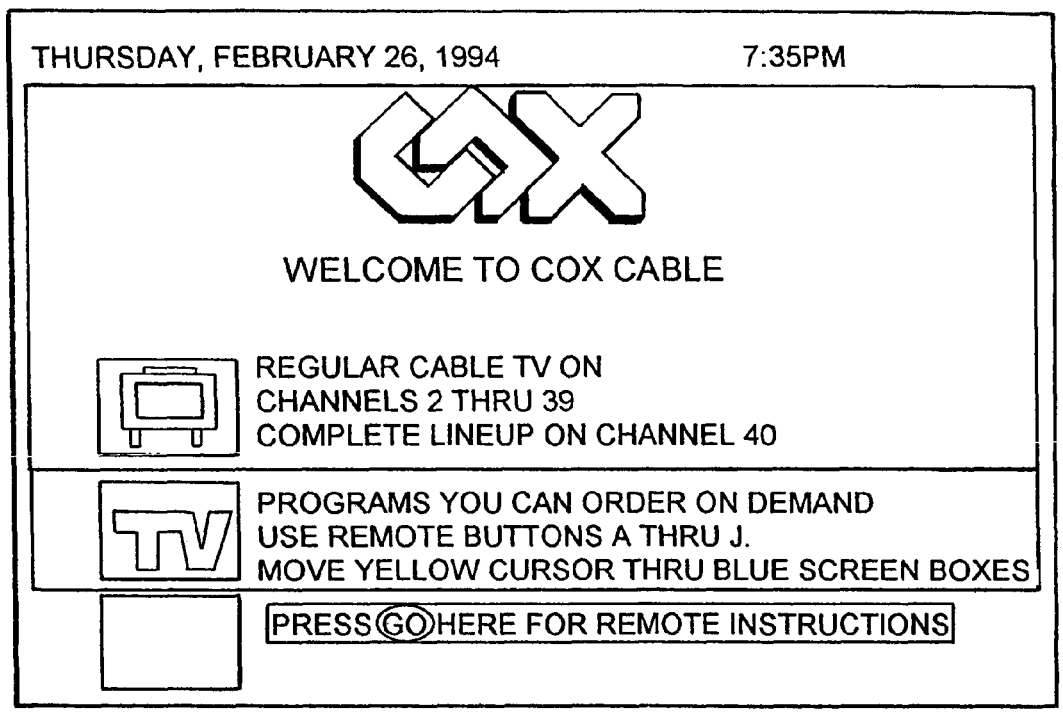
FIGS. 27a and 27b are drawings of introductory menus.
Figure 27B:
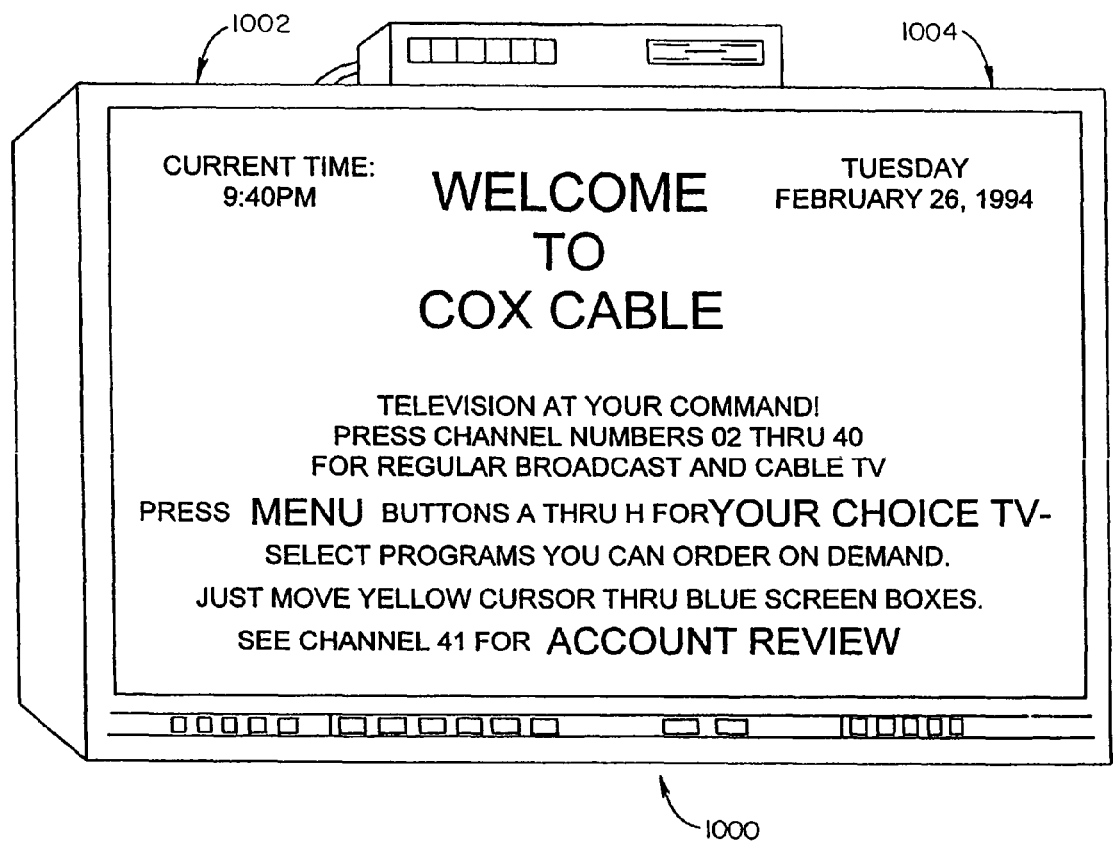

FIGS. 27a and 27b show examples of Introductory menu screens that are displayed on the user's television. The embodiment shown in FIG. 27a welcomes the user to the cable system and offers the user three options, for example. The user may choose regular cable television (channels 2 through 39), videos on demand (e.g., movies), or instructions on the use of the remote control 900. Other basic program options are possible on the Introductory menu screen 1000. For example, instead of, or in addition to, the remote control 900 instructions, a system "help" feature can be offered on the Introductory menu 1000.

FIG. 27b shows an alternate embodiment for the Introductory menu screen 1000. In the upper left-hand corner of the menu, is a small window 1002 that may be customized to the user. The user may be given the option of showing the current time in this window. In the upper right-hand corner a second customized window 1004 is available in which the user may show the day and date. The windows 1002 and 1004 may also be customized for users to show military time, European date, phase of the moon, quote of the day, or other informational messages, including promotionals, infomercials and advertisements. The windows 1002 and 1004 may be customized by users using on-screen menu displays following the Introductory menu 1000, or informational messages may be provided by a remote site such as the operations center 202.

In an embodiment, the user is given the capability of accessing basic channels such as regular broadcast television and standard cable television channels directly from the Introductory menu 1000 by entering the channel number. The user is also given the capability of directly accessing his account with the cable television company. Further, in the embodiment, the user may directly access a major menu 1020 and bypass the Home menu 1010. If the user is familiar with the programming choices available on the major menus 1020, he may select an icon button, or a lettered key (alpha key) from the remote control 900 and directly access the desired major menu 1020. If any key entry other than those expected by the set top terminal 220 software program is made, the Home menu 1010 is placed on the television screen. If, after a period of time, no selections are made from the Introductory menu 1000, the program may default to the Home menu 1010.

FIGS. 28a, 28b, 28c, and 28d are examples of Home menus 1010 that may be used in the set top terminal 220 software. FIGS. 28a-28d all employ multiple window techniques to make the menu user friendly and offer a significant number of choices. A channel line up and the major menus 1020 may both appear on the Home menu 1010.

Figure 28A:
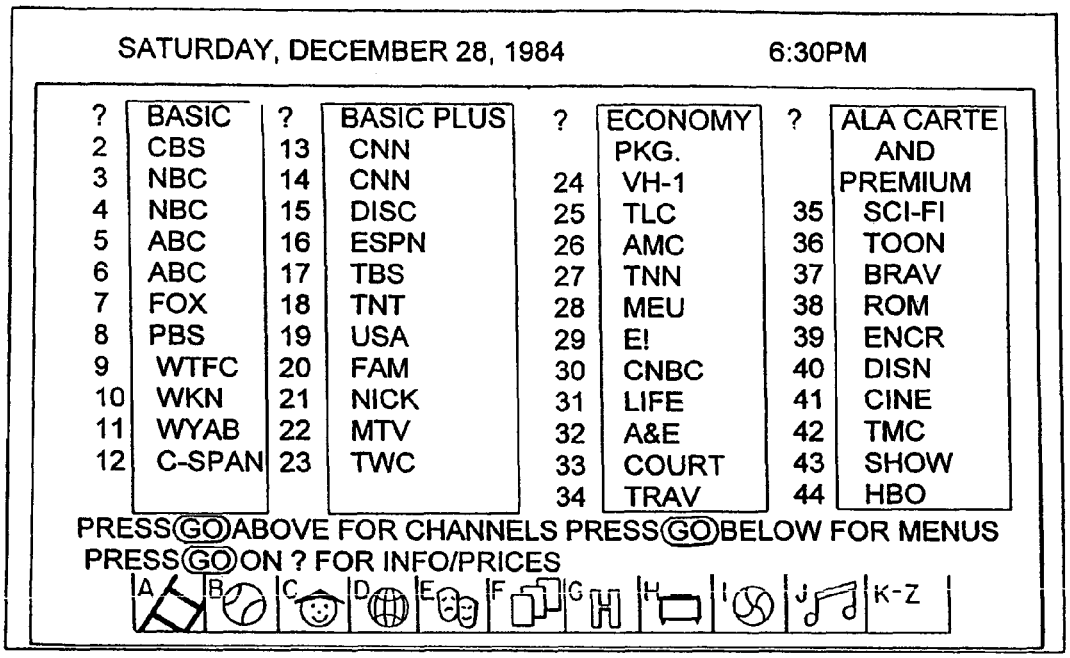
FIGS. 28a, 28b, 28c and 28d are drawings of home menus.

In FIG. 28a, the Home menu 1010 displays both the standard channel line up and the video on demand icons for selection by the user. FIG. 28a also shows various levels of subscription programming, including a "Basic" cable package and a "Basic Plus" package. Each of the choices of subscription programming preferably is assigned a different color. This increases the user friendliness of the present invention.

Figure 28B:
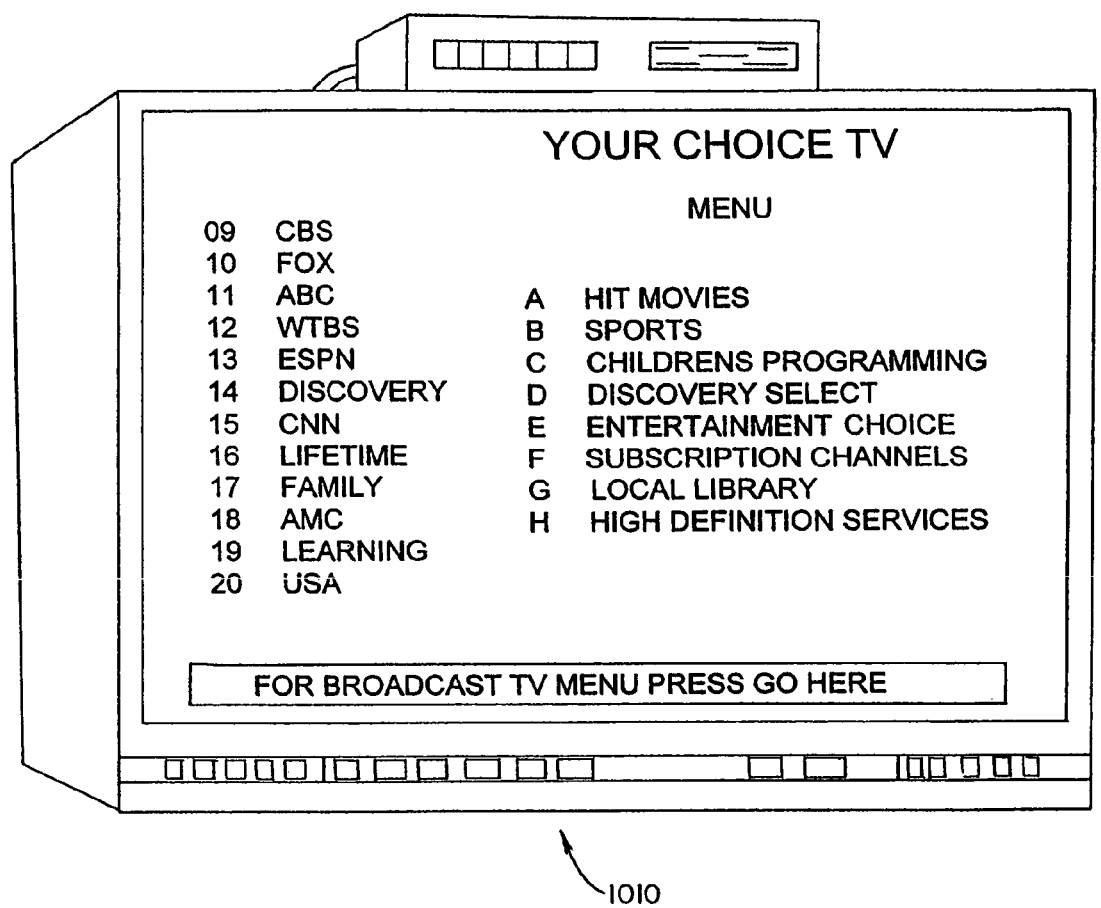
Figure 28C:
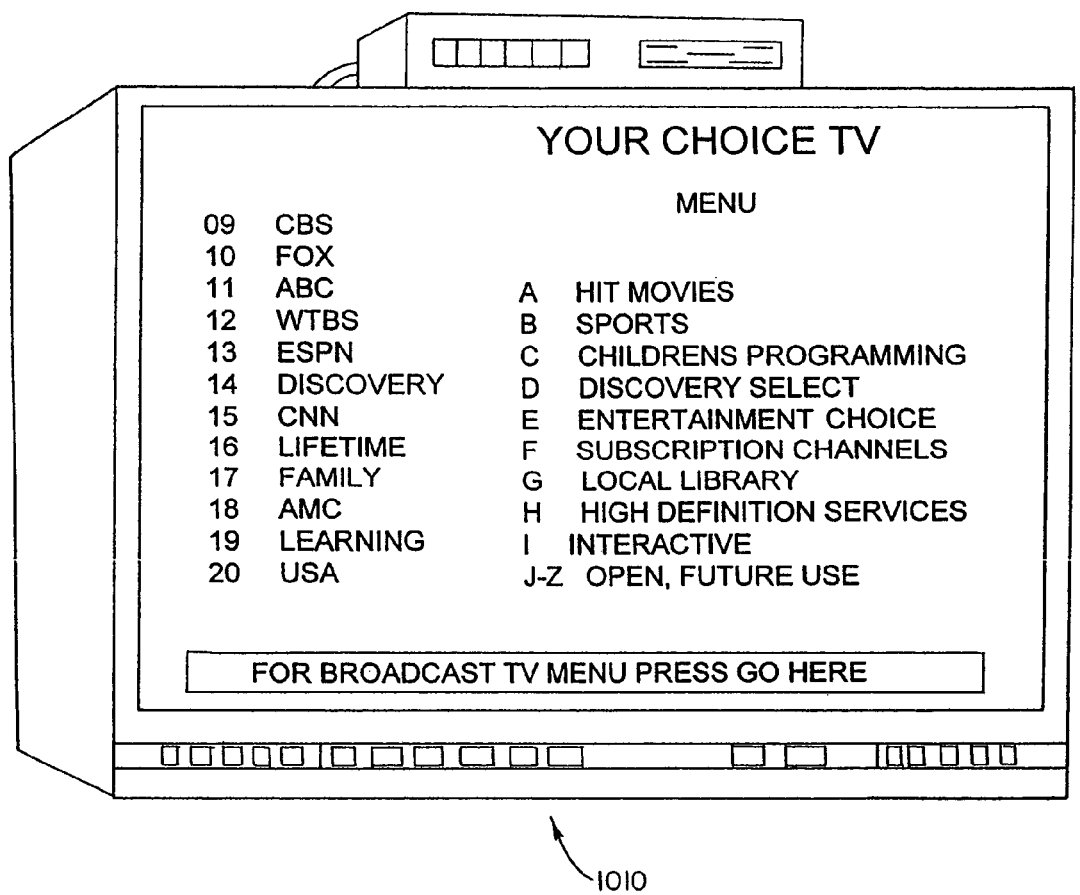
Figure 28D:
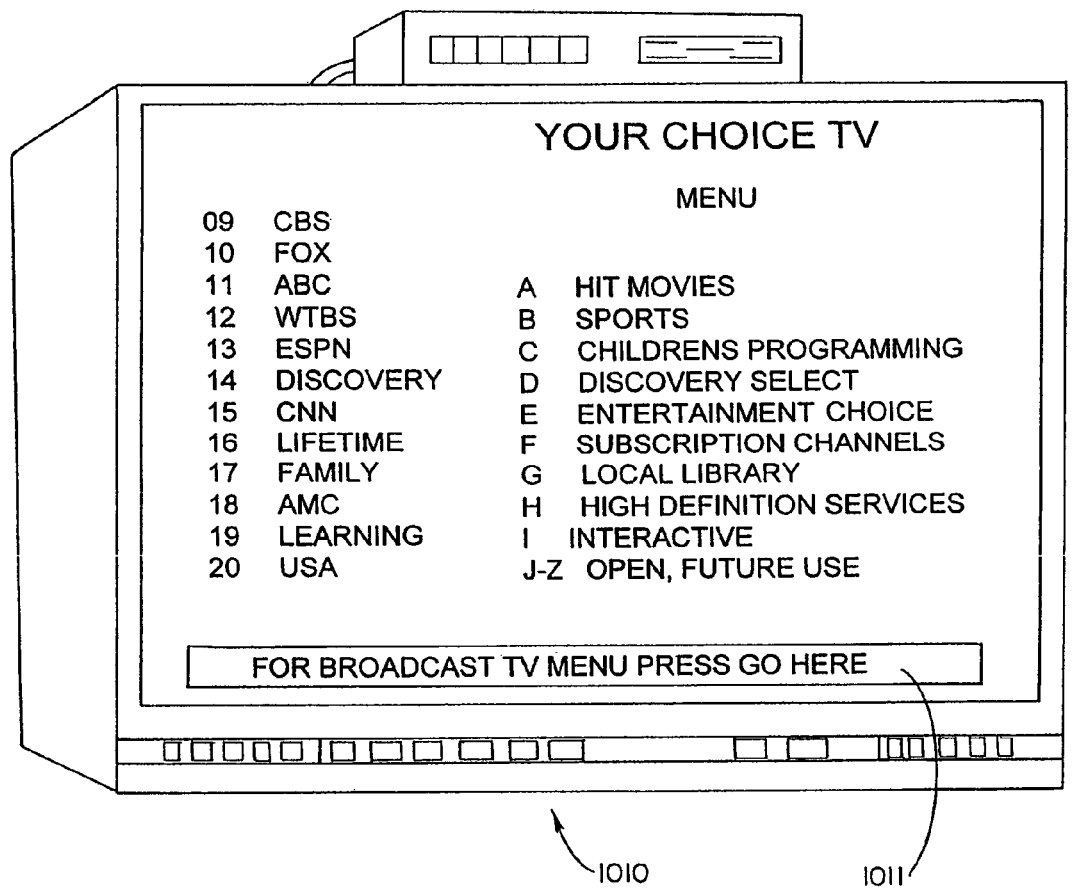

In FIGS. 28b-28d, the left half of the screen is used to list the channel number and network abbreviation of the most popularly watched networks. The right half of the screen offers access to a variety of major menus 1020 listed by category names.

FIG. 28b shows an embodiment in which only eight major menus 1020 are utilized. By pressing the alpha-numeric or icon key corresponding to the category of programs the user desires, the appropriate major menu 1020 is accessed. In addition, the user may employ an on-screen cursor to select any option shown in the menu. To move the cursor, the user may use either the cursor movement keys on the remote control 900 or similar keys located at the top of the set top terminal 220.

FIG. 28c shows how additional major menus 1020 can be displayed on the Home menu 1010. When there is no longer room available for additional major menu 1020 choices on the Home menu 1010, the user may access a second screen of the Home menu 1010. For example, in FIG. 28c, if additional major menus 1020 "J" through "Z" existed, the user would access those menus by highlighting and selecting the J through Z menu option (or press the buttons J-Z on the remote control 900). After selecting J through Z, the second or extended Home menu 1010 would appear on the user's television set. This menu would then list options J through Z separately by name. The Home menu 1010 may have many extended Home menu screens. However, any more than a few extended Home menu screens may confuse the average user.

The Home menu 1010 of FIG. 28d adds an additional feature at the bottom of the television screen 1011. This option allows the user to see only those program selections that are available on broadcast television. FIGS. 28a-28d are but a few of the numerous variations available for the Home menu 1010.

Additionally, as shown in FIG. 29, in an alternate embodiment, the Home menu 1010 (or menu which would normally follow the Introductory menu 1000) can be simply the standard cable channel line-up. Offering the standard cable line-up on a separate menu may make selection easier for users with small television screens.

Figure 30A:
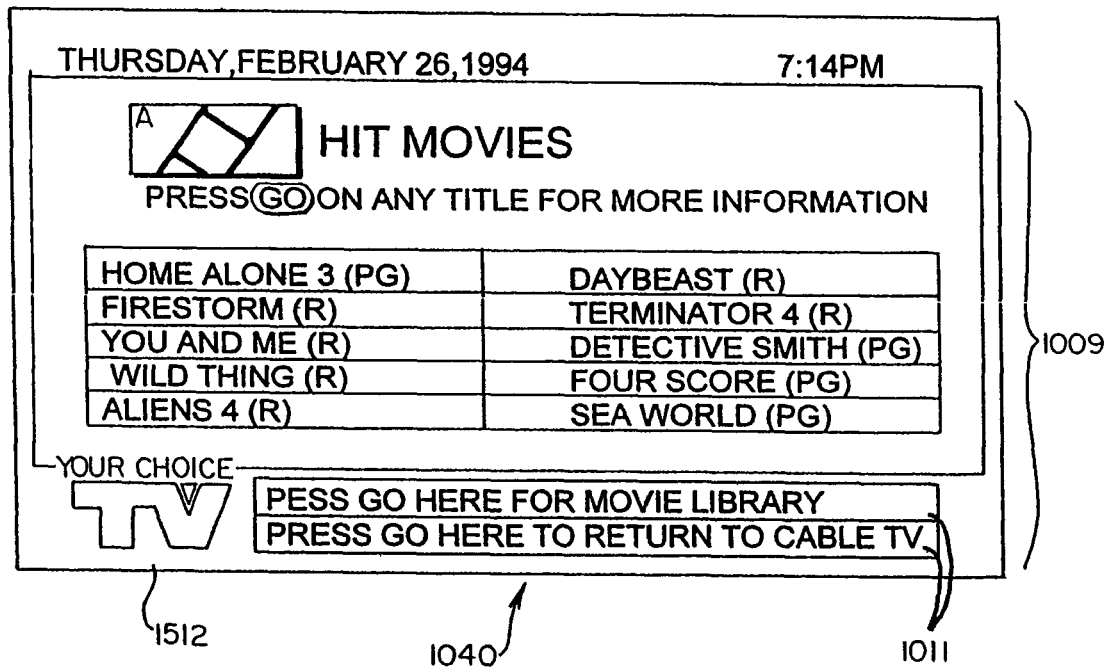
Figure 30B:
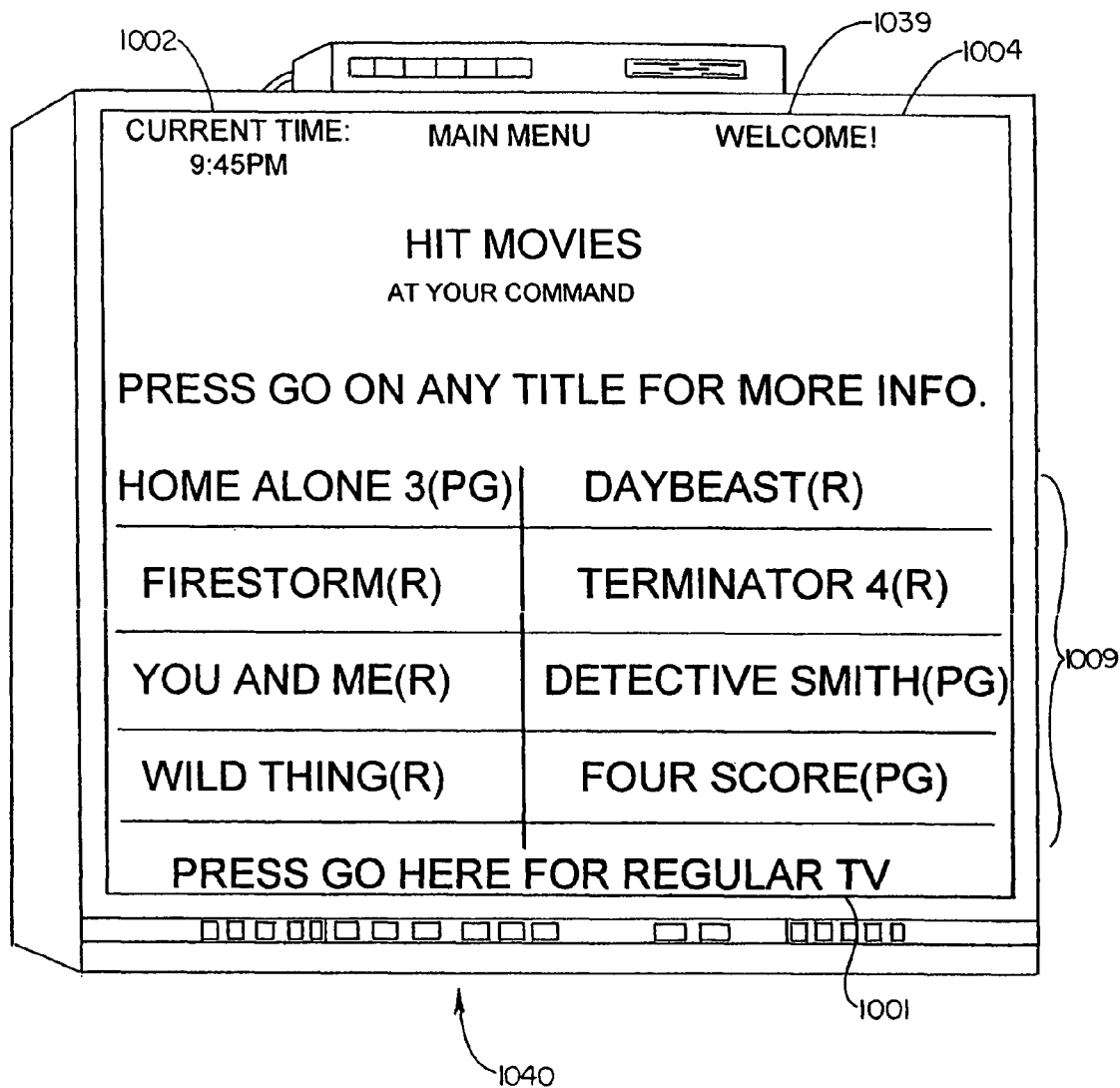
Figure 30C:
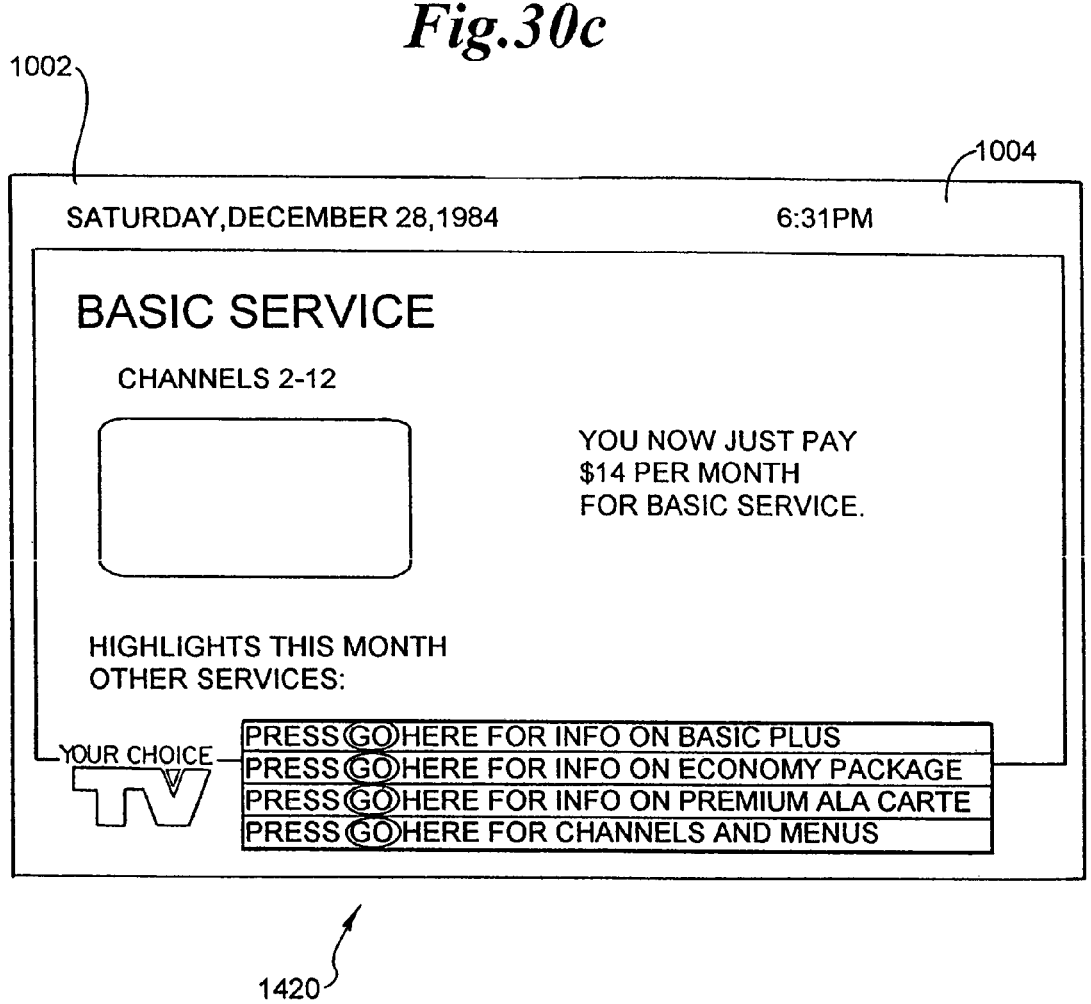
Figure 30E:
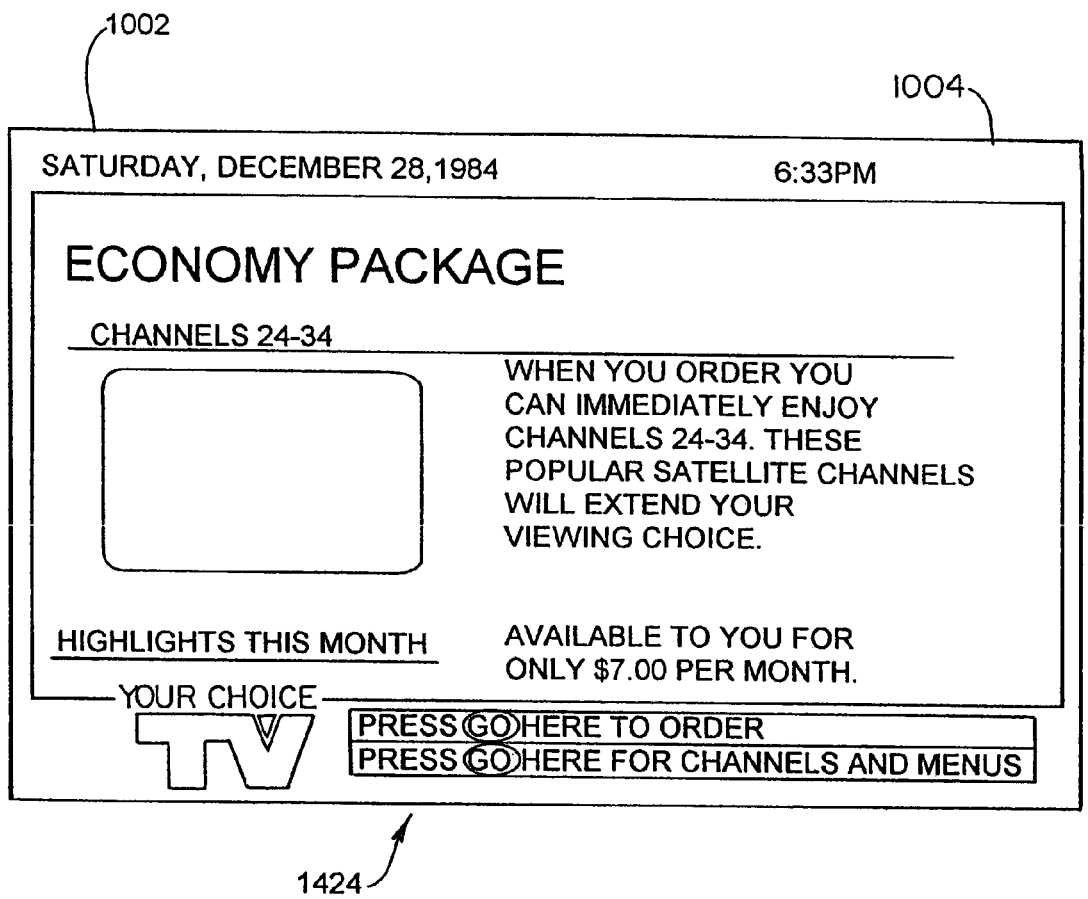
Figure 30F:
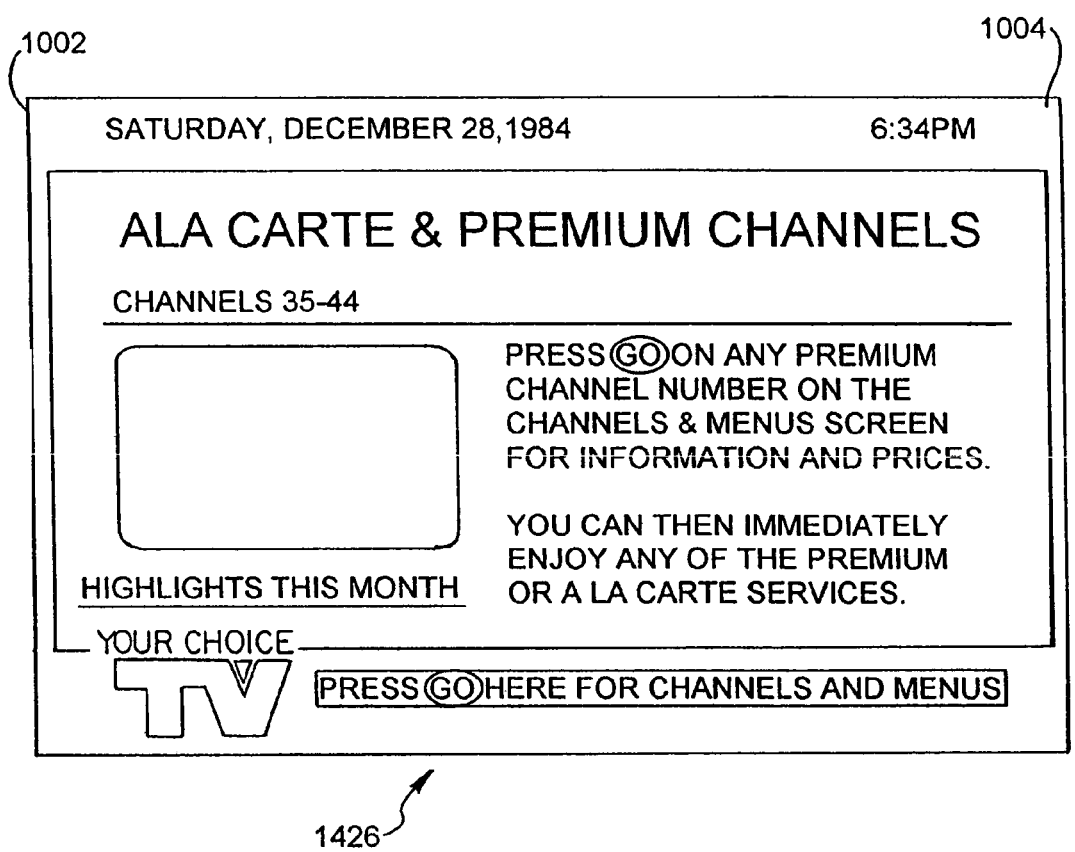

FIGS. 30a and 30b are examples of major menus 1020. In particular, FIGS. 30a and 30b show a major menu 1040 whose category is hit movies.

The hit movie category is a list of recently released movies which have been found to be popular among movie goers. This movie list may be changed once or twice a week to keep in line with new movie releases. Again, multi-window and customized window techniques are utilized to make the menu as user friendly as possible.

FIG. 30a shows an embodiment of the hit movies menu 1040. The hit movies menu icon along with the hit movies category letter A are displayed. The current date and time are displayed at the top of the screen over a menu background. Ten movie selections are displayed in the center of the screen 1009, each in a box that may be highlighted when selected. In the lower left part of the screen, a logo window 1512 is available as well as two other option choices 1011, Movie Library and Return to Cable TV. In an alternate embodiment, the return to Cable TV option is changed to return to the Home menu 1010 (or return to other viewing choices).

In FIG. 30b, the left upper window 1002 displays current time and the right upper window 1004 displays a message. This menu provides a list of eight movie titles and their rating. A user who desires further information on any particular movie may select the movie using the cursor movement buttons and press the "go" button on the remote control 900 or set top terminal 220.

In the major menu 1020 example of FIG. 30b, the customized windows 1002 and 1004 in the upper corners may remain constant from menu to menu. The name of the menu and category are at the top and center of the menu screen 1039. To make the menu aesthetically pleasing, the instructions are given across the center of the screen and choices in large legible type are provided. Additionally, at the bottom of most menu screens 1011, the user is given the option of returning to regular TV or returning to the Home menu 1010.

Figure 30G:
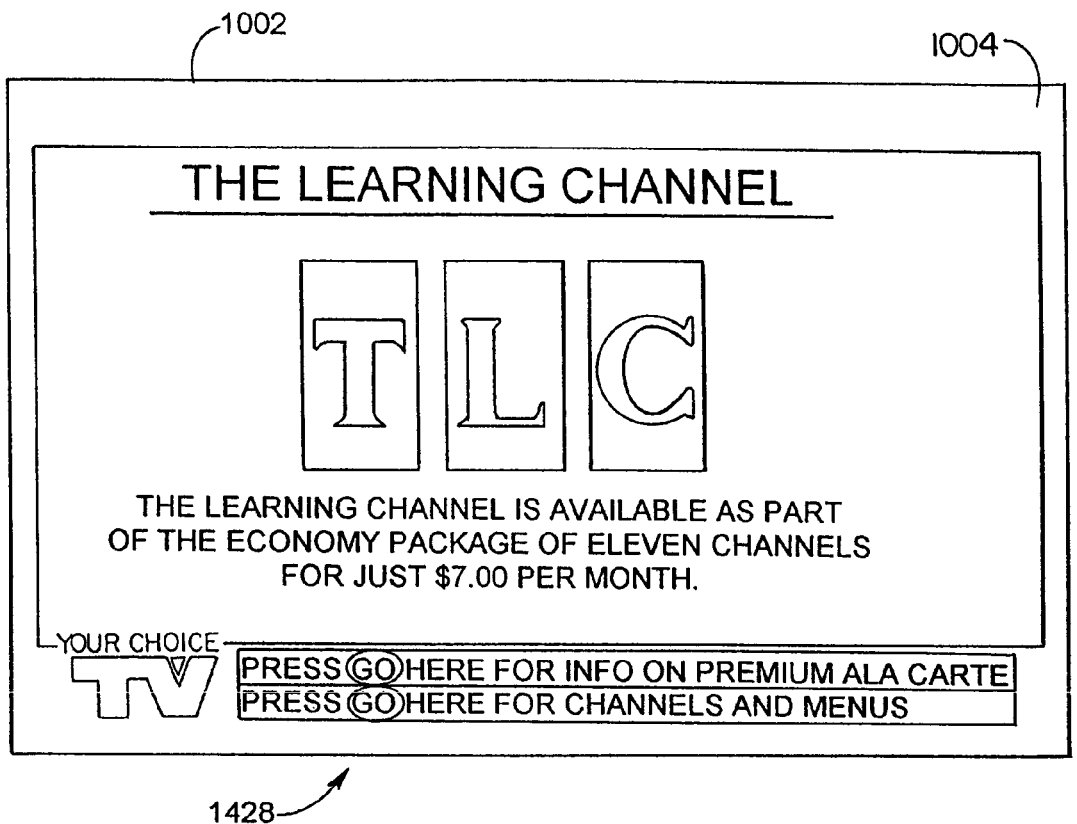

FIGS. 30c-30g show alternative embodiments of major menus 1020 for the Home menu 1010 shown in FIG. 28a. FIGS. 30c-30g show various major menus directed to the type of subscription services available (basic service 1420, basic plus 1422, economy package 1424, ala carte and premium channels 1426). These menus also provide promotional or advertising information, the cost for the particular subscription service, or other video inserted by the operations center 202, the cable headend 208, or the set top terminal 220, for example. FIG. 30g shows a major menu for the Learning Channel 1428, one of the individual channels shown in the Home menu of FIG. 28a.

The above menus may be grouped in similar colors or shades of colors. For example, the basic subscription service could have a light pink color. As the subscription services increase in terms of the number of channels available, the color shading may increase correspondingly. Therefore, the premium subscription service (ala carte service) would have a dark red color, contrasting with the light pink color of the basic subscription service.

Figure 31:
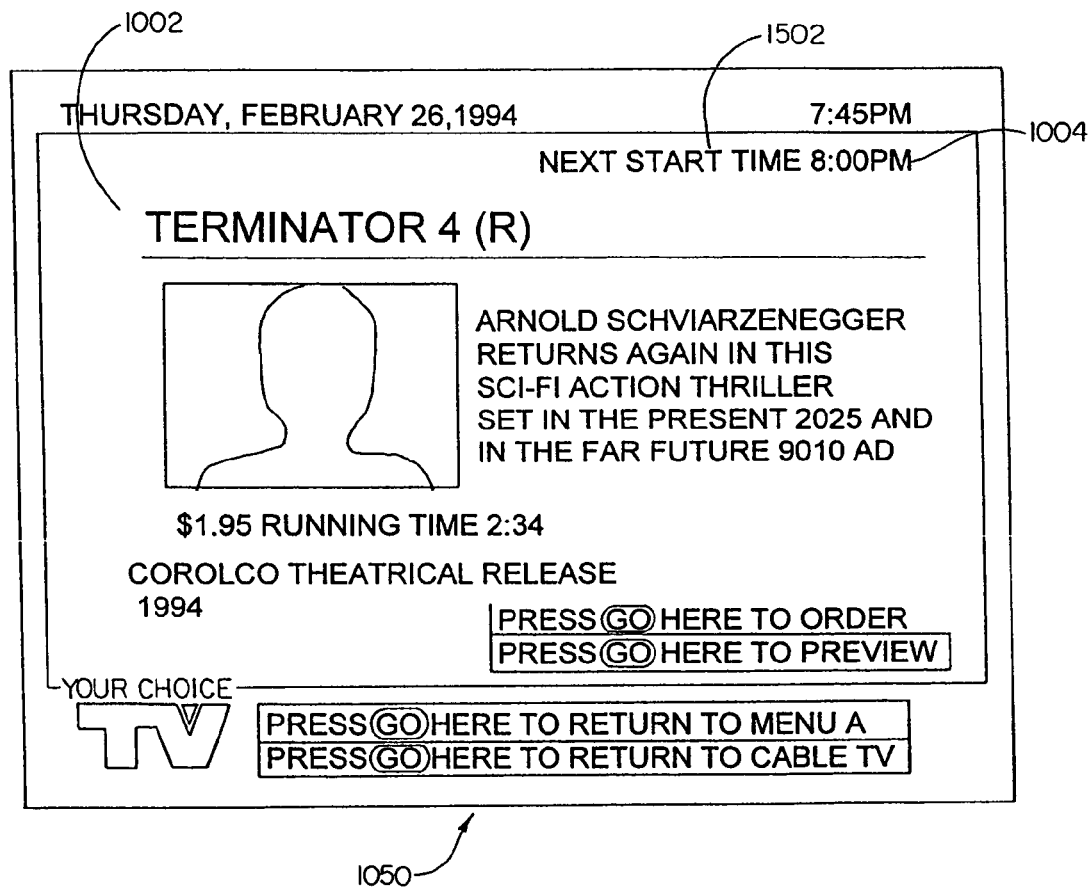
FIG. 31 is a drawing of hit movie description menu.

In FIG. 30b, the movie titled Terminator 4 is highlighted, signifying that the user has chosen this program option from the hit movie major menu. FIG. 31 shows a submenu 1050 which would follow the selection of Terminator 4 on the hit movie major menu. In FIG. 31a, the banner across the top of the screen 1502 remains constant from major menu 1020 to program description submenu 1050. For the comfort of the user, the left upper window 1002 remains the same and shows the current time. The upper right-hand corner 1004 carries a message stating the next start time for the movie selected.

C.2. Notification

Figure 32A:
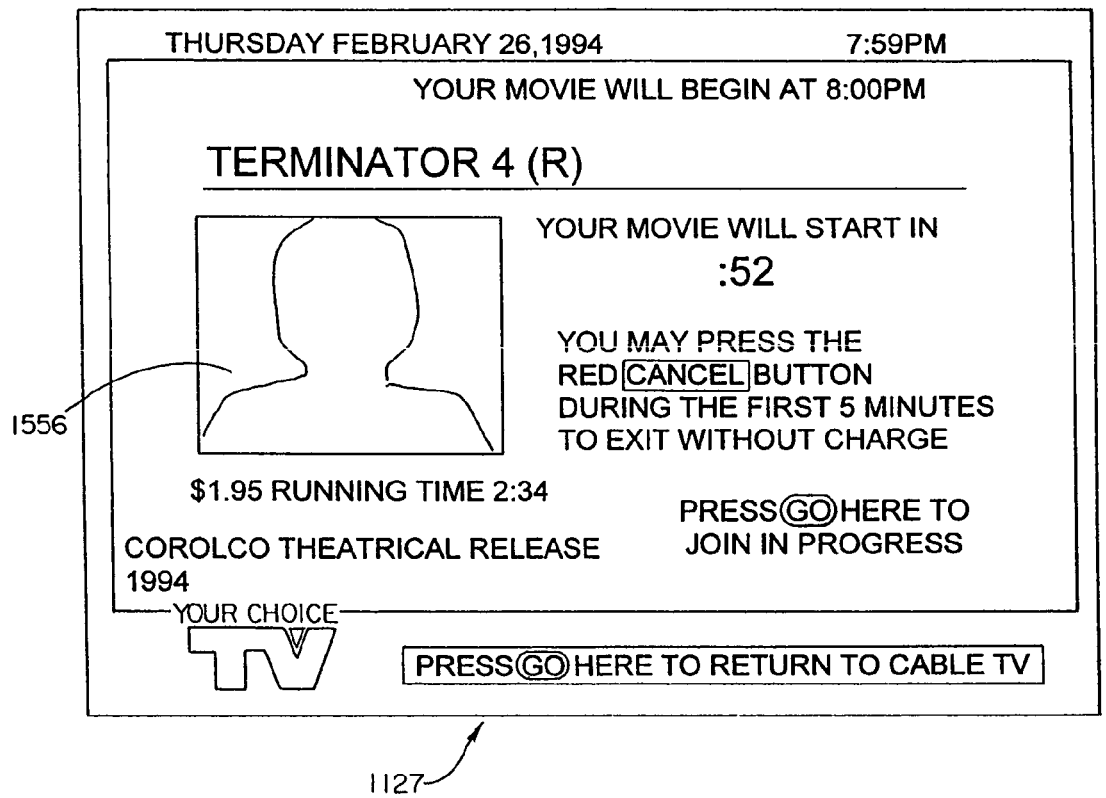
FIGS. 32a and 32b are drawings of hit movie notification submenus.
Figure 32B:
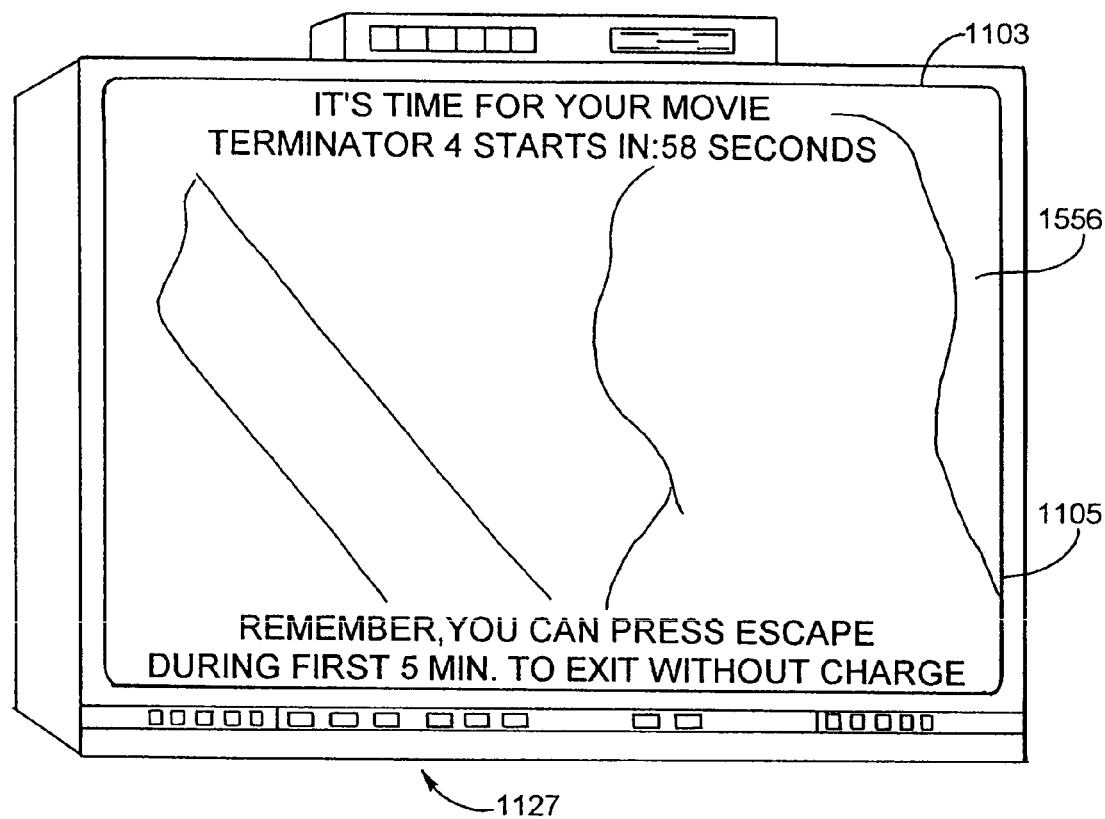

FIGS. 32a and 32b are notification submenus informing the user that a program selection is about to begin (e.g., counting down until start time). Using these submenus, the set top terminal 220 warns the user prior to switching away from the program being viewed to a prior selected program. These notification submenus are provided to the user approximately one or more minutes before the set top terminal 220 changes the viewing channel.

Both notification submenu 1127 examples allow the user to cancel the program order. In FIG. 32a, the user is notified in the center of the screen that the chosen program may be canceled within the first five minutes. In FIG. 32b the user may press escape to cancel the order without charge. The notification submenu 1127 of FIG. 32b informs the user of the start time at the upper portion 1103 of the screen.

The notification submenu of FIG. 32b is an example of a simple three-window menu. A strip window at the top of the screen 1103 notifies the user of the program selected and the amount of time before the program begins. The center window is a large video window 1556 for displaying the program. At the bottom of the screen the submenu carries another strip menu 1105 that informs the user to escape from the program selection without charge by pressing escape.

Using a notification submenu 1127 may allow the operations center 202 or the cable headend 208 to display other videos for the user to view until the start time of the chosen program. The other videos include short video clips from the chosen program, promotionals, infomercials and advertising. The promotionals, infomercials and advertising may be targeted to the individual set top terminal 220 described previously in section B, Network Controller Description. The other videos may be displayed on the entire display, or a portion of the display, as previously described.

C.3. Promotion

Figure 33A:
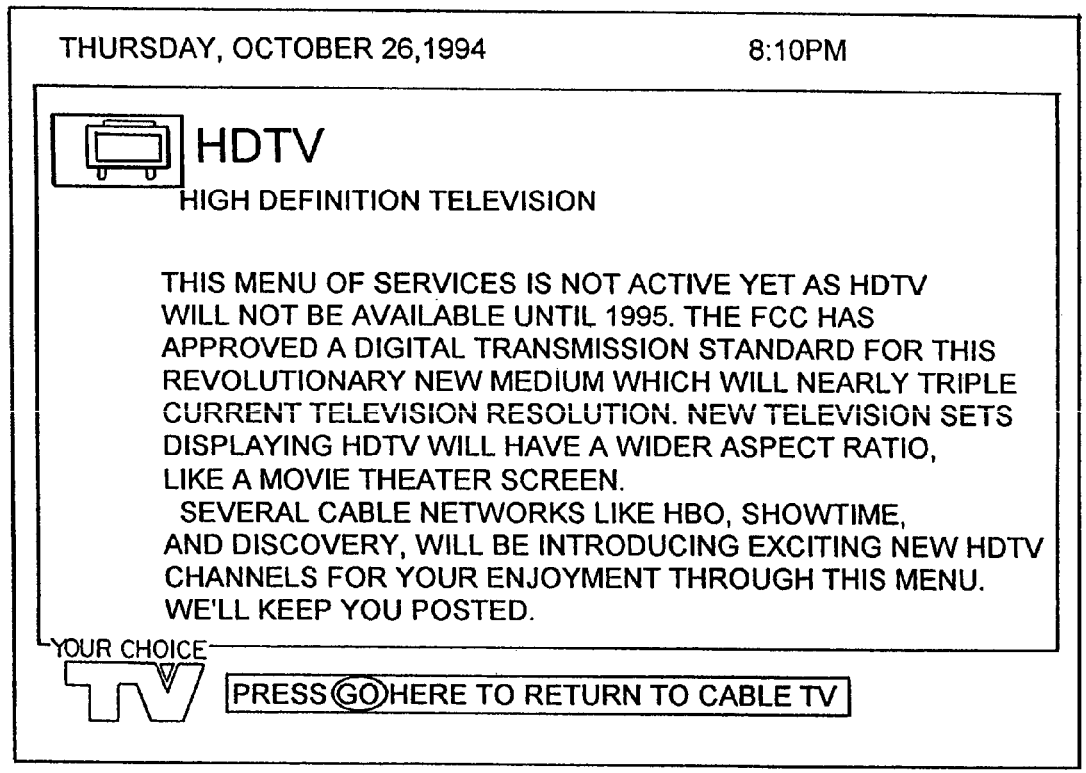
FIGS. 33a and 33b are drawings of menus related to promotion of high definition television programming.
Figure 33B:
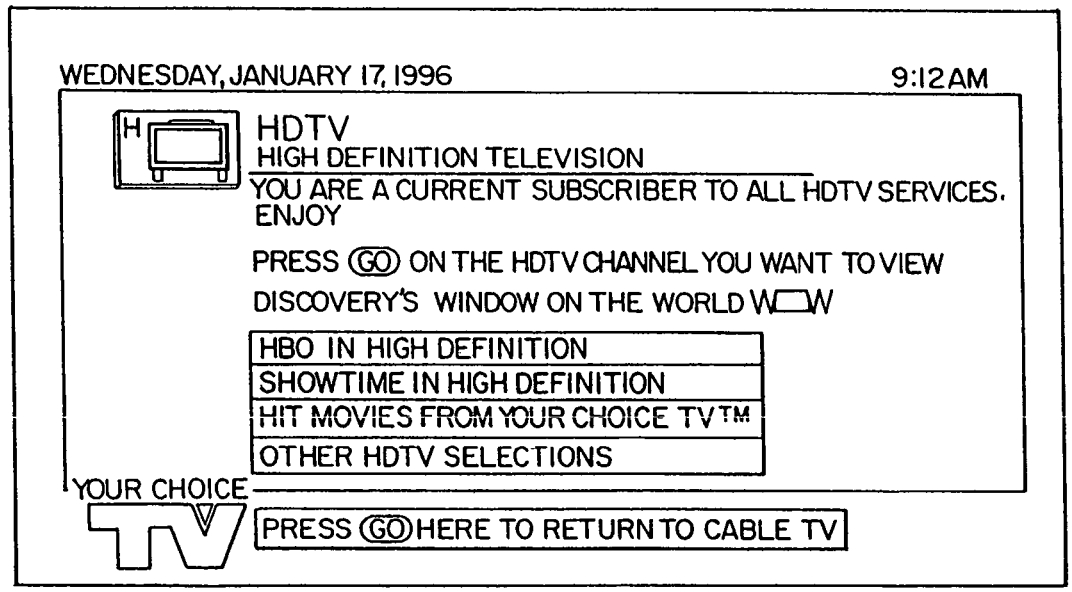

As noted above, the menu system generated by the operations center 202 may be used for promotions. For example, FIGS. 33a and 33b relate to promotion of HDTV. FIG. 33a is an example of a menu 1032 advertising a new feature of the system. Promotional menus, such as FIG. 33a, may be dispersed throughout the menu driven program selection system. This particular menu describes the HDTV feature and explains its unavailability until a future date. FIG. 33b shows the integration of HDTV services into the menu driven program delivery system. The user who selects the major menu for HDTV receives a description of the service with a suggestion to order the system, or a text note that the user is a current user and a listing of the currently available program selections in HDTV as shown in a second screen 1232. A user who has not paid to join the particular service, HDTV, may be allowed to join one of the programs in progress for a limited time as a demo to entice the user to order. The user who has paid the HDTV fees proceeds as the user would in any other major menu screen.

This particular major menu shows an example of how a follow-on or second screen may exist for the same menu. In this case, a second screen exists for the major menu HDTV 1032. The user may access the second screen 1232 by selecting the last menu display block in the lower part of the screen "Other HDTV Selections". Following this selection, the user is given the second screen 1232 of program selections. In this manner, any menu can have multiple screens with many program choices. This type of screen pagination on one menu allows the packager to avoid categorizing program selections within that same menu. In an alternative embodiment, the options available to the user may be scrolled on one menu screen with the text within the menu display blocks changing as the user scrolls up or scrolls down.

Figure 34A:
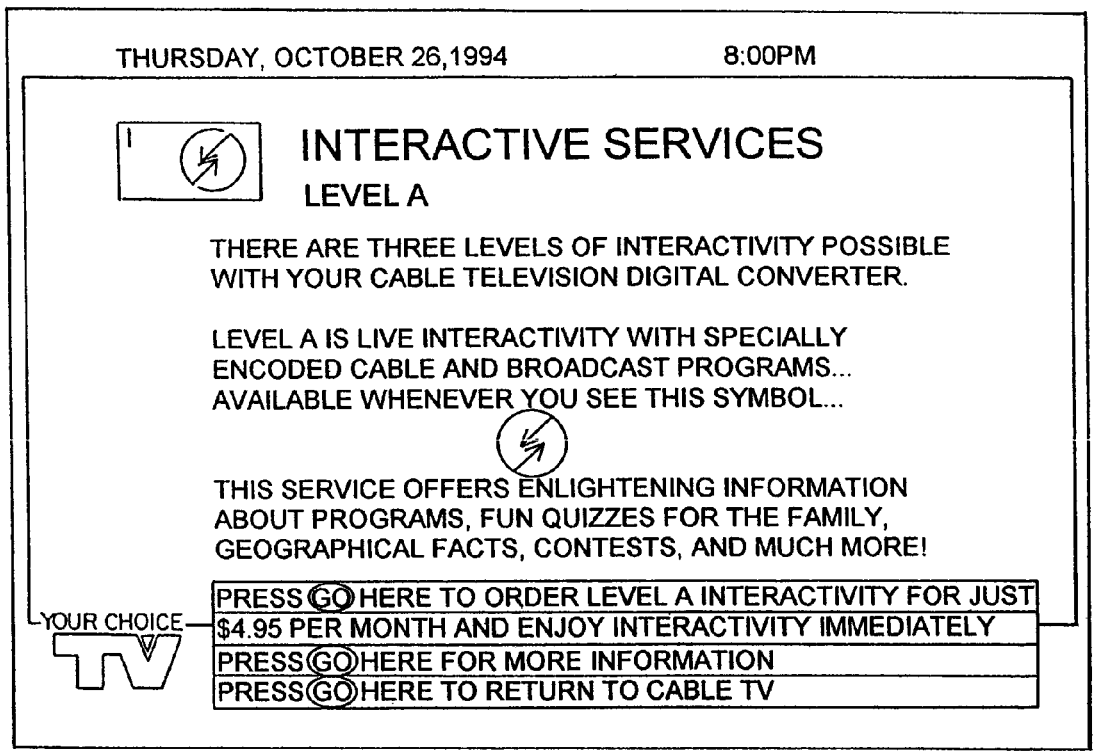
FIGS. 34a, 34b, and 34c are drawings of interactive television promotional menus, for Levels A-C.
Figure 34B:
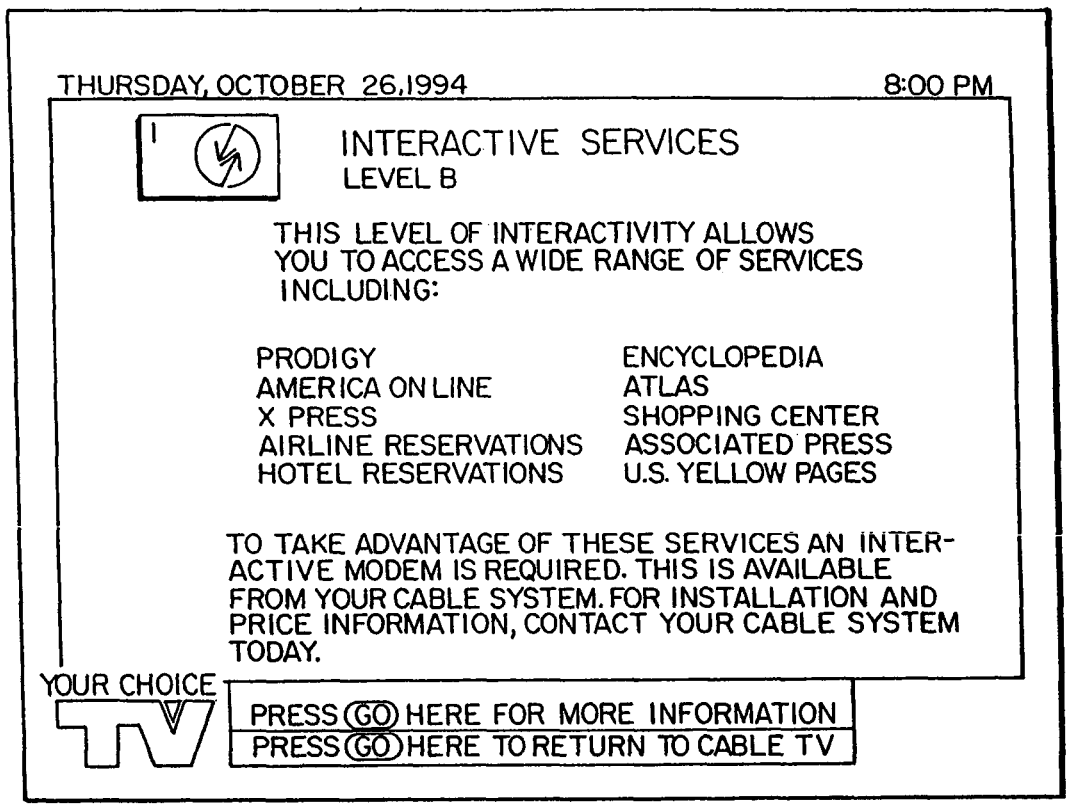
Figure 34C:
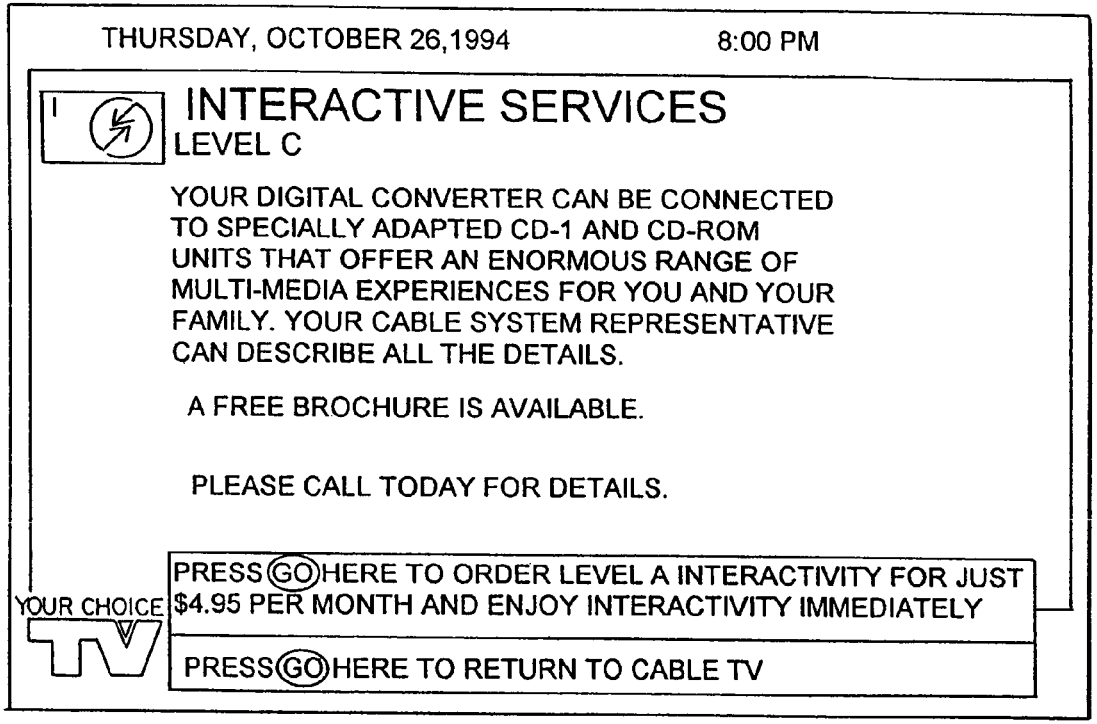

FIGS. 34a, 34b, and 34c demonstrate the use of promotional menus to sell subscriptions to services in the system. In particular, FIG. 34a is a promotional menu 1304 for Level A interactive services. Level A interactive services offers users additional information about programs such as quizzes, geographical facts, etc. This information may be received by the set top terminal 220 in several data formats including the vertical blanking interval and in the program control information signal. FIG. 34b is a promotional menu 1306 for Level B interactive services which include a variety of on-line type services such as America-On-Line, Yellow Pages, Airline Reservations, etc.

FIG. 34c is a promotion menu 1308 for the Level C interactive services. The Level C interactive services utilize local storage such as CD technology to offer an enormous range of multi-media experiences. The Level C interactive services require a hardware upgrade as described earlier. Specially adopted CD-I and CD-ROM units are needed for this service.

C.4. Interactive Services

FIGS. 35a through 35e show menus that are available using the interactive Level A services. When interactive Levels A services are available in a television program, the system may display the interactive logo consisting of the letter "I" and two arrows with semicircular tails, for example. In an embodiment, the set top terminal 220 will place the interactive logo on the television screen as an overlay menu 1310. In the embodiment, the set top terminal 220 will detect that there is data or information available about a television program that can be displayed to a user using the interactive service. When the set top terminal 220 senses that interactive information is available, it will generate the interactive logo overlay menu and place it on the television screen. For example, the set top terminal 220 may detect that information on a television program is being sent in the vertical blanking interval and will generate an interactive logo overlay menu. The interactive logo overlay menu may appear on the user's television screen for approximately fifteen seconds during each ten minute interval of programming, for example.

Figure 35A:
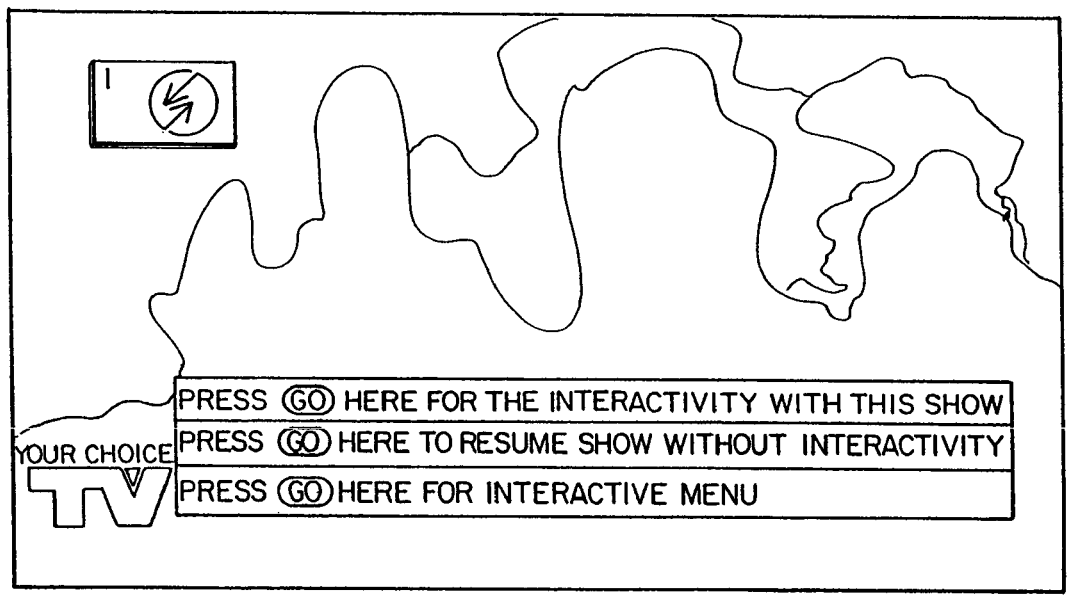

The user who sees the interactive logo on his television screen is made aware of the fact that interactive services are available in conjunction with the program. If the user presses an interactive remote control button, an additional overlay menu will be generated by the set top terminal 220 and placed on the screen. This menu 1310 is shown in FIG. 35a being overlayed on an interactive television program. From this menu the user may select interactive features or return to the television program without interactive features.

Figure 35B:
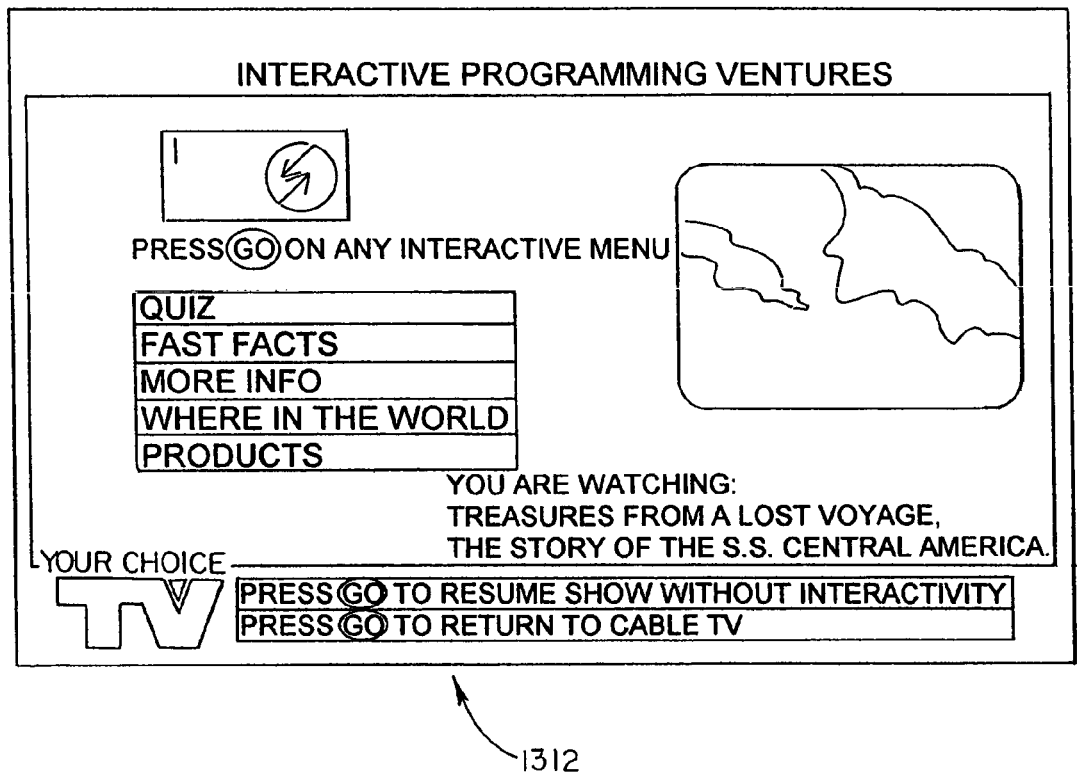

The user who selects interactive features is presented with the interactive Level A submenu 1312 in FIG. 35b. From this submenu the user may choose a variety of different types of textual interactivity with the current program or a related video. Some examples are quizzes, fast facts, more info, where in the world, products, and advertisements for products. At any time during the interactive submenus the user may return to the current program without interactive features.

This interactive submenu has an example of taking a complete television program video, scaling it down to a smaller size and directing the video into a video window of a submenu.

Figure 35C:
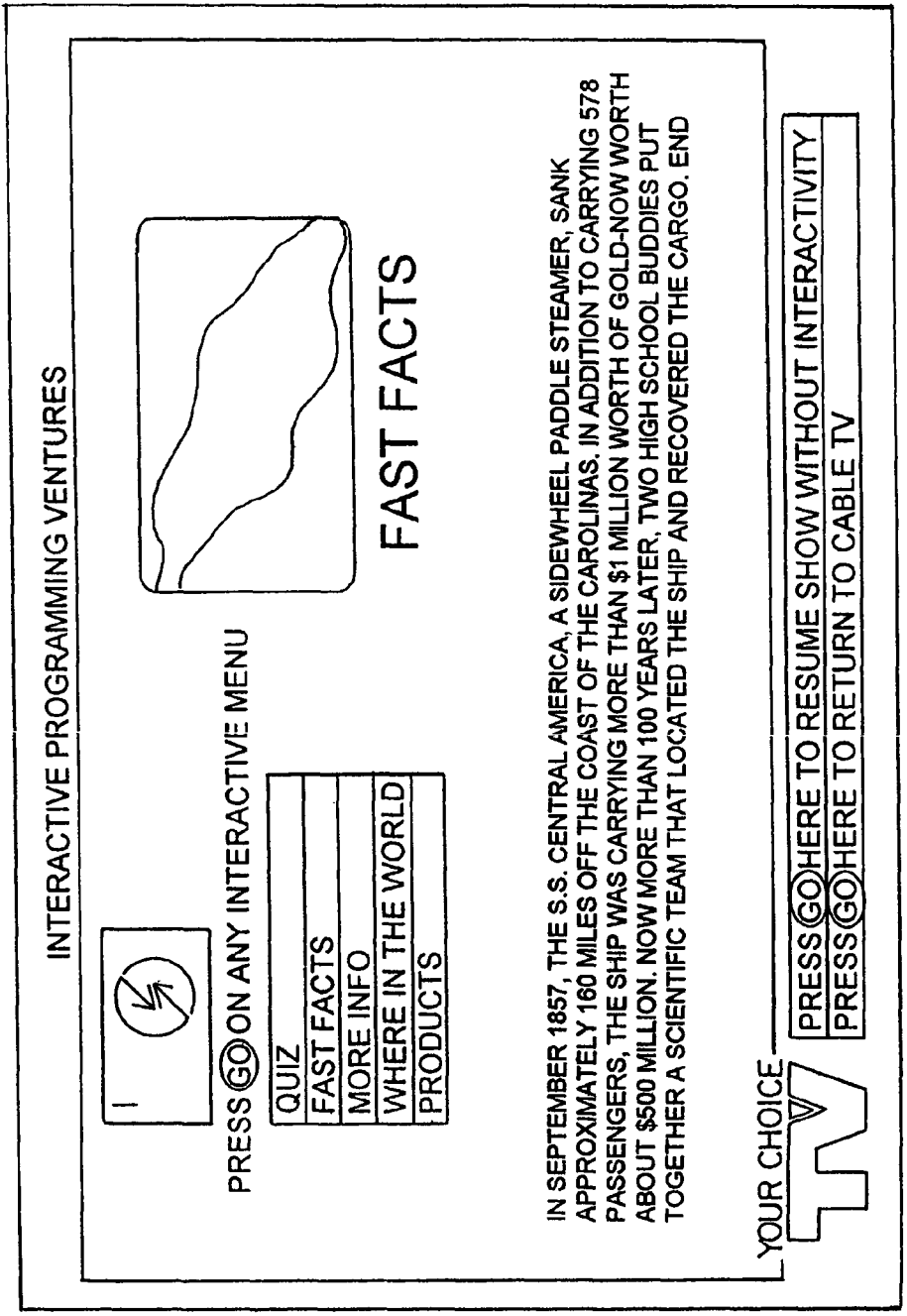

FIG. 35c shows an interactive fast facts submenu 1314. In this submenu textual information is given to the user in the lower half of his screen. This textual information will change as additional data is received by the set top terminal 220 relating to this television program. The textual information may relate to a promotion or may advertise a product or service.

Figure 35D:
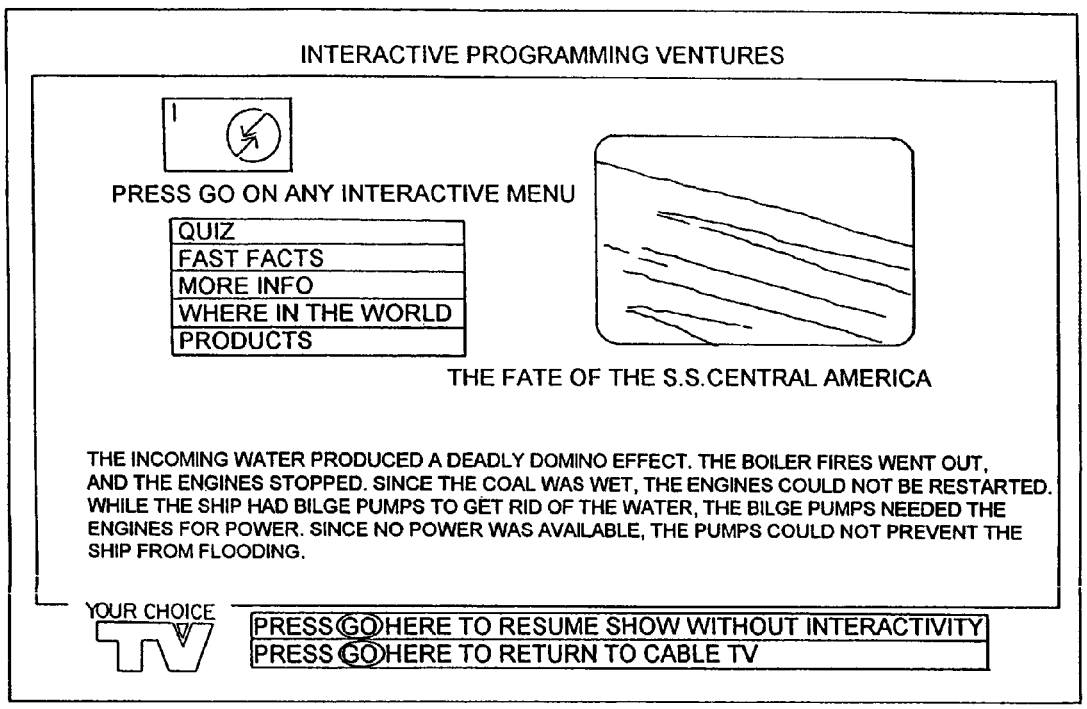
Figure 35E:
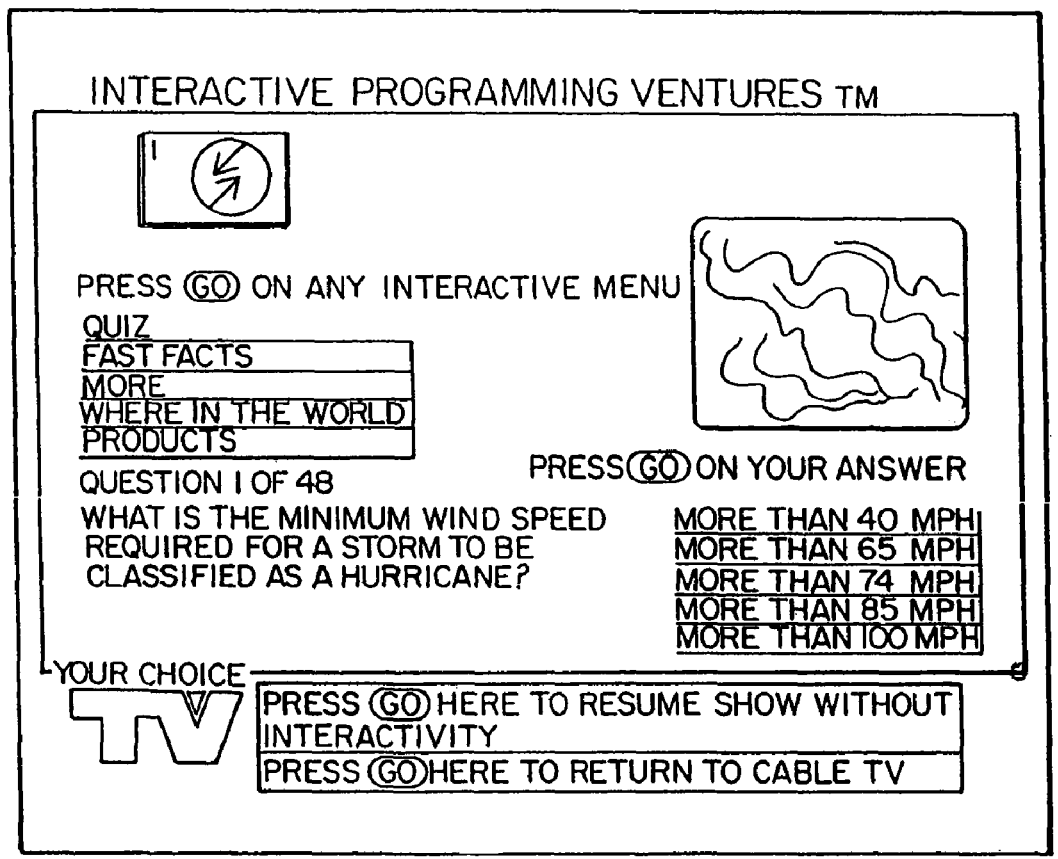

FIG. 35d shows the use of the subcategory "more information" in the interactive service. This submenu 1316 gives additional information related to the television program to the viewer in textual form in the lower half of the screen. FIG. 35e is an interactive submenu 1318 for the subcategory "quiz." In this interactive subcategory, the user is presented with questions and a series of possible answers. If desired, the user selects one of the answers to the quiz question. After the selection, the set top terminal 220 sequences to the interactive quiz answers submenu which informs the user whether the correct answer was chosen.

C.5. On-Line Connections

Figure 36A:
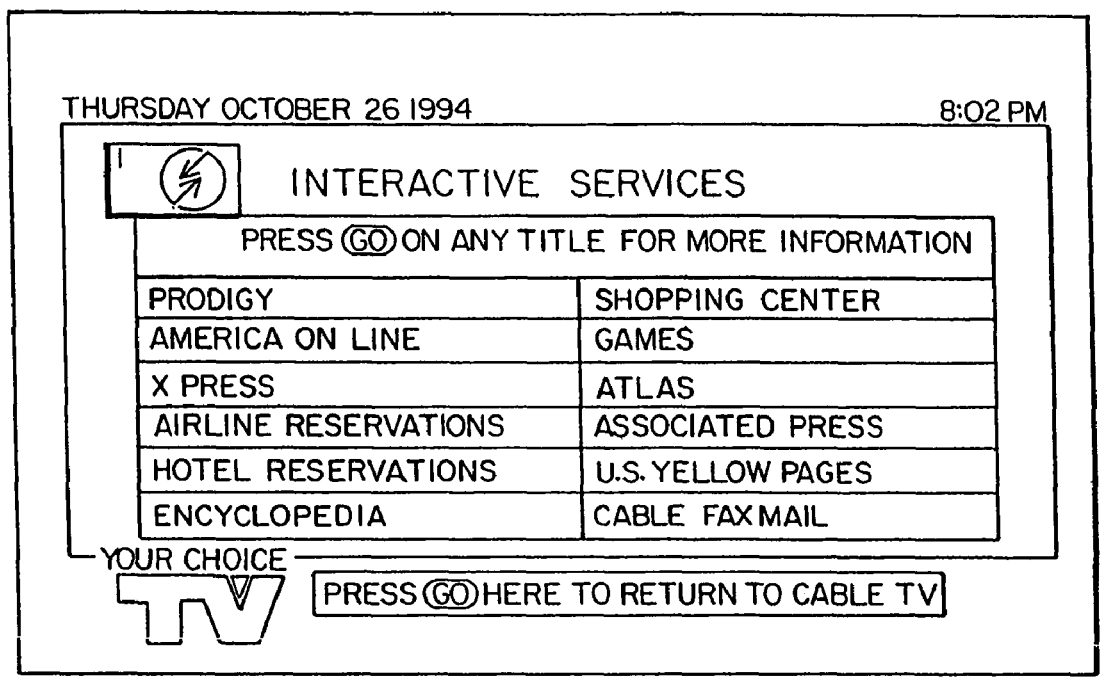

FIG. 36a is an example of a submenu for Level B interactive services. From this menu screen 1330, any of a number of on-line data services could be accessed, including access to Internet service providers such as America-On-Line. In FIG. 36a, the airline reservations selection has been selected by the user.

Figure 36B:
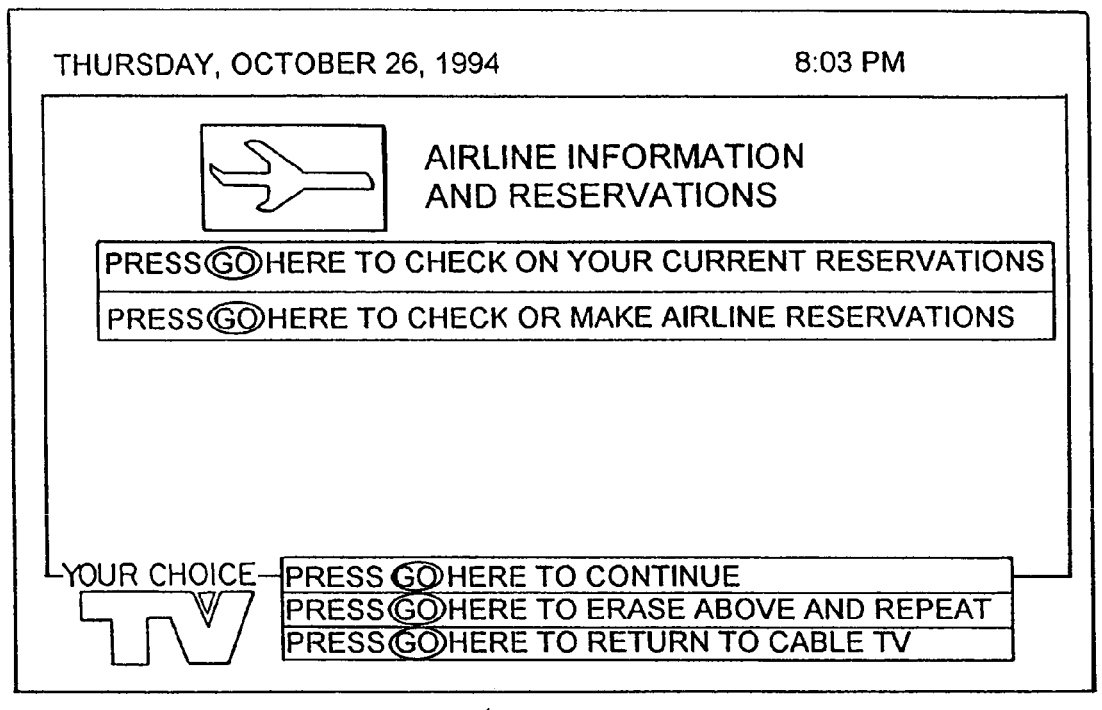

FIGS. 36b through 36e provide an example of a sequence of menus that a user may encounter with an on-line data service. The example relates to airline information and reservations and the user in this sequence is reserving and purchasing airline tickets. FIG. 36b is an example of the first submenu 1332 for a data service offering various options. In this case, the user has the option of checking current reservations or making new reservations. In each of these submenus related to a data service, the user is able to return to the Home menu 1010 or regular cable television and exit the data service.

FIG. 36c, an airline information and reservation submenu 1346, allows the user to choose a one-way or round-trip ticket and to confirm his reservations. The user who desires to proceed may charge the airline ticket to a credit card by choosing the appropriate strip menu on the lower part of the screen.

Figure 36D:
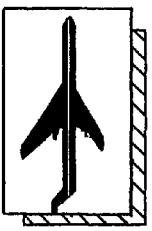

FIG. 36d, an airline information and reservation submenu 1348, is an example of how credit card purchases may be made using the on-line data services. In this menu 1348, the user charges a round-trip plane ticket on a credit card. The user simply needs to enter the credit card number, expiration date, and credit card type to charge the airline ticket.

Figure 36E:
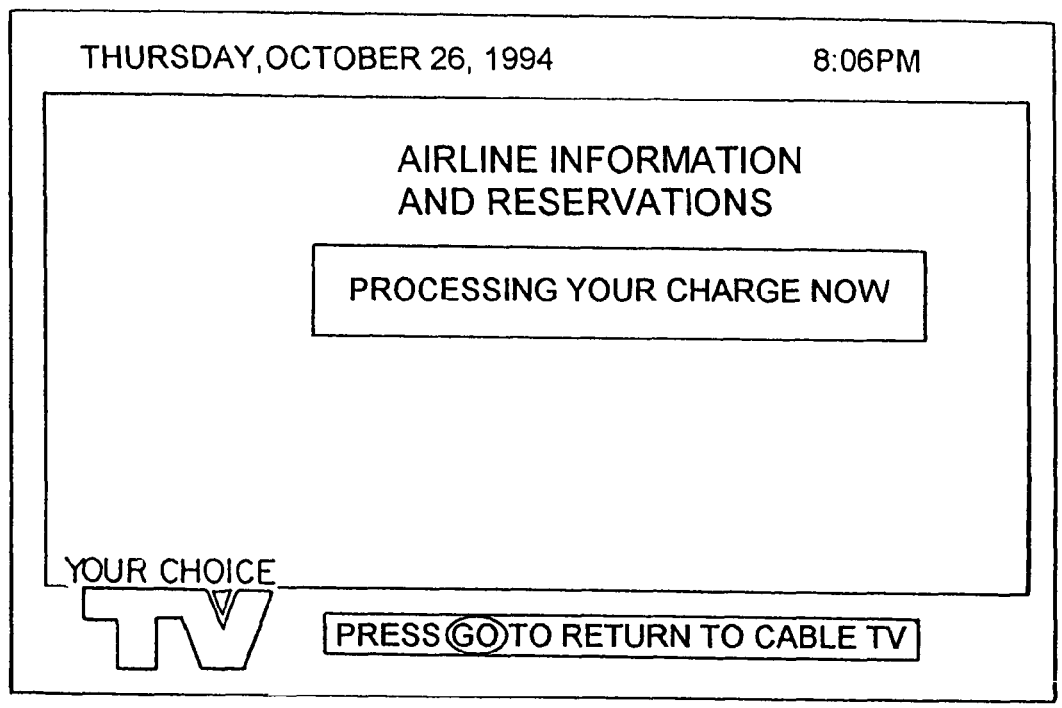

FIG. 36e, an airline information and reservation submenu 1350, is an example of a menu that may be shown whenever an on-line data service is processing a request sent by the user. In this menu 1350, the on-line data service is processing the user's credit card charge for his airline ticket.

C.6. Digital/Audio Program Choices

Figure 37A:
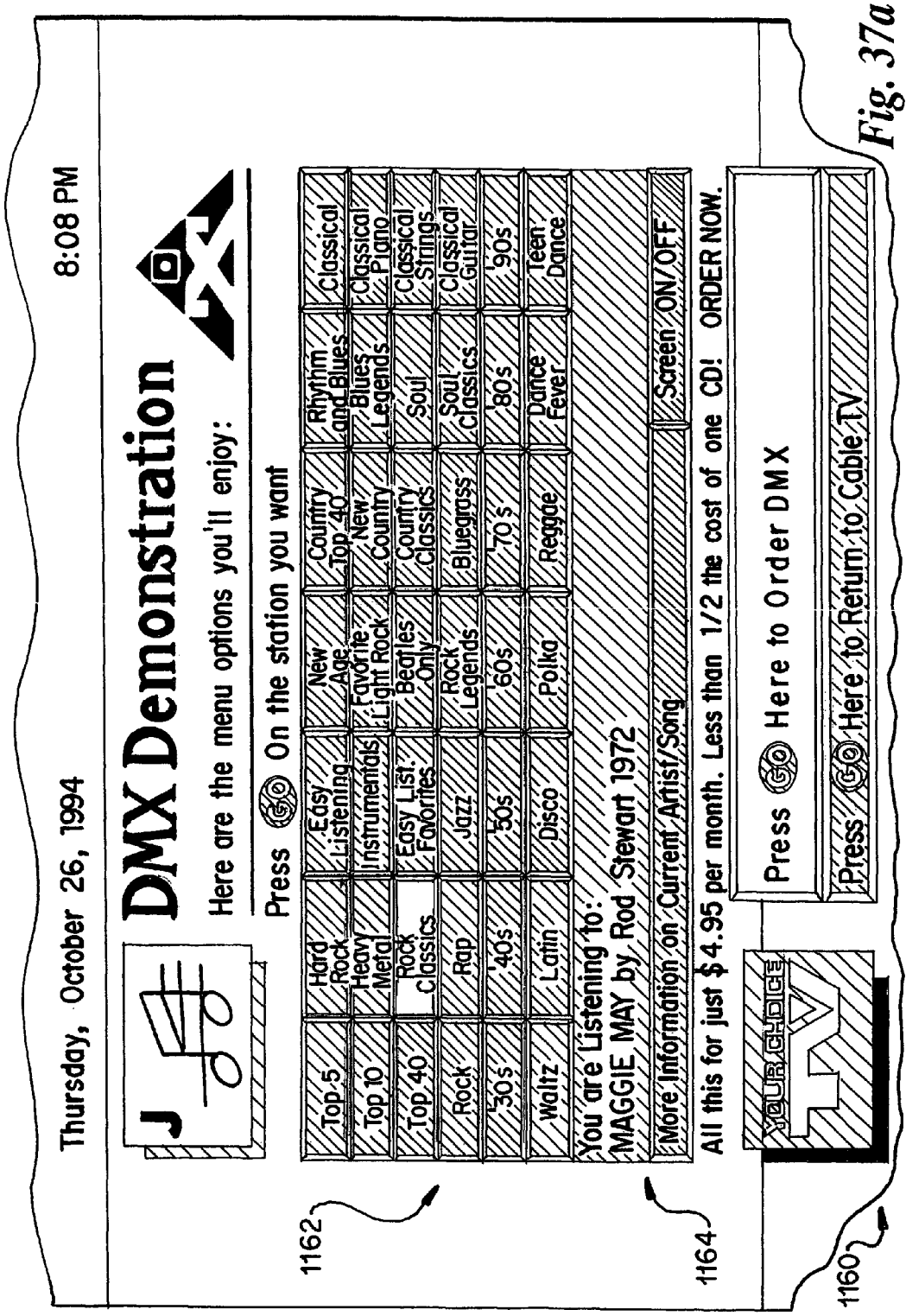
FIGS. 37a, 37b, and 37c are drawings of menus for digital audio services.

FIG. 37a is a major menu 1038 displaying the digital/audio program choices that are available for users who have paid the monthly fee. In a chart format, the major menu shows the top five, top ten, and top forty songs available in six different categories of music. Below the chart, the system is able to provide a text message describing the particulars of the audio program selected.

The digital/audio feature of the invention allows a user to listen to CD quality audio selections through his stereo. This can be accomplished by running cables directly from the set top terminal 220 to the user's amplifier/stereo system. Alternatively, the user may listen to audio selections through the television.

Figure 37B:
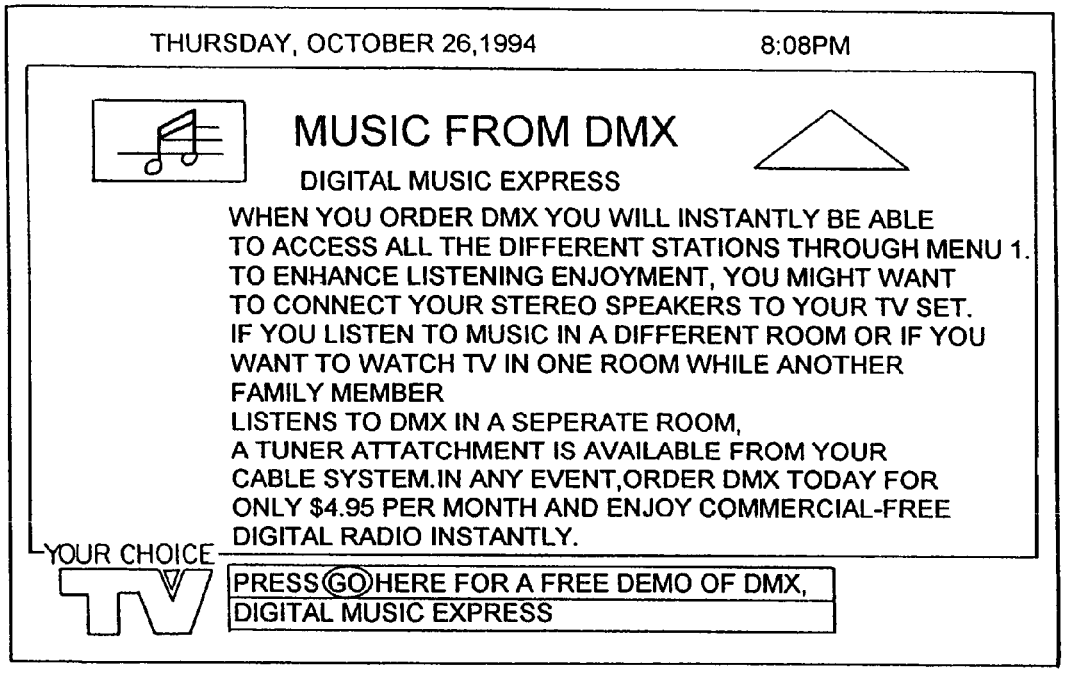
Figure 37C:
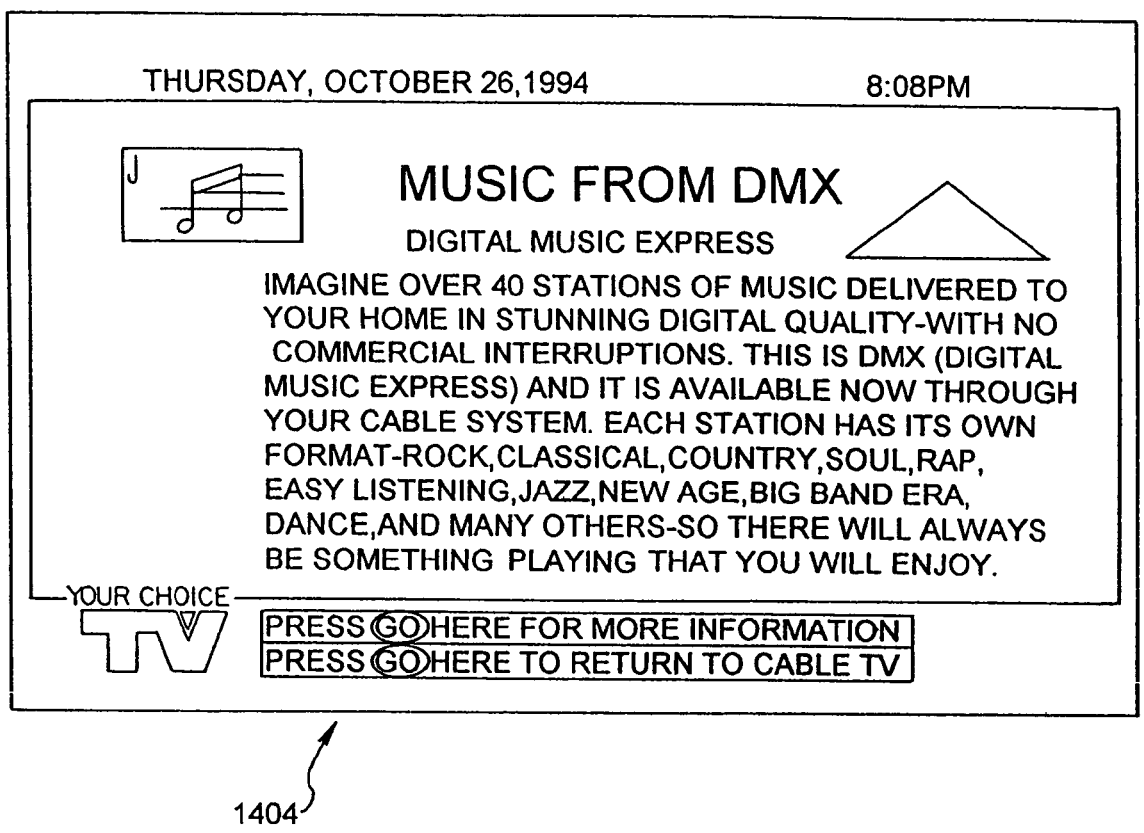

FIGS. 37b and 37c are promotional menus 1400, 1404 for the digital/audio feature. Using the same logos and menu format, the system can provide a text description enticing the user to pay the monthly fee and join the service. In FIG. 37b, the menu allows the user to test the system with a free demonstration. The menu in FIG. 37c allows the user to request additional promotional information about the system. Both FIGS. 37b and 37c are representative of promotional menus that may be used throughout the menu system.

The terms and descriptions used herein are set forth by way of illustration only and are not meant as limitations. Those skilled in the art will recognize that numerous variations are possible within the spirit and scope of the invention as defined in the following claims.

What is claimed is:

1. A method comprising:
gathering, programs watched data from a terminal;
analyzing, by a computer, the programs watched data to determine a frequency of programs selected at the terminal;
assigning categories of advertisements to the terminal based on the analyzed programs watched data, wherein each advertisement category includes a plurality of advertisements, and wherein the plurality of advertisements within each advertisement category are weighted relative to one another, wherein the weighting of the plurality of advertisements within each advertisement category is based in part on a number of advertisement requests received and a cost paid by each advertiser associated with the plurality of advertisements;
selecting an advertisement from the assigned advertising categories based on the weighting; and
transmitting the selected advertisement to the terminal.

2. The method of claim 1, wherein analyzing programs watched data includes counting programs selected at the terminal and further comprising arranging the counts in at least one programs watched matrix.

3. The method of claim 2, wherein the programs watched matrix is arranged by a program category and a time slot and wherein the counts are arranged within the time slot from highest to lowest.

4. The method of claim 1, wherein the transmitted advertisement is transmitted on a television channel.

5. The method of claim 1, wherein selecting the advertisement selects a plurality of advertisements, the plurality of advertisements being transmitted on a single television channel, and further comprising masking undesired advertisements out of the plurality of advertisements.

6. The method of claim 1, wherein selecting the advertisement selects a plurality of advertisements, the plurality of advertisements being transmitted on a single television channel, wherein a desired advertisement of the plurality of advertisements is configured to be scaled and repositioned on a display.

7. The method of claim 1, wherein the selected advertisement is transmitted in response to an occurrence of commercial breaks within a program.

8. The method of claim 1, wherein the transmitted advertisement is configured to be stored in the terminal, the advertisement being displayed based on an occurrence of commercial breaks within a program.

9. The method of claim 1, wherein the programs watched data is configured to be gathered by the terminal and stored in the terminal.

10. The method of claim 9, wherein the programs watched data is configured to be analyzed by the terminal.

11. The method of claim 9, wherein the programs watched data is configured to be received by a processor coupled to the terminal and analyzed by the processor.

12. The method of claim of claim 11, further comprising:
generating a polling request message that directs the terminal to transmit a status report that contains the programs watched data;
processing the received status report to produce polling response data; and
storing the polling response data.

13. The method of claim 12, wherein processing the received status report comprises:
demodulating the received status report, producing demodulated data;
reading at least one information field in the demodulated data, each information field being appended to an identification number field; and
sorting each information field by identification number.

14. The method of claim 13, further comprising updating the programs watched data based on the processed status report.

15. The method of claim 1, further comprising:
gathering demographic data related to a user of the terminal; and
correlating the demographic data with the categories of advertisements.

16. The method of claim 15, wherein gathering the demographic data comprises one of sending questionnaires to the user, receiving demographic data via the terminal and gathering demographic data from third parties.

17. The method of claim 15, wherein gathering demographic data comprises generating a simulated demographic profile of the user by comparing the programs watched data of the user to a sample viewer profile, the sample viewer profile constructed based on demographic data received from a statistically significant sample of users.

18. A system comprising:
a processor configured to:
analyze gathered programs watched data to determine a frequency of programs selected at a terminal;
assign a plurality of categories of advertisements to the terminal based on the analyzed programs watched data, wherein each advertisement category includes at least two advertisements, and wherein the at least two advertisements within each advertisement category are weighted relative to one another, wherein the weighting of the at least two advertisements within each advertisement category is based in part on a number of advertisement requests received and a cost paid by each advertiser associated with the at least two advertisements; and
select at least two of the advertisements from each of the assigned advertising categories based on the weighting; and
a transmitter, configured to transmit the selected advertisements.

19. The system of claim 18, wherein the system is located at a cable headend.

20. The system of claim 18, wherein the system is located at an operations center.

21. The system of claim 18, wherein the processor is further configured to process programs watched data gathered from a plurality of terminals, and wherein the transmitter is configured to transmit the selected advertisements to the plurality of terminals.

22. The system of claim 18, wherein the processor further comprises:
a memory, operably connected to a receiver, wherein the memory stores video corresponding to the selected advertisements.

23. The system of claim 18, further comprising a display configured to display the transmitted advertisements.

24. The system of claim 23, wherein the display is configured to display a menu of selected advertisements from which a user may choose an advertisement to watch.

25. The system of claim 23, further comprising:
a receiver, operably connected to the display, wherein the receiver is configured to receive television signals.

26. The system of claim 23, wherein the processor is a network controller and the display comprises the terminal operably connected to a television.

27. The system of claim 26, wherein the transmitter is configured to transmit the selected advertisements on a television channel, and the terminal is configured to change television channels.

28. The system of claim 26, wherein the transmitter is configured to transmit the selected advertisements on a single television channel, and the terminal is configured to mask undesired video.

29. The system of claim 26, wherein the transmitter is configured to transmit the selected advertisements on a single television channel, and the terminal is configured to scale and reposition video.

30. The system of claim 18, wherein analyzing the gathered programs watched data comprises counting the programs watched data to determine a frequency of programs selected by a plurality of terminals to be targeted, and wherein the counts are arranged in at least one programs watched matrix.

31. The system of claim 30, wherein the programs watched matrix is arranged by program category and time slot and the analyzing comprises:
reading the at least one programs watched matrix; and
sorting the programs watched counts within a time slot from highest to lowest.

32. The system of claim 18, wherein the processor is configured to poll the terminal to monitor a current program selected at the terminal for an occurrence of commercial breaks,
and
wherein the transmitter is configured to transmit the selected advertisements in response to the occurrence of commercial breaks determined by the polling.

33. The system of claim 18, wherein the processor is further configured to receive the programs watched data from the terminal.

34. The system of claim 33, wherein the processor is configured to:
poll the terminal;
receive status reports sent by the terminal;
store the programs watched data;
generate a polling request message that directs the terminal to initiate transmission of the status reports;
process the received status reports to produce polling response data; and
temporarily store the polling response data.

35. The system of claim 34, wherein the processing of the received status reports comprises:
demodulating the received status reports, whereby demodulated data is produced;

reading at least one information field in the demodulated data, wherein each information field is appended to an identification number field;

sorting each information field in the received status reports by identification number; and accumulating the sorted information fields for each terminal, wherein the accumulated sorted information fields produce the polling response data.

36. The system of claim 35, wherein the processor is further configured to:

update the stored programs watched data with the polling response data.

37. A system for targeting advertising comprising:

a processor configured to:

count gathered programs watched data to determine a frequency of programs selected at terminals associated with users to be targeted, wherein the programs watched counts are arranged in at least one programs watched matrix by program category and time slot; and create user group information indicating a group assignment for each user to be targeted by assigning the programs watched counts to a plurality of categories of advertisements for the users, wherein each advertisement category includes advertisements available for targeting to at least one terminal, and wherein the advertisements within each advertisement category are weighted relative to one another, wherein the weighting of the advertisements within each advertisement category is based in part on a number of advertisement requests received and a cost paid by each advertiser associated with the advertisements;

a transmitter configured to transmit the user group information to a user's terminal in a control information stream that instructs the user's terminal in selecting targeted advertisements from the weighted advertisements for display during viewing of programs; and a terminal configured to selecting targeted advertisements for display.

38. The system of claim 37, wherein the processor is a network controller.

39. A network controller for use in a program delivery system for targeting advertising, the network controller comprising:

a processor; and memory storing instructions that, when executed by the processor, perform:

gathering programs watched data from terminals;

storing the gathered programs watched data;

accessing the stored programs watched data;

counting the accessed programs watched data to determine a frequency of programs selected at the terminals, wherein the programs watched counts are arranged in at least one programs watched matrix by program category and time slot;

creating terminal group information indicating a group assignment for each terminal by assigning the programs watched counts to a plurality of categories of advertisements for the terminals, wherein each advertisement category includes at least two advertisements, and wherein the at least two advertisements within each advertisement category are weighted relative to one another, and wherein the weighting of the at least two advertisements within each advertisement category is based in part on a number of advertisement requests received and a cost paid by each advertiser associated with the at least two advertisements; and a transmitter configured to transmit the terminal group information to the terminals in a control information stream that instructs the terminals in selecting advertisements from each of the plurality of categories of advertisements for display during viewing of programs.

40. The network controller of claim 39, wherein the stored programs watched data is stored in a network control database.

41. A method comprising:

gathering, programs watched data from a terminal;

analyzing, by a computer, the gathered programs watched data to determine a frequency of programs selected at the terminal;

assigning a plurality of categories of advertisements to the terminal based on the analyzed programs watched data, where each advertisement category identifies at least two advertisements, and wherein the at least two advertisements identified by each advertisement category are weighted relative to one another, and wherein the weighting of the at least two advertisements identified by each advertisement category is based in part on a number of advertisement requests received and a cost paid by each advertiser associated with the at least two advertisements;

selecting advertisements from each advertisement category based on the programs watched data;

polling to monitor a current program selected at the terminal for an occurrence of a commercial break; and transmitting the selected advertisements in response to the occurrence of the commercial break.

42. The method of claim 41, further comprising:

storing the selected advertisements.

43. The method of claim 41, further comprising:

receiving several channels of advertisements by broadcast, wherein each channel corresponds to an advertisement category;

and switching to a channel of the several channels containing the selected advertisements.

44. The method of claim 43, wherein the switching is transparent to a user of the terminal.

45. An apparatus for targeting advertising, the apparatus comprising:

a processor; and memory storing instructions that, when executed by the processor, cause the apparatus to perform:

gathering programs watched data;

analyzing the programs watched data;

assigning information on advertisements based on the analyzed programs watched data, wherein the information on advertisements identifies at least two advertisements, and wherein the at least two advertisements are weighted relative to one another, and wherein the weighting of the at least two advertisements is based in part on a number of advertisement requests received and a cost paid by each advertiser associated with the at least two advertisements; and selecting an advertisement based on the assignment and the weighting.

46. The apparatus of claim 45, wherein the apparatus is a user terminal.

47. The apparatus of claim 46, further comprising a receiver, wherein the receiver is configured to receive television signals.

48. The apparatus of claim 47, wherein the memory stores video corresponding to the selected advertisement; and wherein the receiver receives insert directions which instruct the user terminal to insert the stored video.

49. The apparatus of claim 47, wherein the receiver receives several channels of advertisements, and the instructions, when executed, cause the apparatus to perform:
   selecting a channel of advertisements; and
   switching to the selected channel,
   wherein the switching of channels is transparent to a user of the user terminal.

50. The apparatus of claim 45, wherein the instructions, when executed, cause the apparatus to perform:
   storing the information on advertisements.

51. The apparatus of claim 50, wherein the storing of the information on advertisements includes storing video corresponding to the selected advertisement.

52. The apparatus of claim 45, wherein the gathering, analyzing, and assigning occur at an operations center, and wherein the selecting occurs at a cable headend.

53. The apparatus of claim 52, wherein the instructions, when executed, cause the apparatus to generate an output, and wherein the apparatus further comprises:
   a transmitter configured to transmit the output; and
   a receiver configured to receive the output,
   wherein the memory stores video of the selected advertisement.

54. An apparatus comprising:
   a processor configured to:
      gather programs watched data;
      analyze the gathered programs watched data;
      assign the analyzed programs watched data to a plurality of categories of programs, wherein each program category includes at least two programs, and wherein the at least two programs included in each of the program categories are weighted relative to one another, and wherein the weighting of the at least two programs included in each of the program categories is based in part on a number of program requests received and a cost paid by each program provider associated with the at least two programs included in each of the program categories;
      select at least two programs from the program categories based on the analyzed programs watched data and the assignment; and
   memory configured to:
      store the selected programs.

55. An apparatus comprising:
   a processor; and
   memory storing instructions that, when executed by the processor, cause the apparatus to perform:
      gathering programs watched data from a terminal;
      analyzing the gathered programs watched data to determine a preference of a user of the terminal;
      assigning the analyzed programs watched data to a plurality of categories of video for the user, wherein each video category includes at least two videos, and wherein the at least two videos are weighted relative to one another, and wherein the weighting of the at least two videos is based in part on a number of video requests received and a cost paid by each video provider associated with the at least two videos;
      selecting at least two videos from the video categories based on the analyzed programs watched data and the assignment; and
      transmitting the selected videos to the terminal.

56. The apparatus of claim 55, wherein the selected videos include television programming.

57. The apparatus of claim 55, wherein the selected videos include advertisements.

58. The method of claim 1, further comprising:
   updating an account and billing database based on the transmission of the selected advertisement.

59. The method of claim 1, wherein analyzing the programs watched data to determine the frequency of programs selected at the terminal includes determining a frequency of program categories selected at the terminal.

60. The method of claim 59, further comprising:
   correlating the advertising categories to the program categories,
   wherein the selection of the advertisement is based on the correlation.

61. The method of claim 1, further comprising:
   ranking the advertisement categories based on the programs watched data;
   generating a package of advertisements that includes ranked advertisement categories; and
   transmitting the package of advertisements to the terminal during a given time slot.

62. The network controller of claim 39, wherein the instructions includes at least one instruction that, when executed, performs:
   updating an account and billing database based on the transmission of the control information stream that instructs the terminals in selecting advertisements.

63. The method of claim 41, wherein the analyzing of the programs watched data includes determining a frequency of program categories selected at the terminal.

64. The apparatus of claim 45, wherein the analyzing of the programs watched data includes determining a frequency of program categories selected at the terminal.

65. The apparatus of claim 54, wherein the analyzing of the gathered programs watched includes determining a frequency of selection of each of the program categories.

* * * * *

UNITED STATES PATENT AND TRADEMARK OFFICE
CERTIFICATE OF CORRECTION

| | |
|---|---|
| PATENT NO. | : 7,827,574 B1 |
| APPLICATION NO. | : 10/261931 |
| DATED | : November 2, 2010 |
| INVENTOR(S) | : John S. Hendricks et al. |

It is certified that error appears in the above-identified patent and that said Letters Patent is hereby corrected as shown below:

In Column 51, Claim 37, Line 38:
Please replace "selecting" with --select--

Signed and Sealed this
Twenty-second Day of March, 2011

David J. Kappos
Director of the United States Patent and Trademark Office